(12) United States Patent
Wang et al.

(10) Patent No.: US 11,388,709 B2
(45) Date of Patent: Jul. 12, 2022

(54) METHOD FOR DETERMINING SLOT FORMAT AND DEVICE

(71) Applicant: Huawei Technologies Co., Ltd., Shenzhen (CN)

(72) Inventors: Yafei Wang, Shanghai (CN); Xinxian Li, Shanghai (CN); Hao Tang, Shanghai (CN); Zhang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 16/993,046

(22) Filed: Aug. 13, 2020

(65) Prior Publication Data

US 2020/0374077 A1    Nov. 26, 2020

Related U.S. Application Data

(63) Continuation of application No. PCT/CN2019/074468, filed on Feb. 1, 2019.

(30) Foreign Application Priority Data

Feb. 14, 2018    (CN) .......................... 201810151872.6

(51) Int. Cl.
  *H04W 72/04*    (2009.01)
  *H04L 5/00*    (2006.01)
(52) U.S. Cl.
  CPC ......... *H04W 72/042* (2013.01); *H04L 5/0092* (2013.01); *H04W 72/0446* (2013.01); *H04L 5/001* (2013.01); *H04L 5/0048* (2013.01)

(58) Field of Classification Search
  CPC ............ H04W 72/0046; H04W 72/042; H04L 5/0092
  See application file for complete search history.

(56) References Cited

U.S. PATENT DOCUMENTS

2016/0278089 A1    9/2016 Lee et al.
2019/0191433 A1*   6/2019 Park .......................... H04L 1/00
(Continued)

FOREIGN PATENT DOCUMENTS

CN    104823399 A    8/2015
CN    107210855 A    9/2017
(Continued)

OTHER PUBLICATIONS

3GPP TS 36.211 V0.3.1 (Feb. 2007), 3rd Generation Partnership Project; Technical Specification Group Radio Access Network; Physical Channels and Modulation(Release 8), 27 pages.
(Continued)

*Primary Examiner* — Kevin C. Harper
(74) *Attorney, Agent, or Firm* — Slater Matsil, LLP

(57) ABSTRACT

A method for determining a slot format and a device are disclosed, to determine an ECP slot format. The method for determining a slot format includes: obtaining first indication information, where the first indication information includes indication information of a slot format a, the slot format a is one of slot formats of a first-type slot, the first-type slot includes N symbols, and N is 14; and determining a slot format b of $2^{(\mu-\mu_a)}$ consecutive second-type slots based on a subcarrier spacing $\mu_a$ applicable to the first indication information, a subcarrier spacing $\mu$ applicable to the second-type slot, and the indication information of the slot format a, where the second-type slot includes M symbols, and N is not equal to M.

27 Claims, 7 Drawing Sheets

(56) References Cited

U.S. PATENT DOCUMENTS

2019/0246395 A1* 8/2019 Huang .............. H04W 72/0446
2021/0045133 A1 2/2021 Hwang et al.

FOREIGN PATENT DOCUMENTS

| CN | 107493605 | A | 12/2017 |
|----|-----------|---|---------|
| EP | 2941006 | A1 | 11/2015 |
| EP | 3211813 | A2 | 8/2017 |
| JP | 2020501441 | A | 1/2020 |
| JP | 2021507592 | A | 2/2021 |
| WO | 2008127038 | A1 | 10/2008 |
| WO | 2017213386 | A1 | 12/2017 |
| WO | 2019117693 | A1 | 6/2019 |

OTHER PUBLICATIONS

NTT Docomo, Inc., "Initial views on frame structure for NR access technology", 3GPP TSG RAN WG1 Meeting #84bis, R1-163112, Apr. 11-15, 2016, 7 pages, Busan, Korea.

3GPP TS 38.211 V15.0.0 (Dec. 2017); 3rd Generation Partnership Project; Technical Specification Group Radio Access Network; NR; Physical channels and modulation (Release 15); 73 pages.

3GPP TS 38.213 V15.0.0 (Dec. 2017); 3rd Generation Partnership Project; Technical Specification Group Radio Access Network; NR; Physical layer procedures for control (Release 15); 56 pages.

3GPP TS 38.331 V15.0.0 (Dec. 2017); 3rd Generation Partnership Project; Technical Specification Group Radio Access Network; NR; Radio Resource Control (RRC) protocol specification (Release 15); 188 pages.

* cited by examiner

METHOD FOR DETERMINING SLOT FORMAT AND DEVICE

CROSS-REFERENCE TO RELATED APPLICATIONS

This application is a continuation of International Application No. PCT/CN2019/074468, filed on Feb. 1, 2019, which claims priority to Chinese Patent Application No. 201810151872.6, filed on Feb. 14, 2018. The disclosures of the aforementioned applications are hereby incorporated by reference in their entireties.

TECHNICAL FIELD

This application relates to the field of communications technologies, and in particular, to a method for determining a slot format and a device.

BACKGROUND

In 5th generation (5G) new radio (NR) standardization work, a flexible slot format is supported. To be specific, in one slot, all symbols may be used for uplink or downlink; or some symbols are used for uplink, some symbols are used for downlink, and still some symbols are unknown symbols. Currently, a slot format may be indicated to a terminal device by using a user equipment (UE) group common physical downlink control channel.

In an NR system, supported formats are for two types of cyclic prefixes (CPs), including a normal cyclic prefix (NCP) and an extended cyclic prefix (ECP). A slot with NCP includes 14 symbols, and a slot with ECP includes 12 symbols.

Currently, in the NR system, a format for a slot with ECP is not defined.

SUMMARY

Embodiments of this application provide a method for determining a slot format and a device, to determine a format for a slot with ECP.

According to a first aspect, a first method for determining a slot format is provided. The method may be performed by a communications apparatus, and the communications apparatus is, for example, a terminal device. The method includes: obtaining first indication information, where the first indication information includes indication information of a slot format a, the slot format a is one of slot formats for a first-type slot, the first-type slot includes N symbols, and N is 14; and determining a slot format b for $2^{(\mu-\mu_a)}$ second-type slots based on a subcarrier spacing $\mu_a$ applicable to the first indication information, a subcarrier spacing $\mu$ applicable to the second-type slot, and the indication information of the slot format a, where the second-type slot includes M symbols, and N is not equal to M.

In this embodiment of this application, the first indication information used to indicate the slot format a for the first-type slot is obtained, and the format for the $2^{(\mu-\mu_a)}$ consecutive second-type slots may be determined based on the subcarrier spacing applicable to the first indication information, the subcarrier spacing applicable to the second-type slot, duration of one symbol in the second-type slot, and the indication information of the slot format a. For example, the first-type slot is a slot with NCP, and the second-type slot is a slot with ECP. In other words, a format for a slot with ECP can be correspondingly determined based on a format for a slot with NCP. In this way, a network device only needs to indicate a slot format for one type of slot, and does not need to specially indicate the format for a slot with ECP, thereby reducing implementation complexity of the network device. In addition, the terminal device can also directly determine the slot format of the slot with ECP in an existing indication manner.

In a possible design, the indication information of the slot format a includes one or more of the following indication information: a quantity of downlink symbols, a quantity of uplink symbols, and a quantity of unknown symbols; or a position of a downlink symbol, a position of an uplink symbol, and a position of an unknown symbol.

The indication information of the slot format a may include the quantity of downlink symbols, the quantity of uplink symbols, and the quantity of unknown symbols; and/or include the position of the downlink symbol, the position of the uplink symbol, and the position of the unknown symbol. Regardless of whether a symbol quantity or a symbol position is included, the terminal device can determine the slot format a according to the indication information of the slot format a. This is a relatively simple and direct indication manner.

In terms of a format for a slot, there is a concept of "switching point", and a symbol at which transmission switches from downlink to uplink is referred to as a switching point. It is possible that a slot format includes one switching point, a slot format includes two switching points, and a slot format includes no switching point. When determining the slot format for the $2^{(\mu-\mu_a)}$ consecutive second-type slots, to be more accurate, the terminal device may further consider the number of switching points.

The following first describes how the terminal device determines the slot format b for the $2^{(\mu-\mu_a)}$ consecutive second-type slots when the slot format a includes one switching point.

In a possible design, the determining a slot format b for $2^{(\mu-\mu_a)}$ consecutive second-type slots based on a subcarrier spacing $\mu_a$ applicable to the first indication information, a subcarrier spacing $\mu$ applicable to the second-type slot, and the indication information of the slot format a includes: obtaining, based on the indication information of the slot format a and $\mu_a$, at least one of duration of downlink symbol(s) in a slot corresponding to the slot format a, duration of uplink symbol(s) in the slot corresponding to the slot format a, and duration of unknown symbol(s) in the slot corresponding to the slot format a; determining duration of one symbol in the second-type slot based on the subcarrier spacing $\mu$ applicable to the second-type) slot; and determining the slot format b of the $2^{(\mu-\mu_a)}$ consecutive second-type slots based on at least one of the duration DL_du of the downlink symbol(s) in the slot corresponding to the slot format a, the duration UL_du of the uplink symbol(s) in the slot corresponding to the slot format a, and the duration of the unknown symbol(s) in the slot corresponding to the slot format a, and the duration Ts_ECP of the symbol in the second-type slot.

A manner of determining the slot format b is provided. Certainly, as to how to determine the slot format b for the $2^{(\mu-\mu_a)}$ consecutive second-type slots based on the subcarrier spacing $\mu_a$ applicable to the first indication information, the subcarrier spacing $\mu$ applicable to the second-type slot, and the indication information of the slot format a, this embodiment of this application is not limited to the foregoing implementation.)

In a possible design, in the $2^{(\mu-\mu_a)}$ consecutive slots corresponding to the slot format b, when $$op1\left(\frac{DL\_du}{Ts\_ECP}\right) + op2\left(\frac{UL\_du}{Ts\_ECP}\right) < M \times 2^{(\mu-\mu_a)}, \text{ or } op1\left(\frac{DL\_du}{Ts\_ECP}\right) = o,$$

$$\text{or } op2\left(\frac{UL\_du}{Ts\_ECP}\right) = o,$$

the quantity of downlink symbols meets $$op1\left(\frac{DL\_du}{Ts\_ECP}\right),$$

and the quantity of uplink symbols meets $$op2\left(\frac{UL\_du}{Ts\_ECP}\right),$$

where op1(*) is one of exact division, rounding up, and rounding down, and op2(*) is one of exact division, rounding up, and rounding down.

If $$op1\left(\frac{DL\_du}{Ts\_ECP}\right) + op2\left(\frac{UL\_du}{Ts\_ECP}\right) < M \times 2^{(\mu-\mu_a)},$$

it indicates that in the $2^{(\mu-\mu_a)}$ consecutive slots, the uplink symbol(s) and the downlink symbol(s) neither are adjacent nor overlap, but are spaced by a specific distance. In this case, it may be directly determined that the quantity of downlink symbols meets $$op1\left(\frac{DL\_du}{Ts\_ECP}\right),$$

and the quantity of uplink symbol meets $$op2\left(\frac{UL\_du}{Ts\_ECP}\right),$$

so that the $2^{(\mu-\mu_a)}$ consecutive slots are aligned in terms of time as much as possible with the slot corresponding to the slot format a.

In a possible design, in the $2^{(\mu-\mu_a)}$ consecutive slots corresponding to the slot format b, when $$op1\left(\frac{DL\_du}{Ts\_ECP}\right) + op2\left(\frac{UL\_du}{Ts\_ECP}\right) = M \times 2^{(\mu-\mu_a)},$$

$$op1\left(\frac{DL\_du}{Ts\_ECP}\right) > o, \text{ and } op2\left(\frac{UL\_du}{Ts\_ECP}\right) > o,$$

the quantity of downlink symbols meets:

$$op1\left(\frac{DL\_du}{Ts\_ECP}\right) - 1$$

and the quantity of uplink symbols meets $$op2\left(\frac{UL\_du}{Ts\_ECP}\right);$$

or the quantity of downlink symbols meets $$op1\left(\frac{DL\_du}{Ts\_ECP}\right),$$

and the quantity of uplink symbols meets $$op2\left(\frac{UL\_du}{Ts\_ECP}\right) - 1;$$

or the quantity of downlink symbols meets:

$$op1\left(\frac{DL\_du}{Ts\_ECP}\right) - 1,$$

and the quantity of uplink symbols meets $$op2\left(\frac{UL\_du}{Ts\_ECP}\right) - 1,$$

where op1(*) is one of exact division, rounding up, and rounding down, op2(*) is one of exact division, rounding up, and rounding down, $\mu_a$ is the subcarrier spacing applicable to the first indication information, and $\mu$ is the subcarrier spacing applicable to the second-type slot.

If $$op1\left(\frac{DL\_du}{Ts\_ECP}\right) + op2\left(\frac{UL\_du}{Ts\_ECP}\right) = M \times 2^{(\mu-\mu_a)},$$

it indicates that if $$op1\left(\frac{DL\_du}{Ts\_ECP}\right)$$

is directly used as the quantity of downlink symbols in the $2^{(\mu-\mu_a)}$ consecutive second-type slots and $$op2\left(\frac{UL\_du}{Ts\_ECP}\right)$$

is used as the quantity of uplink symbols in the $2^{(\mu-\mu_a)}$ consecutive second-type slots, the uplink symbol(s) and the downlink symbol(s) may be adjacent in the $2^{(\mu-\mu_a)}$ consecutive second-type slots. However, in a slot, when transmission switches from downlink to uplink, a corresponding switching time is required. Otherwise, the terminal device may have no time for the switching, causing a transmission error. Therefore, in a slot, when transmission switches from a downlink symbol to an uplink symbol, at least one unknown symbol needs to be included between the downlink symbol and the uplink symbol, and duration of the at least one unknown symbol can be provided as the switching time. In this case, if the downlink symbol is adjacent to the uplink symbol, it indicates that there is no switching time when transmission switches from downlink to uplink. Therefore, let the quantity of downlink symbols be $$op1\left(\frac{DL\_du}{Ts\_ECP}\right) - 1,$$

and/or let the quantity of uplink symbols be $$op2\left(\frac{UL\_du}{Ts\_ECP}\right) - 1.$$

A symbol deducted when the quantity of downlink symbols is calculated and/or a symbol deducted when the quantity of uplink symbols is calculated may be determined as the unknown symbol, thereby reserving a switching time for switching from downlink to uplink.

In a possible design, in the $2^{(\mu-\mu_a)}$ consecutive slots corresponding to the slot format b, when $$op1\left(\frac{DL\_du}{Ts\_ECP}\right) + op2\left(\frac{UL\_du}{Ts\_ECP}\right) > M \times 2^{(\mu-\mu_a)},$$

the quantity of downlink symbols meets $$M \times 2^{(\mu-\mu_a)} - op2\left(\frac{UL\_du}{Ts\_ECP}\right),$$

and the quantity of uplink symbols meets $$M \times 2^{(\mu-\mu_a)} - op1\left(\frac{DL\_du}{Ts\_ECP}\right),$$

where op1(*) is one of exact division, rounding up, and rounding down, and op2(*) is one of exact division, rounding up, and rounding down.

If $$op1\left(\frac{DL\_du}{Ts\_ECP}\right) + op2\left(\frac{UL\_du}{Ts\_ECP}\right) > M \times 2^{(\mu-\mu_a)},$$

it indicates that if $$op1\left(\frac{DL\_du}{Ts\_ECP}\right)$$

is directly used as the quantity of downlink symbols in the $2^{(\mu-\mu_a)}$ consecutive second-type slots and $$op2\left(\frac{UL\_du}{Ts\_ECP}\right)$$

is used as the quantity of uplink symbols in the $2^{(\mu-\mu_a)}$ consecutive second-type slots, the uplink symbol(s) and the downlink symbol(s) may overlap in the $2^{(\mu-\mu_a)}$ consecutive second-type slots, resulting in chaos of functions of the overlapping symbols. Moreover, in a slot, when transmission switches from downlink to uplink, a corresponding switching time is required. Otherwise, the terminal device may have no time for the switching, causing a transmission error. In consideration of these factors, let the quantity of downlink symbols be $$M \times 2^{(\mu-\mu_a)} - op2\left(\frac{UL\_du}{Ts\_ECP}\right),$$

and let the quantity of uplink symbols be $$M \times 2^{(\mu-\mu_a)} - op1\left(\frac{DL\_du}{Ts\_ECP}\right).$$

The overlapping symbol may be determined as the unknown symbol, thereby reserving a switching time for switching from downlink to uplink.

In a possible design, in the $2^{(\mu-\mu_a)}$ consecutive slots corresponding to the slot format b, the quantity of unknown symbols meets: $M \times 2^{(\mu-\mu_a)}$ minus a quantity of downlink symbols in the $2^{(\mu-\mu_a)}$ consecutive slots minus a quantity of uplink symbols in the $2^{(\mu-\mu_a)}$ consecutive slots.

The quantity of downlink symbols and the quantity of uplink symbols in the $2^{(\mu-\mu_a)}$ consecutive slots have been calculated above, $2^{(\mu-\mu_a)}$ is a quantity of the second-type slots corresponding to the slot format b, M is a quantity of symbols included in one second-type slot, and $M \times 2^{(\mu-\mu_a)}$ indicates a total quantity of symbols included in the $2^{(\mu-\mu_a)}$ consecutive slots. The quantity of unknown symbols in the $2^{(\mu-\mu_a)}$ consecutive slots is obtained by subtracting the quantity of downlink symbols and the quantity of uplink symbols in the $2^{(\mu-\mu_a)}$ consecutive slots from the total quantity of symbols included in the $2^{(\mu-\mu_a)}$ consecutive slots.

In a possible design, in the $2^{(\mu-\mu_a)}$ consecutive slots corresponding to the slot format b, when $$\left\lfloor\frac{DL\_du}{Ts\_ECP}\right\rfloor + \left\lfloor\frac{UL\_du}{Ts\_ECP}\right\rfloor < M \times 2^{(\mu-\mu_a)}, \text{ or}$$

$$\left\lfloor\frac{DL\_du}{Ts\_ECP}\right\rfloor = o, \text{ or } \left\lfloor\frac{UL\_du}{Ts\_ECP}\right\rfloor = o,$$

the quantity of downlink symbols meets $$\left\lfloor\frac{DL\_du}{Ts\_ECP}\right\rfloor,$$

and the quantity of uplink symbols meets $$\left\lfloor \frac{\text{UL\_du}}{\text{Ts\_ECP}} \right\rfloor.$$

This is a specific example of the foregoing described case in which $$op_1\left(\frac{\text{DL\_du}}{\text{Ts\_ECP}}\right) + op_2\left(\frac{\text{UL\_du}}{\text{Ts\_ECP}}\right) < M \times 2^{(\mu-\mu_a)}.$$

In a possible design, in the $2^{(\mu-\mu_a)}$ consecutive slots corresponding to the slot format b, when $$\left\lfloor \frac{\text{DL\_du}}{\text{Ts\_ECP}} \right\rfloor + \left\lfloor \frac{\text{UL\_du}}{\text{Ts\_ECP}} \right\rfloor = M \times 2^{(\mu-\mu_a)},$$

the quantity of downlink symbols meets:

$$\left\lfloor \frac{\text{DL\_du}}{\text{Ts\_ECP}} \right\rfloor - 1,$$

and the quantity of uplink symbols meets $$\left\lfloor \frac{\text{UL\_du}}{\text{Ts\_ECP}} \right\rfloor;$$

the quantity of downlink symbols meets:

$$\left\lfloor \frac{\text{DL\_du}}{\text{Ts\_ECP}} \right\rfloor,$$

and the quantity of uplink symbols meets $$\left\lfloor \frac{\text{UL\_du}}{\text{Ts\_ECP}} \right\rfloor - 1;$$

or the quantity of downlink symbols meets:

$$\left\lfloor \frac{\text{DL\_du}}{\text{Ts\_ECP}} \right\rfloor - 1,$$

and the quantity of uplink symbols meets $$\left\lfloor \frac{\text{UL\_du}}{\text{Ts\_ECP}} \right\rfloor - 1.$$

These are several specific examples of the foregoing described cases in which $$op_1\left(\frac{\text{DL\_du}}{\text{Ts\_ECP}}\right) + op_2\left(\frac{\text{UL\_du}}{\text{Ts\_ECP}}\right) = M \times 2^{(\mu-\mu_a)}.$$

In a possible design, in the $2^{(\mu-\mu_a)}$ consecutive slots corresponding to the slot format b, the quantity of unknown symbols meets $M \times 2^{(\mu-\mu_a)}$ minus the quantity of downlink symbols in the $2^{(\mu-\mu_a)}$ consecutive slots minus the quantity of uplink symbols in the $2^{(\mu-\mu_a)}$ consecutive slots.

The foregoing various possible designs describe how the terminal device determines the slot format b of the $2^{(\mu-\mu_a)}$ consecutive second-type slots when the slot format a includes one switching point. The following describes how the terminal device determines the slot format b of the $2^{(\mu-\mu_a)}$ consecutive second-type slots when the slot format a includes two switching points.

In a possible design, the determining a slot format b of $2^{(\mu-\mu_a)}$ consecutive second-type slots based on a subcarrier spacing $\mu_a$ applicable to the first indication information, a subcarrier spacing $\mu$ applicable to the second-type slot, and the indication information of the slot format a includes: obtaining, based on the indication information of the slot format a and $\mu_a$, at least one of duration of downlink symbol(s) in a first subslot corresponding to the slot format a, duration of uplink symbol(s) in the first subslot corresponding to the slot format a, and duration of unknown symbol(s) in the first subslot corresponding to the slot format a, where the first subslot is the first half slot of the slot corresponding to the slot format a; obtaining, based on the indication information of the slot format a and $\mu_a$, at least one of duration of downlink symbol(s) in a second subslot corresponding to the slot format a, duration of uplink symbol(s) in the second subslot corresponding to the slot format a, and duration of unknown symbol(s) in the second subslot corresponding to the slot format a, where the second subslot is the second half slot of the slot corresponding to the slot format a; determining duration of one symbol in the second-type slot based on an index $\mu$ of the subcarrier spacing applicable to the second-type slot; determining a slot format b of K1 slots based on at least one of the duration DL_du1 of the downlink symbol(s) in the first subslot corresponding to the slot format a, the duration UL_du1 of the uplink symbol(s) in the first subslot corresponding to the slot format a, and the duration of the unknown symbol(s) in the first subslot corresponding to the slot format a, and the duration Ts_ECP of the symbol in the second-type slot, where the K1 slots are the first half slots of the $2^{(\mu-\mu_a)}$ consecutive second-type slots; and determining a slot format b of K2 slots based on at least one of the duration DL_du2 the downlink symbol(s) in the second subslot corresponding to the slot format a, the duration UL_du2 of the uplink symbol(s) in the second subslot corresponding to the slot format a, and the duration of the unknown symbol(s) in the second subslot corresponding to the slot format a, and the duration Ts_ECP of the symbol in the second-type slot, where the K2 slots are the second half slots of the $2^{(\mu-\mu_a)}$ consecutive second-type slots.

It may be learned that in this case, the terminal device may separately determine slot formats for the $2^{(\mu-\mu_a)}$ consecutive second-type slots. For example, the terminal device divides the $2^{(\mu-\mu_a)}$ consecutive second-type slots into the K1 slots and the K2 slots, where the K1 slots are the first half slots of the $2^{(\mu-\mu_a)}$ consecutive second-type slots, and the K2 slots are the second half slots of the $2^{(\mu-\mu_a)}$ consecutive second-type slots; and divides the first-type slot corresponding to the slot format a indicated by the first indication information into two parts: the first subslot and the second subslot, where the first subslot is the first half slot of the first-type slot, and the second subslot is the second half slot of the first-type slot. The terminal device determines the slot format of the K1 slots based on the first subslot, and determines the slot format of the K2 slots based on the second subslot, thereby determining the slot format b of the $2^{(\mu-\mu_a)}$ consecutive second-type slots.

In a possible design, in the K1 slots corresponding to the slot format b, when $$op1\left(\frac{DL\_du1}{Ts\_ECP}\right) + op2\left(\frac{UL\_du1}{Ts\_ECP}\right) < \frac{1}{2}M \times 2^{(\mu-\mu_a)}, \text{ or}$$

$$op1\left(\frac{DL\_du1}{Ts\_ECP}\right) = o, \text{ or } op2\left(\frac{UL\_du1}{Ts\_ECP}\right) = o,$$

the quantity of downlink symbols meets:

$$op1\left(\frac{DL\_du1}{Ts\_ECP}\right),$$

and the quantity of uplink symbols meets $$op2\left(\frac{UL\_du1}{Ts\_ECP}\right),$$

where op1(*) is one of exact division, rounding up, and rounding down, and op2(*) is one of exact division, rounding up, and rounding down.

In a determining manner A1, $$op1\left(\frac{DL\_du1}{Ts\_ECP}\right) + op2\left(\frac{UL\_du1}{Ts\_ECP}\right) < \frac{1}{2}M \times 2^{(\mu-\mu_a)}, \text{ where } \frac{1}{2}M \times 2^{(\mu-\mu_a)}$$

represents total duration of the K1 second-type slots (that is, the K1 slots). In other words, a sum of the quantity of downlink symbols and the quantity of uplink symbols in the K1 second-type slots is less than the total duration of the K1 second-type slots. Therefore, in the K1 slots, the downlink symbol(s) and the uplink symbol(s) neither overlap nor are adjacent. In this case, it can be directly determined that the quantity of downlink symbols meets $$op1\left(\frac{DL\_du1}{Ts\_ECP}\right),$$

and the quantity of uplink symbols meets $$op2\left(\frac{UL\_du1}{Ts\_ECP}\right),$$

so that the K1 slots are aligned with the first subslot in terms of time as much as possible.

In a possible design, in the K1 slots corresponding to the slot format b, when $$op1\left(\frac{DL\_du1}{Ts\_ECP}\right) + op2\left(\frac{UL\_du1}{Ts\_ECP}\right) = \frac{1}{2}M \times 2^{(\mu-\mu_a)},$$

$$op1\left(\frac{DL\_du1}{Ts\_ECP}\right) > o, \text{ and } op2\left(\frac{UL\_du1}{Ts\_ECP}\right) > o,$$

the quantity of downlink symbols meets:

$$op1\left(\frac{DL\_du1}{Ts\_ECP}\right) - 1,$$

and the quantity of uplink symbols meets $$op2\left(\frac{UL\_du1}{Ts\_ECP}\right);$$

or the quantity of downlink symbols meets $$op1\left(\frac{DL\_du1}{Ts\_ECP}\right),$$

and the quantity of uplink symbols meets $$op2\left(\frac{UL\_du1}{Ts\_ECP}\right) - 1,$$

where op1(*) is one of exact division, rounding up, and rounding down, and op2(*) is one of exact division, rounding up, and rounding down.

If $$op1\left(\frac{DL\_du1}{Ts\_ECP}\right) + op2\left(\frac{UL\_du1}{Ts\_ECP}\right) = \frac{1}{2}M \times 2^{(\mu-\mu_a)},$$

it indicates that if $$op1\left(\frac{DL\_du1}{Ts\_ECP}\right)$$

is directly used as the quantity of downlink symbols in the K1 second-type slot and $$op2\left(\frac{UL\_du1}{Ts\_ECP}\right)$$

is used as the quantity of uplink symbols in the K1 second-type slots, the uplink symbol(s) and the downlink symbol(s) are adjacent in the K1 second-type slots. However, in a slot, when transmission switches from downlink to uplink, a corresponding switching time is required. Otherwise, the terminal device may have no time for the switching, causing a transmission error. Therefore, let the quantity of downlink symbols be $$op1\left(\frac{DL\_du1}{Ts\_ECP}\right) - 1,$$

and/or let the quantity of uplink symbols be $$op2\left(\frac{UL\_du1}{Ts\_ECP}\right) - 1.$$

A symbol deducted when the quantity of downlink symbols is calculated and/or a symbol deducted when the quantity of uplink symbols is calculated may be determined as the unknown symbol, thereby reserving a switching time for switching from downlink to uplink.

In a possible design, in the K1 slots corresponding to the slot format b, when $$op1\left(\frac{DL\_du1}{Ts\_ECP}\right) + op2\left(\frac{UL\_du1}{Ts\_ECP}\right) > \frac{1}{2}M \times 2^{(\mu-\mu_a)},$$

the quantity of downlink symbols meets:

$$\frac{1}{2}M \times 2^{(\mu-\mu_a)} - op2\left(\frac{UL\_du1}{Ts\_ECP}\right),$$

and the quantity of uplink symbols meets $$\frac{1}{2}M \times 2^{(\mu-\mu_a)} op1\left(\frac{DL\_du1}{Ts\_ECP}\right),$$

where op1(*) is one of exact division, rounding up, and rounding down, and op2(*) is one of exact division, rounding up, and rounding down.

If $$op1\left(\frac{DL\_du1}{Ts\_ECP}\right) + op2\left(\frac{UL\_du1}{Ts\_ECP}\right) > \frac{1}{2}M \times 2^{(\mu-\mu_a)},$$

it indicates that if $$op1\left(\frac{DL\_du1}{Ts\_ECP}\right)$$

is directly used as the quantity of downlink symbols in the K1 second-type slots and $$op2\left(\frac{UL\_du1}{Ts\_ECP}\right)$$

is used as the quantity of uplink symbols in the K1 second-type slots, the uplink symbol and the downlink symbol may overlap in the K1 second-type slots, resulting in chaos of functions of the overlapping symbols. Moreover, in a slot, when transmission switches from downlink to uplink, a corresponding switching time is required. Otherwise, the terminal device may have no time for the switching, causing a transmission error. In consideration of these factors, let the quantity of downlink symbols be $$\frac{1}{2}M \times (2^{(\mu-\mu_a)}) - op2\left(\frac{UL\_du1}{Ts\_ECP}\right),$$

and let the quantity of uplink symbols be $$\frac{1}{2}M \times (2^{(\mu-\mu_a)}) - op1\left(\frac{UL\_du1}{Ts\_ECP}\right).$$

The overlapping symbol may be determined as the unknown symbol, thereby reserving a switching time for switching from downlink to uplink.

In a possible design, in the K1 slots corresponding to the slot format b, the quantity of unknown symbols meets: $\frac{1}{2}M \times 2^{(\mu-\mu_a)}$ minus the quantity of downlink symbols in the K1 slots minus the quantity of uplink symbols in the K1 slots.

The quantity of downlink symbols and the quantity of uplink symbols in the K1 slots have been calculated above, $\frac{1}{2} \times 2^{(\mu-\mu_a)}$ is a value of K1, M is a quantity of symbols included in one second-type slot, and $\frac{1}{2}M \times 2^{(\mu-\mu_a)}$ indicates a total quantity of symbols included in the K1 slots. The quantity of unknown symbols in the K1 slots is obtained by subtracting the quantity of downlink symbols and the quantity of uplink symbols in the K1 slots from the total quantity of symbols included in the K1 slots.

The foregoing describes how to determine the slot format of the K1 slots, and the following describes how to determine the slot format of the K2 slots.

In a possible design, in the K2 slots corresponding to the slot format b, when $$op1\left(\frac{DL\_du2}{Ts\_ECP}\right) + op2\left(\frac{UL\_du2}{Ts\_ECP}\right) < \frac{1}{2}M \times 2^{(\mu-\mu_a)}, \text{ or}$$

$$op1\left(\frac{DL\_du2}{Ts\_ECP}\right) = o, \text{ or } op2\left(\frac{UL\_du2}{Ts\_ECP}\right) = o,$$

the quantity of downlink symbols meets $$op1\left(\frac{DL\_du2}{Ts\_ECP}\right),$$

and the quantity of uplink symbols meets $$op2\left(\frac{UL\_du2}{Ts\_ECP}\right),$$

where op1(*) is one of exact division, rounding up, and rounding down, and op2(*) is one of exact division, rounding up, and rounding down.

$\frac{1}{2}M \times 2^{(\mu-\mu_a)}$ indicates total duration of the K2 second-type slots. That is, a sum of the quantity of downlink symbols and the quantity of uplink symbols in the K2 second-type slots is less than total duration (a total quantity of symbols) of the K2 second-type slots. Therefore, in the K2 slots, the downlink symbol(s) and the uplink symbol(s) neither overlap nor are adjacent. In this case, it can be directly determined that the quantity of downlink symbols meets $$op1\left(\frac{DL\_du2}{Ts\_ECP}\right),$$

and the quantity of uplink symbols meets $$op2\left(\frac{UL\_du2}{Ts\_ECP}\right),$$

so that the K2 slots are aligned with the second subslot in terms of time as much as possible.

In a possible design, in the K2 slots corresponding to the slot format b, when $$op1\left(\frac{DL\_du2}{Ts\_ECP}\right) + op2\left(\frac{UL\_du2}{Ts\_ECP}\right) = \frac{1}{2}M \times 2^{(\mu-\mu_a)},$$

$$op1\left(\frac{DL\_du2}{Ts\_ECP}\right) > o, \text{ and } op2\left(\frac{UL\_du2}{Ts\_ECP}\right) > o,$$

the quantity of downlink symbols meets:

$$op1\left(\frac{DL\_du2}{Ts\_ECP}\right) - 1,$$

and the quantity of uplink symbols meets $$op2\left(\frac{UL\_du2}{Ts\_ECP}\right);$$

or the quantity of downlink symbols meets $$op1\left(\frac{DL\_du2}{Ts\_ECP}\right),$$

and the quantity of uplink symbols meets $$op2\left(\frac{UL\_du2}{Ts\_ECP}\right) - 1;$$

or the quantity of downlink symbols meets $$op1\left(\frac{DL\_du2}{Ts\_ECP}\right) - 1,$$

and the quantity of uplink symbols meets $$op2\left(\frac{UL\_du2}{Ts\_ECP}\right) - 1,$$

where op1(*) is one of exact division, rounding up, and rounding down, and op2(*) is one of exact division, rounding up, and rounding down.

If $$op1\left(\frac{DL\_du2}{Ts\_ECP}\right) + op2\left(\frac{UL\_du2}{Ts\_ECP}\right) = \frac{1}{2}M \times 2^{(\mu-\mu_a)},$$

it indicates that if $$op1\left(\frac{DL\_du2}{Ts\_ECP}\right)$$

is directly used as the quantity of downlink symbols in the K2 second-type slots and $$op2\left(\frac{UL\_du2}{Ts\_ECP}\right)$$

is used as the quantity of uplink symbols in the K2 second-type slots, the uplink symbol and the downlink symbol may be adjacent in the K2 second-type slots. However, in a slot, when transmission switches from downlink to uplink, a corresponding switching time is required. Otherwise, the terminal device may have no time for the switching, causing a transmission error. Therefore, let the quantity of downlink symbols be $$op1\left(\frac{DL\_du2}{Ts\_ECP}\right) - 1,$$

and/or let the quantity of uplink symbols be $$op2\left(\frac{UL\_du2}{Ts\_ECP}\right) - 1.$$

A symbol deducted when the quantity of downlink symbols is calculated and/or a symbol deducted when the quantity of uplink symbols is calculated may be determined as the unknown symbol, thereby reserving a switching time for switching from downlink to uplink.

In a possible design, in the K2 slots corresponding to the slot format b, when $$op1\left(\frac{DL\_du2}{Ts\_ECP}\right) + op2\left(\frac{UL\_du2}{Ts\_ECP}\right) > \frac{1}{2}M \times 2^{(\mu-\mu_a)},$$

the quantity of downlink symbols meets:

$$\frac{1}{2}M \times 2^{(\mu-\mu_a)} - op2\left(\frac{UL\_du2}{Ts\_ECP}\right)$$

and the quantity of uplink symbols meets $$\frac{1}{2}M \times 2^{(\mu-\mu_a)} - op1\left(\frac{DL\_du2}{Ts\_ECP}\right),$$

where op1(*) is one of exact division, rounding up, and rounding down, and op2(*) is one of exact division, rounding up, and rounding down.

If $$op1\left(\frac{DL\_du2}{Ts\_ECP}\right) + op2\left(\frac{UL\_du2}{Ts\_ECP}\right) > \frac{1}{2}M \times 2^{(\mu-\mu_a)},$$

it indicates that if $$op1\left(\frac{DL\_du2}{Ts\_ECP}\right)$$

is directly used as the quantity of downlink symbols in the K2 second-type slots and $$op2\left(\frac{UL\_du2}{Ts\_ECP}\right)$$

is used as the quantity of uplink symbols in the K2 second-type slots, the uplink symbol(s) and the downlink symbol(s) may overlap in the K2 second-type slots, resulting in chaos of functions of the overlapping symbols. Moreover, in a slot, when transmission switches from downlink to uplink, a corresponding switching time is required. Otherwise, the terminal device may have no time for the switching, causing a transmission error. In consideration of these factors, let the quantity of downlink symbols be $$\frac{1}{2}M \times 2^{(\mu-\mu_a)} - op2\left(\frac{UL\_du2}{Ts\_ECP}\right),$$

and let the quantity of uplink symbols be $$\frac{1}{2}M \times 2^{(\mu-\mu_a)} - op1\left(\frac{DL\_du2}{Ts\_ECP}\right).$$

The overlapping symbol may be determined as the unknown symbol, thereby reserving a switching time for switching from downlink to uplink.

In a possible design, in the K2 slots corresponding to the slot format b, a quantity of unknown symbols meets: ½M× $2^{(\mu-\mu_a)}$ minus the quantity of downlink symbols in the K2 slots minus the quantity of uplink symbols in the K2 slots.

The quantity of downlink symbols and the quantity of uplink symbols in the K2 slots have been calculated above, ½×$2^{(\mu-\mu_a)}$ is a value of K2, M is a quantity of symbols included in one second-type slot, and ½M×$2^{(\mu-\mu_a)}$ indicates a total quantity of symbols included in the K2 slots. The quantity of unknown symbols in the K2 slots is obtained by subtracting the quantity of downlink symbols and the quantity of uplink symbols in the K2 slots from the total quantity of symbols included in the K2 slots.

In a possible design, in the K1 slots corresponding to the slot format b, when $$\left\lfloor\frac{DL\_du1}{Ts\_ECP}\right\rfloor + \left\lfloor\frac{UL\_du1}{Ts\_ECP}\right\rfloor < \frac{1}{2}M \times 2^{(\mu-\mu_a)}, \text{ or}$$

$$\left\lfloor\frac{DL\_du1}{Ts\_ECP}\right\rfloor = o, \text{ or } \left\lfloor\frac{UL\_du1}{Ts\_ECP}\right\rfloor = o,$$

the quantity of downlink symbols meets:

$$\left\lfloor\frac{DL\_du1}{Ts\_ECP}\right\rfloor,$$

and the quantity of uplink symbols meets $$\left\lfloor\frac{UL\_du1}{Ts\_ECP}\right\rfloor.$$

This is a specific example of the foregoing described case in which $$op1\left(\frac{DL\_du1}{Ts\_ECP}\right) + op2\left(\frac{UL\_du1}{Ts\_ECP}\right) < \frac{1}{2}M \times 2^{(\mu-\mu_a)}.$$

In a possible design, in the K1 slots corresponding to the slot format b, when $$\left\lfloor\frac{DL\_du1}{Ts\_ECP}\right\rfloor + \left\lfloor\frac{UL\_du1}{Ts\_ECP}\right\rfloor = \frac{1}{2}M \times 2^{(\mu-\mu_a)},$$

the quantity of downlink symbols meets $$\left\lfloor\frac{DL\_du1}{Ts\_ECP}\right\rfloor - 1,$$

and the quantity of uplink symbols meets $$\left\lfloor\frac{UL\_du1}{Ts\_ECP}\right\rfloor;$$

the quantity of downlink symbols meets:

$$\left\lfloor\frac{DL\_du1}{Ts\_ECP}\right\rfloor,$$

and the quantity of uplink symbol meets $$\left\lfloor\frac{UL\_du1}{Ts\_ECP}\right\rfloor - 1;$$

or, the quantity of downlink symbols meets:

$$\left\lfloor \frac{DL\_du1}{Ts\_ECP} \right\rfloor - 1,$$

and the quantity of uplink symbols meets $$\left\lfloor \frac{UL\_du1}{Ts\_ECP} \right\rfloor - 1.$$

This is a specific example of the foregoing described case in which $$op1\left(\frac{DL\_du1}{Ts\_ECP}\right) + op2\left(\frac{UL\_du1}{Ts\_ECP}\right) = \frac{1}{2}M \times 2^{(\mu-\mu_a)}.$$

In a possible design, in the K1 slots corresponding to the slot format b, the quantity of unknown symbols meets: ½M×2$^{(\mu-\mu_a)}$ minus the quantity of downlink symbols in the K1 slots minus the quantity of uplink symbols in the K1 slots.

In a possible design, in the K2 slots corresponding to the slot format b, when $$\left\lfloor \frac{DL\_du2}{Ts\_ECP} \right\rfloor + \left\lfloor \frac{UL\_du2}{Ts\_ECP} \right\rfloor < \frac{1}{2}M \times 2^{(\mu-\mu_a)}, \text{ or}$$

$$\left\lfloor \frac{DL\_du2}{Ts\_ECP} \right\rfloor = o, \text{ or } \left\lfloor \frac{UL\_du2}{Ts\_ECP} \right\rfloor = o,$$

the quantity of downlink symbols meets:

$$\left\lfloor \frac{DL\_du2}{Ts\_ECP} \right\rfloor,$$

and the quantity of uplink symbols meets $$\left\lfloor \frac{UL\_du2}{Ts\_ECP} \right\rfloor.$$

This is a specific example of the foregoing described case in which $$op1\left(\frac{DL\_du2}{Ts\_ECP}\right) + op2\left(\frac{UL\_du2}{Ts\_ECP}\right) < \frac{1}{2}M \times 2^{(\mu-\mu_a)}.$$

In a possible design, in the K2 slots corresponding to the slot format b, when $$\left\lfloor \frac{DL\_du2}{Ts\_ECP} \right\rfloor + \left\lfloor \frac{UL\_du2}{Ts\_ECP} \right\rfloor = \frac{1}{2}M \times 2^{(\mu-\mu_a)},$$

the quantity of downlink symbols meets $$\left\lfloor \frac{DL\_du2}{Ts\_ECP} \right\rfloor - 1,$$

and the quantity of uplink symbols meets $$\left\lfloor \frac{UL\_du2}{Ts\_ECP} \right\rfloor;$$

the quantity of downlink symbols meets:

$$\left\lfloor \frac{DL\_du2}{Ts\_ECP} \right\rfloor,$$

and the quantity of uplink symbol meets $$\left\lfloor \frac{UL\_du2}{Ts\_ECP} \right\rfloor - 1;$$

or the quantity of downlink symbols meets $$\left\lfloor \frac{DL\_du2}{Ts\_ECP} \right\rfloor - 1,$$

and the quantity of uplink symbols meets $$\left\lfloor \frac{UL\_du2}{Ts\_ECP} \right\rfloor - 1.$$

This is a specific example of the foregoing described case in which $$op1\left(\frac{DL\_du2}{Ts\_ECP}\right) + op2\left(\frac{UL\_du2}{Ts\_ECP}\right) = \frac{1}{2}M \times 2^{(\mu-\mu_a)}.$$

In a possible design, in the K2 slots corresponding to the slot format b, the quantity of unknown symbols meets: ½M×2$^{(\mu-\mu_a)}$ minus the quantity of downlink symbols in the K2 slots minus the quantity of uplink symbols in the K2 slots.

According to a second aspect, a second method for determining a slot format is provided. The method may be performed by a communications apparatus, and the communications apparatus is, for example, a terminal device. The method includes: obtaining first indication information, where the first indication information includes indication information of a slot format b; and determining the slot format b based on the first indication information, where the slot format b is one of slot formats of a second-type slot; the second-type slot includes M symbols, and M is 12; types and a time sequence of the symbols in the slot format b are the same as types and a time sequence of 12 symbols in a slot format a of a first-type slot; and the slot format a of the first-type slot includes the 12 symbols and another two symbols.

Correspondingly, according to a third aspect, a third method for determining a slot format is provided. The method may be performed by a communications apparatus, and the communications apparatus that performs the method is, for example, a network device such as a base station. The method includes: determining a slot format b, where the slot format b is one of slot formats of a second-type slot; the second-type slot includes M symbols, and M is 12; types and a time sequence of the symbols in the slot format b are the same as types and a time sequence of 12 symbols in a slot format a of a first-type slot; and the slot format a of the first-type slot includes the 12 symbols and another two symbols; and sending first indication information, where the first indication information includes indication information of the slot format b.

In this embodiment of this application, at least one slot format of the second-type slot may be directly provided, and the network device directly indicates the slot format of the second-type slot, so that the terminal device can directly determine the slot format of the second-type slot based on an indication of the network device, and the terminal device does not need to perform additional processing. It is relatively easy for the terminal device to implement.

In a possible design, the another two symbols include: one symbol in a type of symbols with a largest quantity in the slot format a, and one symbol in a type of symbols with a largest quantity in remaining symbols that are in the slot format a and that are obtained after the symbol in the type of symbols with the largest quantity is removed; two symbols in a type of symbols with a largest quantity in the slot format a; one symbol in first-type symbols and one symbol in second-type symbols in the slot format a, where the first-type symbols and the second-type symbols have an equal quantity, and are two types of symbols with a largest quantity in the slot format a; the first symbol and the last symbol in the slot format a; the last two symbols in the slot format a; two random symbols in the slot format a; the last symbol in the first half slot and the last symbol in the second half slot of the slot format a; or one symbol in a type of symbols with a largest quantity in the first half slot and one symbol in a type of symbols with a largest quantity in the second half slot in the slot format a.

In this embodiment of this application, the at least one slot format of the second-type slot is obtained based on the slot format of the first-type slot. A plurality of manners of obtaining the at least one slot format of the second-type slot based on the slot format of the first-type slot are provided herein. During actual application, a corresponding manner may be flexibly selected.

In a possible design, the slot format b is an entry corresponding to one of slot formats 0 to 255 in the following table:

| Format | Symbol number in a slot | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | D | D | D | D | D | D | D | D | D | D | D | D |
| 1 | U | U | U | U | U | U | U | U | U | U | U | U |
| 2 | X | X | X | X | X | X | X | X | X | X | X | X |
| 3 | D | D | D | D | D | D | D | D | D | D | D | X |
| 4 | D | D | D | D | D | D | D | D | D | D | X | X |
| 5 | D | D | D | D | D | D | D | D | D | X | X | X |
| 6 | D | D | D | D | D | D | D | D | X | X | X | X |
| 7 | D | D | D | D | D | D | D | X | X | X | X | X |
| 8 | X | X | X | X | X | X | X | X | X | X | X | U |
| 9 | X | X | X | X | X | X | X | X | X | X | U | U |
| 10 | X | U | U | U | U | U | U | U | U | U | U | U |
| 11 | X | X | U | U | U | U | U | U | U | U | U | U |
| 12 | X | X | X | U | U | U | U | U | U | U | U | U |
| 13 | X | X | X | X | U | U | U | U | U | U | U | U |
| 14 | X | X | X | X | X | U | U | U | U | U | U | U |
| 15 | X | X | X | X | X | X | U | U | U | U | U | U |
| 16 | D | X | X | X | X | X | X | X | X | X | X | X |
| 17 | D | D | X | X | X | X | X | X | X | X | X | X |
| 18 | D | D | D | X | X | X | X | X | X | X | X | X |
| 19 | D | X | X | X | X | X | X | X | X | X | X | U |
| 20 | D | D | X | X | X | X | X | X | X | X | X | U |
| 21 | D | D | D | X | X | X | X | X | X | X | X | U |
| 22 | D | X | X | X | X | X | X | X | X | X | U | U |
| 23 | D | D | X | X | X | X | X | X | X | X | U | U |
| 24 | D | D | D | X | X | X | X | X | X | X | U | U |
| 25 | D | X | X | X | X | X | X | X | X | U | U | U |
| 26 | D | D | X | X | X | X | X | X | X | U | U | U |
| 27 | D | D | D | X | X | X | X | X | X | U | U | U |
| 28 | D | D | D | D | D | D | D | D | D | X | X | X |
| 29 | D | D | D | D | D | D | D | D | X | X | X | U |
| 30 | D | D | D | D | D | D | D | X | X | X | U | U |
| 31 | D | D | D | D | D | D | D | D | X | U | U | U |
| 32 | D | D | D | D | D | D | D | X | X | U | U | U |
| 33 | D | D | D | D | D | D | X | X | X | U | U | U |
| 34 | D | X | U | U | U | U | U | U | U | U | U | U |
| 35 | D | D | X | U | U | U | U | U | U | U | U | U |
| 36 | D | D | D | X | U | U | U | U | U | U | U | U |
| 37 | D | X | X | U | U | U | U | U | U | U | U | U |
| 38 | D | D | X | X | U | U | U | U | U | U | U | U |
| 39 | D | D | D | X | X | U | U | U | U | U | U | U |
| 40 | D | X | X | X | U | U | U | U | U | U | U | U |
| 41 | D | D | X | X | X | U | U | U | U | U | U | U |
| 42 | D | D | D | X | X | X | U | U | U | U | U | U |
| 43 | D | D | D | D | D | D | X | X | X | X | U | U |
| 44 | D | D | D | D | X | X | X | X | X | U | U | U |
| 45 | D | D | D | D | X | X | U | U | U | U | U | U |
| 46 | D | D | D | X | U | D | D | D | D | X | X | U |
| 47 | D | D | X | U | U | U | D | D | X | U | U | U |
| 48 | D | X | U | U | U | D | X | U | U | U | U | U |
| 49 | D | D | D | X | X | U | D | D | X | X | U | U |
| 50 | D | D | X | U | U | D | D | X | X | U | U | U |
| 51 | D | X | X | U | U | U | D | X | X | U | U | U |
| 52 | D | X | X | X | U | D | X | X | X | U | U | U |
| 53 | D | D | X | X | X | U | D | D | X | X | U | U |
| 54 | X | X | X | X | X | X | D | D | D | D | D | D |
| 55 | D | D | X | X | X | U | U | U | D | D | D | D |
| 56-255 | Reserved | | | | | | | | | | | |

Some possible selections for the slot format b are provided.

According to a fourth aspect, a communications apparatus is provided. The communications apparatus is, for example, a terminal device. The terminal device has functions of the terminal device that implements the foregoing method designs. The functions may be implemented by hardware, or may be implemented by executing corresponding software by hardware. The hardware or the software includes one or more units corresponding to the foregoing functions.

In a possible design, a specific structure of the terminal device may include a processing module and a transceiver module. The transceiver module is configured to obtain first indication information, the processing module is configured to determine a slot format b based on the first indication information, and the processing module and the transceiver module can perform corresponding functions in the method according to any one of the first aspect or the possible designs of the first aspect.

In a possible design, the transceiver module may be a transceiver, and the processing module may be a processor.

According to a fifth aspect, a communications apparatus is provided. The communications apparatus is, for example, a terminal device. The terminal device has functions of the terminal device that implements the foregoing method designs. The functions may be implemented by hardware, or may be implemented by executing corresponding software by hardware. The hardware or the software includes one or more units corresponding to the foregoing functions.

In a possible design, a specific structure of the terminal device may include a processing module and a transceiver module. The transceiver module is configured to obtain first indication information, the processing module is configured to determine a slot format b based on the first indication information, and the processing module and the transceiver module can perform corresponding functions in the method according to any one of the second aspect or the possible designs of the second aspect.

In a possible design, the transceiver module may be a transceiver, and the processing module may be a processor.

According to a sixth aspect, a communications apparatus is provided. The communications apparatus is, for example, a network device. The network device has functions of the network device that implements the foregoing method designs. The functions may be implemented by hardware, or may be implemented by executing corresponding software by hardware. The hardware or the software includes one or more units corresponding to the foregoing functions.

In a possible design, a specific structure of the network device may include a processing module and a transceiver module. The transceiver module is configured to send first indication information of a slot format b, the processing module is configured to determine the slot format b, and the processing module and the transceiver module can perform corresponding functions in the method according to any one of the third aspect or the possible designs of the third aspect.

In a possible design, the transceiver module may be a transceiver, and the processing module may be a processor.

According to a seventh aspect, a communications apparatus is provided. The communications apparatus may be the terminal device in the foregoing method designs, or may be a chip disposed in the terminal device. The communications apparatus includes: a memory, configured to store computer executable program code, and a processor, where the processor is coupled to the memory. The program code stored in the memory includes an instruction, and when the processor executes the instruction, the communications apparatus is enabled to perform the method according to any one of first aspect or the possible designs of the first aspect.

According to an eighth aspect, a communications apparatus is provided. The communications apparatus may be the terminal device in the foregoing method designs, or may be a chip disposed in the terminal device. The communications apparatus includes: a memory, configured to store computer executable program code, and a processor, where the processor is coupled to the memory. The program code stored in the memory includes an instruction, and when the processor executes the instruction, the communications apparatus is enabled to perform the method according to any one of second aspect or the possible designs of the second aspect.

According to a ninth aspect, a communications apparatus is provided. The communications apparatus may be the network device in the foregoing method designs, or may be a chip disposed in the network device. The communications apparatus includes: a memory, configured to store computer executable program code, and a processor, where the processor is coupled to the memory. The program code stored in the memory includes an instruction, and when the processor executes the instruction, the communications apparatus is enabled to perform the method according to any one of third aspect or the possible designs of the third aspect.

According to a tenth aspect, a communications system is provided. The communications system includes a terminal device and a network device. The terminal device is configured to: obtain first indication information, where the first indication information includes indication information of a slot format b; and determine the slot format b based on the first indication information, where the slot format b is one of slot formats of a second-type slot; the second-type slot includes M symbols, and M is 12; types and a time sequence of the symbols in the slot format b are the same as types and a time sequence of 12 symbols in a slot format a of a first-type slot; and the slot format a of the first-type slot includes the 12 symbols and another two symbols. The network device is configured to: determine the slot format b, where the slot format b is one of slot formats of a second-type slot; the second-type slot includes M symbols, and M is 12; types and a time sequence of the symbols in the slot format b are the same as types and a time sequence of 12 symbols in a slot format a of a first-type slot; and the slot format a of the first-type slot includes the 12 symbols and another two symbols; and send the first indication information, where the first indication information includes the indication information of the slot format b.

According to an eleventh aspect, a computer-readable storage medium is provided. The computer-readable storage medium stores an instruction, and when the instruction is run on a computer, the computer is enabled to perform the method according to the first aspect, the second aspect, the third aspect, or any possible design thereof.

According to a twelfth aspect, a computer program product including an instruction is provided. The computer program product stores the instruction, and when the instruction is run on a computer, the computer is enabled to perform the method according to the first aspect, the second aspect, the third aspect, or any possible design thereof.

In the embodiments of this application, at least one slot format of the second-type slot may be directly provided, and the network device directly indicates the slot format of the second-type slot, so that the terminal device can directly determine the slot format of the second-type slot based on an indication of the network device, and the terminal device does not need to perform additional processing. It is relatively easy for the terminal device to implement.

BRIEF DESCRIPTION OF THE DRAWINGS

FIG. 3 to FIG. 5 show several examples of determining a format of a second-type slot by using a method according to an embodiment of this application;

DETAILED DESCRIPTION OF ILLUSTRATIVE EMBODIMENTS

Figures 1A, 1B:
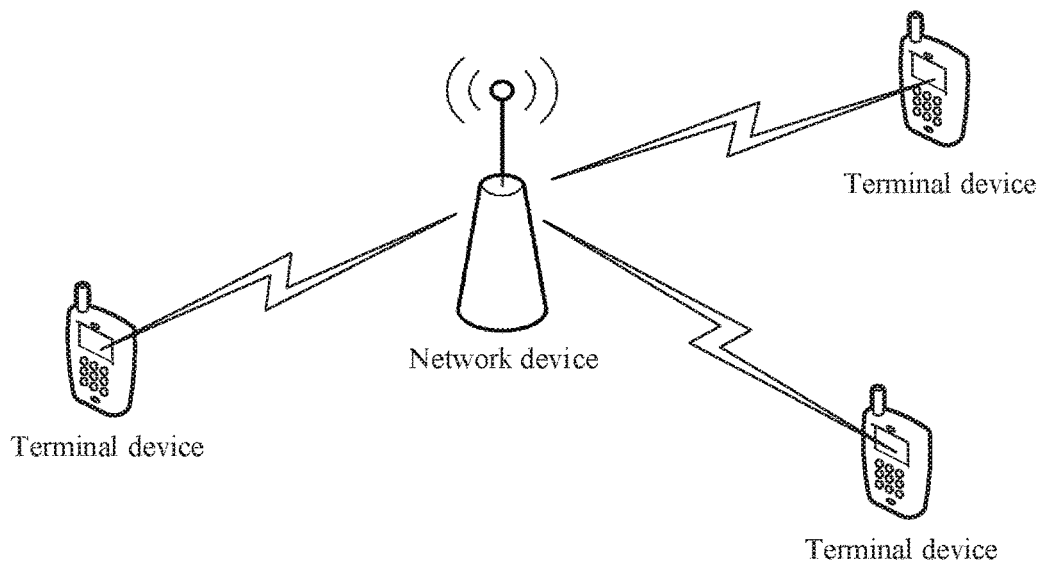
FIG. 1A is a schematic diagram of determining a format for a slot with a slot with NCP.
FIG. 1B is a schematic diagram of an application scenario according to an embodiment of this application.

To make the objectives, technical solutions, and advantages of the embodiments of this application clearer, the following further describes the embodiments of this application in detail with reference to the accompanying drawings.

The following provides explanations of some terms in the embodiments of this application to facilitate understanding of a person skilled in the art.

(1) A terminal device is a device that provides a user with voice and/or data connectivity, for example, may be a handheld device with a wireless connection function, or a processing device connected to a wireless modem. The terminal device may communicate with a core network over a radio access network (RAN), and exchange voice and/or data with the RAN. The terminal device may include user equipment (UE), a wireless terminal device, a mobile terminal device, a subscriber unit, a subscriber station, a mobile station, a remote station, an access point (AP), a remote terminal device, an access terminal device, a user terminal device, a user agent, a user device, or the like. For example, the terminal device may be a mobile phone (or referred to as a "cellular" phone), a computer with a mobile terminal device, a portable, pocket-sized, handheld, computer built-in, or vehicle-mounted mobile apparatus, or an intelligent wearable device. For example, the terminal device may be a device such as a personal communication service (PCS) phone, a cordless phone, a session initiation protocol (SIP) phone set, a wireless local loop (WLL) station, or a personal digital assistant (PDA). The terminal device may further be a limited device such as a device with relatively low power consumption, a device with a limited storage capability, or a device with a limited computing capability. For example, the terminal device includes an information sensing device such as a barcode scanner, radio frequency identification (RFID), a sensor, a global positioning system (GPS), or a laser scanner.

(2) A network device, for example, including a base station (for example, an access point), may be a device that is in an access network and that communicates with a wireless terminal device in one or more cells over an air interface. The network device may be configured to perform mutual conversion between a received over-the-air frame and an internet protocol (IP) packet, and serves as a router between the terminal device and a remaining part of the access network. The remaining part of the access network may include an IP network. The network device may further coordinate attribute management of the air interface. For example, the network device may be an evolved NodeB (NodeB, eNB or eNodeB) in a long term evolution (LTE) system or an LTE-advanced (LTE-A) system, or may be a next-generation NodeB (gNB) in a 5G NR system. This is not limited in the embodiments of this application.

In addition, in the embodiments of this application, the network device provides a service for a cell. The terminal device communicates with the network device by using a transmission resource (for example, a frequency domain resource or a spectrum resource) used in the cell. The cell may be a cell corresponding to the network device (for example, a base station). The cell may be served by a macro base station, or served by a base station corresponding to a small cell. The small cell herein may include a metro cell, a micro cell, a pico cell, a femto cell, or the like. These small cells have features such as small coverage and low transmit power, and apply to providing high-rate data transmission services.

In addition, in the LTE system or the NR system, a plurality of cells may simultaneously operate in a same frequency band of a carrier. In some special scenarios, it may be considered that concepts of the carrier and a cell are equivalent. For example, in a carrier aggregation (CA) scenario, when a secondary component carrier is configured for UE, both a carrier index of the secondary component carrier and a cell identifier (Cell ID) of a secondary cell operating on the secondary component carrier are carried. In this case, it may be considered that concepts of the carrier and the cell are equivalent. For example, that the terminal device accesses a carrier is the same as that the terminal device accesses a cell.

(3) An ECP is a type of cyclic prefix. Generally, a slot whose cyclic prefix is configured as an ECP includes 12 orthogonal frequency division multiplexing (OFDM) symbols.

An NCP is another type of cyclic prefix. A slot whose cyclic prefix is configured as an NCP includes 14 OFDM symbols. The OFDM symbol is also briefly referred to as a symbol in this specification.

Table 1 shows types of numerologies supported in the NR system, and a numerology includes a subcarrier spacing and a cyclic prefix type.

TABLE 1

| $\mu$ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

$\mu$ represents an index of the numerology, $\Delta f$ represents the subcarrier spacing, Normal represents the NCP, and Extended represents the ECP. It can be learned from Table 1 that in the NR system, when the subcarrier spacing is 15 kHz, 30 kHz, 120 kHz, or 240 kHz, a slot with NCP is supported; and when the subcarrier spacing is 60 kHz, both a slot with NCP and a slot with ECP are supported.

In this specification, for example, a first-type slot is a slot with NCP, and a second-type slot is a slot with ECP; or a first-type slot is a slot with ECP, and a second-type slot is a slot with NCP.

(4) The terms "system" and "network" may be used interchangeably in the embodiments of this application. "A plurality of" means two or more than two, and therefore, "a plurality of" may also be understood as "at least two" in the embodiments of this application. "And/or" describes an association relationship between associated objects and represents that three relationships may exist. For example, A and/or B may represent the following three cases: Only A exists, both A and B exist, and only B exists. In addition, the character "/", unless otherwise specified, generally indicates an "or" relationship between the associated objects.

In addition, unless otherwise stated, in the embodiments of this application, ordinal numbers such as "first" and "second" are intended to distinguish between a plurality of objects, and not intended to limit an order, a time sequence, a priority, or importance of the plurality of objects.

The embodiments of this application may be applied to the NR system, and may be further applied to a next-generation mobile communications system or another similar communications system.

The following describes the technical background of the embodiments of this application.

In 5th generation (5G) new radio (NR) standardization work, flexible slot structures are supported. To be specific, in one slot, all symbols may be used for uplink or downlink; or some symbols are used for uplink, and some symbols are used for downlink. The slot structure may also be understood as a slot format, or may be understood as slot format related information. Currently, higher layer signaling is used to notify a terminal device of semi-statically configured uplink (UL)/downlink (DL) resources of the terminal device. In addition to the semi-statically configured resources such as a "fixed UL" resource, a "fixed DL" resource, or a "reserved/blank" resource, other slots may be considered as "flexible resources", that is, formats of these slots may change dynamically. Currently, a slot format may be indicated to the terminal device by using the "slot format related information (SFI)" in a user equipment (UE) group common physical downlink control channel (group common PDCCH).

The group common PDCCH is transmitted in a common search space (CSS), and therefore can be received by a plurality of terminal devices. Therefore, it is considered that the group common PDCCH is a PDCCH that is valid for a group of terminal devices. Downlink control information (DCI), which is currently defined as DCI format 2_0 in the NR system, carried in the group common PDCCH is scrambled by using a specific radio network temporary identifier (RNTI) that is currently defined as an SFI-RNTI in the NR system, and the SFI-RNTI is configured by a network device for a group of terminal devices. In other words, the group of terminal devices can detect the group common PDCCH, and obtain the DCI carried in the group common PDCCH.

The network device sends the group common PDCCH, and the terminal device detects the group common PDCCH to obtain slot format indication information of one or more slots, so that the terminal device can determine uplink symbols, downlink symbols, and unknown symbols in a slot. The uplink symbol is a symbol used for uplink transmission, the downlink symbol is a symbol used for downlink transmission, and the unknown symbol may include information neither for uplink transmission nor for downlink transmission, for example, a blank resource. Currently, it is determined that one group common PDCCH may indicate a slot format of one or more slots.

The NR system may support a plurality of different subcarrier spacings. In other words, in the NR system, there may be a plurality of slot lengths. For example, for a subcarrier spacing of 15 kHz, a corresponding slot length is 1 ms; for a subcarrier spacing of 30 kHz, a corresponding slot length is 0.5 ms; for a subcarrier spacing of 60 kHz, a corresponding slot length is 0.25 ms; and for a subcarrier spacing of 120 kHz, a corresponding slot length is 0.125 ms. One slot may include at least one of an uplink symbol, a downlink symbol, and an unknown symbol. Therefore, a slot format may be one of various possible combinations of the uplink symbol, the downlink symbol, and the unknown symbol.

Table 2 shows slot formats currently supported by the NR system.

TABLE 2

| Format | \multicolumn{14}{c}{Symbol number in a slot} |
|---|---|---|---|---|---|---|---|---|---|---|---|---|---|---|

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | U | U | U | U | U | U | U |
| 46 | D | D | D | D | X | U | D | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | X | X | U | D | D | D | D | X | X | X | U |
| 50 | D | D | X | X | U | U | D | D | X | X | U | U | U | U |
| 51 | D | X | X | U | U | U | D | X | U | U | U | U | U | U |
| 52 | D | X | X | X | X | U | D | X | X | X | X | X | X | U |
| 53 | D | X | X | X | X | U | D | X | X | X | X | X | X | U |
| 54 | X | X | X | X | X | X | D | D | D | D | D | D | D | D |
| 55 | D | D | X | X | U | U | U | D | D | D | D | D | D | D |
| 56-255 | \multicolumn{14}{c}{Reserved} |

In Table 2, a value in Format represents a sequence number of a slot format, X represents an unknown symbol, D represents a downlink symbol, and U represents an uplink symbol.

The SFI is used to indicate a slot format. It may be considered that the SFI indicates a sequence number of the slot format. In this way, after obtaining the sequence number indicated by the SFI, the terminal device may determine, by querying Table 2, the slot format indicated by the SFI. Specifically, the SFI may indicate a slot format combination identity (slot format combination id). The slot format combination identity may be understood as a sequence number used to indicate a slot format included in a slot format combination. A slot format combination sequence number corresponds to a slot format combination, one slot format combination sequence number corresponds to one slot format combination, and one slot format combination includes at least one slot format. Therefore, the slot format combination sequence number may be understood as a sequence number indicating at least one slot format included in the slot format combination. For example, the sequence number of the slot format is shown in Table 2. A value in Format represents a sequence number of a slot format. For example, Table 3 shows a correspondence between a slot format combination identity and a sequence number of a slot format:

TABLE 3

| slot Format Combination Id | Slot format combination |
|---|---|
| 0 | 0 |
| 1 | 1, 2 |
| 2 | 4, 6, 8 |
| 3 | 5, 12, 30, 45 |
| ... | ... |

The SFI may indicate a slot format combination identity shown on the left side of Table 3, for example, an indicated slot format combination identity is 0, 1, or the like. In this case, the terminal device can determine, based on Table 3, a sequence number of a slot format that is specifically indicated by the SFI. For example, if the SFI indicates that a slot format combination identity is 0, the terminal device determines that the sequence number of the slot format specifically indicated by the SFI is 0, and can determine, by querying Table 2, a slot format whose sequence number is 0. Alternatively, for example, if the SFI indicates that a slot format combination identity is 1, the terminal device determines that the sequence number of the slot format specifically indicated by the SFI is 1 or 2, that is, the SFI indicates two slot formats, and the terminal device can determine, by querying Table 2, a slot format whose sequence number is 0 and a slot format whose sequence number is 1. Certainly, the correspondence between the slot format combination identity and the sequence number of the slot format may be alternatively presented in another form. Presentation in a form of a table (that is, Table 3) is merely an example. For example, when the correspondence between the slot format combination identity and the sequence number of the slot format is presented in a form of a table, the table may be referred to as an SFI table. The SFI table, for example, Table 3, is configured by using higher layer signaling, and a corresponding SFI table may be configured for each carrier or serving cell. The higher layer signaling is, for example, radio resource control (RRC) signaling.

In the NR system, a maximum bandwidth of a carrier may reach 400 MHz. However, the terminal device may not support a full bandwidth of a carrier due to a limitation on a maximum bandwidth capability of the terminal device. Therefore, if the terminal device has no carrier bandwidth capability, in other words, the terminal device cannot support a full bandwidth of a carrier, the network device cannot directly allocate a resource to the terminal device in a range of a carrier bandwidth as is done in an LTE system. Instead, there are two steps. Step 1: The network device indicates a bandwidth part (BWP) to the terminal device. Step 2: The network device allocates a resource to the terminal device in a range of the BWP.

In addition, in the NR system, it is also discussed that when each BWP is configured, a corresponding numerology is configured, and different BWPs may correspond to different numerologies, or may correspond to a same numerology, certainly. If numerologies are different, subcarrier spacings are different or cyclic prefix types are different. In this case, different numerologies may correspond to different slot formats. For example, for a subcarrier spacing of 15 kHz, a slot time length of a normal CP is 0.5 ms, and for a subcarrier spacing of 30 kHz, a slot time length of a normal CP is 0.25 ms. Further, a slot format corresponding to 15 kHz may be different from a slot format corresponding to 60 kHz.

Two cases are considered:

Case 1: There are a plurality of BWPs on one carrier, and a corresponding numerology is configured for each BWP. Numerologies configured for different BWPs may be the same or may be different. The network device uniformly configures an SFI table, for example, Table 3, for the plurality of BWPs, and configures a reference subcarrier spacing. In other words, the SFI table may be directly applied to the reference subcarrier spacing. If a subcarrier spacing changes, a slot format indicated by the SFI table also needs to correspondingly change.

For example, if the reference subcarrier spacing is 15 kHz, and a slot format combination identity indicated by SFI sent by the network device is 0, the terminal device determines, based on Table 3, that a sequence number of a slot format specifically indicated by the SFI is 0, and can determine, by querying Table 2, a format whose sequence number is 0. In addition, if a subcarrier spacing of a BWP allocated by the network device to the terminal device is 15 kHz, the terminal device determines that the slot format is a format whose sequence number is 0 shown in Table 2.

Alternatively, if a slot format combination identity indicated by SFI sent by the network device is 0, the terminal device determines, based on Table 3, that a sequence number of a slot format specifically indicated by the SFI is 0, and can determine, by querying Table 2, a format whose sequence number is 0. If a subcarrier spacing allocated by the network device to the terminal device is 30 kHz, the terminal device determines that the slot includes 28 symbols, and can determine the slot format based on the format whose sequence number is 0 shown in Table 2. The slot format is as follows:

| D | D | D | D | D | D | D | D | D | D | D | D | D | D | D | D | D | D | D | D | D | D | D | D | D | D | D | D |
|---|---|---|---|---|---|---|---|---|---|---|---|---|---|---|---|---|---|---|---|---|---|---|---|---|---|---|---|

In this case, the reference subcarrier spacing and the SFI table are configured based on a carrier or a serving cell. Therefore, for BWPs with different subcarrier spacings on one carrier, a same reference subcarrier spacing and same SFI may be used to determine a corresponding slot format. As shown in FIG. 1A, the reference subcarrier spacing is 30 kHz, a subcarrier spacing configured for a target BWP is 60 kHz, and a CP type is an NCP. In this case, for the target BWP, slot format information shown in the second row in FIG. 1A may be obtained. One symbol in a reference slot format corresponds to two symbols of a same type in the target BWP.

Case 2:

There are a plurality of BWPs on one carrier, and a corresponding numerology is configured for each BWP. Numerologies configured for different BWPs may be the same or may be different. The network device configures an SFI table for each BWP. In this case, it may be considered that the network device configures an SFI table for each BWP. Certainly, if numerologies of different BWPs are the same, SFI tables configured for these BWPs are the same. In this case, there is no need to configure a reference subcarrier spacing, and when sending SFI, the network device performs indication based on the SFI table configured for the BWP. In this case, the SFI carried in the group common PDCCH is delivered based on the BWP. That is, different BWPs have corresponding SFI. Therefore, the reference subcarrier spacing does not need to be configured.

For example, the network device needs to indicate a format of a slot in a first BWP. For an SFI table configured by the network device for the first BWP, refer to Table 3. If a slot format combination identity indicated by SFI sent by the network device is 0, the terminal device determines, based on Table 3, that a sequence number of a slot format specifically indicated by the SFI is 0, and can determine, by querying Table 2, a format whose sequence number is 0. In this case, the terminal device determines that the slot format is the format whose sequence number is 0 shown in Table 2.

In the NR system, supported formats are for two types of CPs, including an NCP and an ECP. One slot with NCP includes 14 symbols, and one slot with ECP includes 12 symbols. For example, referring to Table 1, when a subcarrier spacing is 60 kHz, the system supports both a slot with NCP and a slot with ECP.

Currently, when indicating a slot format to the terminal device, the network device indicates a format for a slot with NCP, in other words, indicates a format of a slot with 14 symbols. For example, regardless of the case 1 or the case 2, the network device always indicates the format for the slot with NCP. However, if a subcarrier spacing of a BWP configured by the network device for the terminal device is 60 kHz, a slot used by the terminal device may be a slot with NCP or a slot with ECP. If the terminal device uses a slot with ECP, the terminal device cannot determine a slot format for the slot with ECP in a current indication manner.

In view of this, the technical solutions in the embodiments of this application are provided, to determine a slot format for the slot with ECP.

FIG. 1B shows an application scenario according to an embodiment of this application. FIG. 1B includes a network device and at least one terminal device. The network device and the terminal device operate in an NR system, and the network device is, for example, a base station. The terminal device may communicate with the network device by using the NR system.

The technical solutions provided in the embodiments of the present invention are described below with reference to the accompanying drawings.

Figure 2:
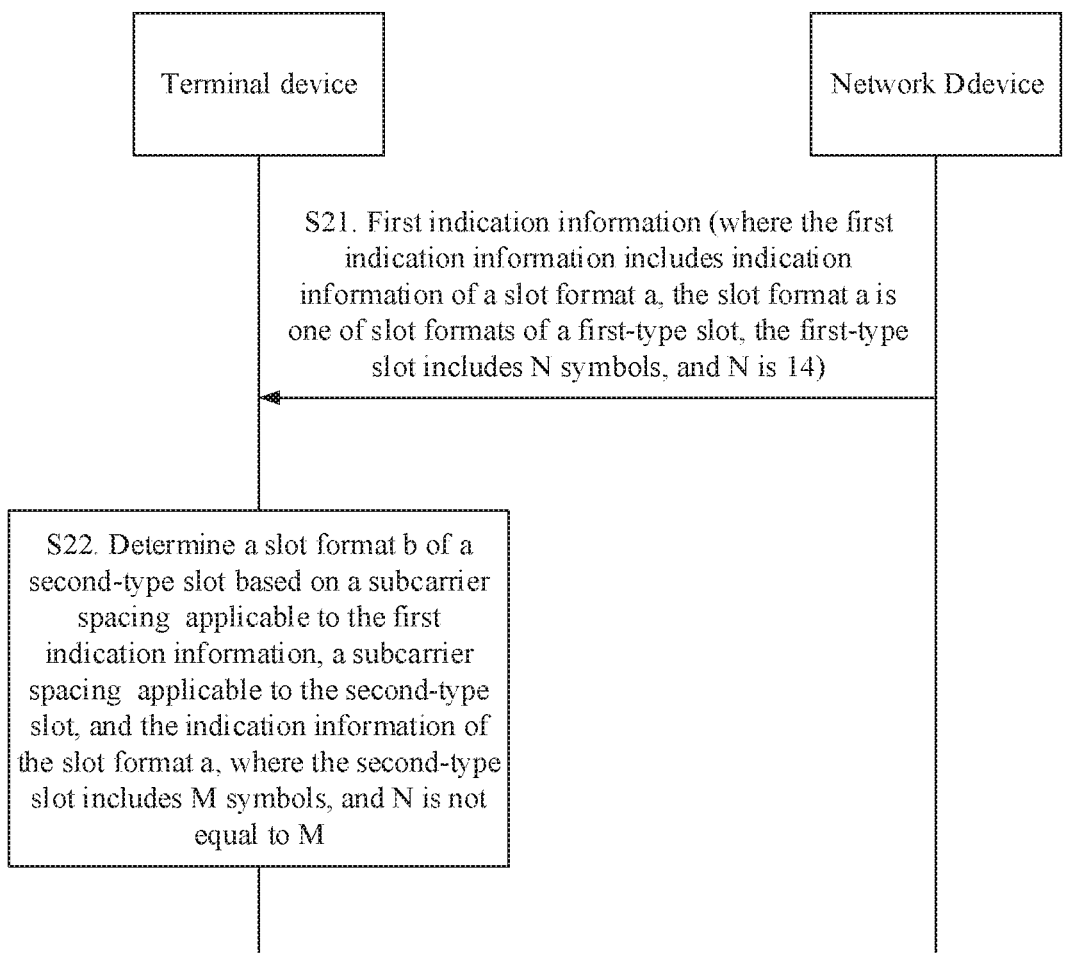
FIG. 2 is a flowchart of a method for determining a slot format according to an embodiment of this application.

Referring to FIG. 2, an embodiment of this application provides a communication method. In the following description process, an example in which the method provided in this embodiment of this application is applied to the application scenario shown in FIG. 1B is used.

S21. A network device sends first indication information, and the terminal device receives the first indication information from the network device, where the first indication information includes indication information of a slot format a, the slot format a is one of slot formats of a first-type slot, the first-type slot includes N symbols, and N is 14.

The first indication information may actually indicate one slot format of the first-type slot, or may indicate a plurality of slot formats of the first-type slot. If the first indication information indicates a plurality of slot formats of the first-type slot, it indicates that the first indication information indicates formats of a plurality of first-type slots, and the terminal device may determine a corresponding format of $2^{(\mu-\mu_a)}$ consecutive second-type slots based on a format of each of the plurality of first-type slots by using a same method. Therefore, in description of this specification, an example is used in which the terminal device determines a format b of the $2^{(\mu-\mu_a)}$ consecutive second-type slots based on one format of the first-type slot that is indicated by the first indication information. $\mu$ is an index of a numerology configured for a target BWP, and $\mu_a$ is an index of a configured reference numerology. For specific values, refer to Table 1.

For example, the network device sends a group common PDCCH, where the group common PDCCH carries SFI, and the first indication information is implemented by using, for example, the SFI. In this case, receiving the group common PDCCH by the terminal device is equivalent to receiving the SFI. The SFI includes the indication information of the slot format a. Certainly, the first indication information may be alternatively implemented in another form. For example, the network device may send dedicated first indication information. An implementation of the first indication information is not limited in this embodiment of this application.

In this embodiment of this application, the indication information of the slot format a may include one or more of the following indication information:

a quantity of downlink symbols, a quantity of uplink symbols, and a quantity of unknown symbols; or a position of a downlink symbol, a position of an uplink symbol, and a position of an unknown symbol.

Regardless of which one or more of the foregoing indication information is included, the terminal device can determine the slot format a.

For example, the first-type slot is a slot with NCP. For example, if a subcarrier spacing applicable to the SFI is 30 kHz, that is, a configured reference subcarrier spacing is 30 kHz, and a slot format combination identity indicated by the SFI sent by the network device is 0, a sequence number of a slot format specifically indicated by the SFI is 0, and a slot format whose sequence number is 0 may be determined by querying Table 2. The slot format is the slot format a, and the slot format a is applicable to a slot whose subcarrier spacing is 30 kHz. In this case, the first indication information indicates the format of the first-type slot. Alternatively, if a subcarrier spacing applicable to the SFI is 30 kHz, and a slot format combination identity indicated by the SFI sent by the network device is 1, sequence numbers of slot formats specifically indicated by the SFI are 0 and 1, and a slot format whose sequence number is 0 and a slot format whose sequence number is 1 may be determined by querying Table 2. The two slot formats are applicable to two slots whose subcarrier spacings are 30 kHz. In this case, the first indication information indicates a plurality of slot formats of the first-type slot, and the slot format a may be any one of the slot formats.

S22. The terminal device determines a slot format b of $2^{(\mu-\mu_a)}$ consecutive second-type slots based on an index $\mu_a$ of a subcarrier spacing applicable to the first indication information, an index $\mu$ of a subcarrier spacing applicable to the second-type slot, and the indication information of the slot format a, where the second-type slot includes M symbols, and N is not equal to M.

For example, if the second-type slot is a slot with ECP, N is 12. Alternatively, if a second type slot is another type other than a slot with ECP, a value of N may be different. In description of this specification, an example in which the second-type slot is a slot with ECP is mainly used, and in this case, N is 12.

A start time of the $2^{(\mu-\mu_a)}$ consecutive second-type slots is the same as a start time of a slot corresponding to the slot format a indicated by the first indication information, and total duration of the $2^{(\mu-\mu_a)}$ consecutive second-type slots is the same as duration of the slot corresponding to the slot format a indicated by the first indication information. In other words, the start time of the $2^{(\mu-\mu_a)}$ consecutive second-type slots and the start time of the slot corresponding to the slot format a indicated by the first indication information are aligned at time boundaries of the slots.

In this embodiment of this application, the network device still indicates the slot format of the first-type slot, and the terminal device may determine the slot format of the second-type slots based on the slot format of the first-type slot. For the case 1 described above, the index $\mu_a$ of the subcarrier spacing applicable to the first indication information and the index $\mu$ of the subcarrier spacing applicable to the second-type slot may be different; and for the case 2 described above, the index $\mu_a$ of the subcarrier spacing applicable to the first indication information is the same as the index $\mu$ of the subcarrier spacing applicable to the second-type slot. In consideration of this, in the case 1 and the case 2, the terminal device may determine different slot formats of the second-type slots based on a same slot format of the first-type slot. Therefore, when the slot format of the second-type slots is determined, the subcarrier spacing applicable to the first indication information and the subcarrier spacing applicable to the second-type slot also need to be considered. If the subcarrier spacing applicable to the first indication information is different from the subcarrier spacing applicable to the second-type slot, this may be understood as the case 1 described above. If the subcarrier spacing applicable to the first indication information is the same as the subcarrier spacing applicable to the second-type slot, this may be understood as the case 2 described above. For example, in the case 1, the terminal device may determine a plurality of slot formats of the second-type slots based on one format of the first-type slot, and in the case 2, the terminal device may determine one slot format of the second-type slots based on one format of the first-type slot. Therefore, regardless of the case 1 or the case 2, a quantity of second-type slots corresponding to the slot format b that is determined by the terminal device is $2^{(\mu-\mu_a)}$. Therefore, the slot format b in this embodiment of this application may be understood as an overall format of the $2^{(\mu-\mu_a)}$ consecutive second-type slots. If $2^{(\mu-\mu_a)}$ is equal to 1, the slot format b may be understood as the format of the second-type slot, namely, a format of one slot. If $2^{(\mu-\mu_a)}$ is greater than 1, the slot format b needs to be understood as an overall format of the $2^{(\mu-\mu_a)}$ consecutive second-type slots, that is, a format of a plurality of slots, and cannot be understood as a slot format of one of the second-type slots. Both $\mu_a$ and $\mu$ may be determined by querying Table 1.

The subcarrier spacing applicable to the first indication information may be understood as a subcarrier spacing applicable to Table 2 above, and the subcarrier spacing applicable to the second-type slot may be understood as a subcarrier spacing of a BWP allocated by the network device to the terminal device.

In terms of a format of a slot, there is a concept of "switching point", and switching from downlink to uplink is referred to as a switching point. For example, referring to Table 2, for a format whose sequence number is 38, one downlink (D)-to-uplink (U) switching process is included, and therefore, the format whose sequence number is 38 includes one switching point; and for a format whose sequence number is 54, two downlink (D)-to-uplink (U) switching processes are included, and therefore, the format whose sequence number 54 includes two switching points. When determining the slot format for the $2^{(\mu-\mu_a)}$ consecutive second-type slots, to be more accurate, the terminal device may further consider the number of switching points.

Specifically, the terminal device may first determine, based on the first indication information, the slot format a of the first-type slot that is indicated by the first indication information. After the slot format a of the first-type slot is determined, a manner used to determine the format of the $2^{(\mu-\mu_a)}$ consecutive second-type slots may be determined based on a quantity of switching points included in the slot format a of the first-type slot. It can be learned from Table 2 that currently, the quantity of switching points included in the slot format a of the first-type slot may be 0, 1, or 2. For example, if a slot format combination identity indicated by the SFI sent by the network device is 3, the terminal device may learn, based on Table 3, that sequence numbers of slot formats specifically indicated by the SFI are 5, 12, 30, and 45, and may determine, by querying Table 2, the slot formats whose sequence numbers are 5, 12, 30, and 45. Slots corresponding to the slot formats whose sequence numbers are 5 and 12 each include no switching point, and slots corresponding to the slot formats whose sequence numbers are 30 and 45 each include one switching point. Alternatively, if a sequence number of a slot format indicated by the SFI is 54, a slot corresponding to the slot format whose sequence number is 54 includes two switching points. However, a quantity of switching points affects a slot format. For this reason, when the slot format a of the first-type slot includes different quantities of switching points, manners of determining the format of the $2^{(\mu-\mu_a)}$ consecutive second-type slot are also different. Therefore, the following describes, in three cases, manners of determining the format of the $2^{(\mu-\mu_a)}$ consecutive second-type slots by the terminal device. In a first case, the quantity of switching points included in the slot format a of the first-type slot is 1. In a second case, the quantity of switching points included in the slot format a of the first-type slot is 2. In a third case, the quantity of switching points included in the slot format a of the first-type slot is 0.

1. First case: The quantity of switching points included in the slot format a of the first-type slot that is indicated by the first indication information is 1.

In this case, the terminal device may determine the overall format of the $2^{(\mu-\mu_a)}$ consecutive second-type slots. Because the quantity of switching points included in the slot format a of the first-type slot is 1, it indicates that the slot corresponding to the slot format a includes both uplink symbol(s) and downlink symbol(s). Therefore, the terminal device needs to determine both uplink symbol(s) included in the $2^{(\mu-\mu_a)}$ consecutive second-type slots and downlink symbol(s) included in the $2^{(\mu-\mu_a)}$ consecutive second-type slots. In this case, the terminal device can determine a quantity of uplink symbols, a quantity of downlink symbols, and a quantity of unknown symbols that are included in the $2^{(\mu-\mu_a)}$ consecutive second-type slots, to determine the overall format of the $2^{(\mu-\mu_a)}$ consecutive second-type slots.

In this embodiment of this application, the determining a slot format b of $2^{(\mu-\mu_a)}$ consecutive second-type slots based on an index $\mu_a$ of a subcarrier spacing applicable to the first indication information, an index $\mu$ of a subcarrier spacing applicable to the second-type slot, and the indication information of the slot format a may be implemented in the following manners: obtaining, based on the indication information of the slot format a and $\mu_a$, at least one of duration of downlink symbol(s) in a slot corresponding to the slot format a, duration of uplink symbol(s) in the slot corresponding to the slot format a, and duration of unknown symbol(s) in the slot corresponding to the slot format a; determining duration of one symbol in the second-type slot based on the index $\mu$ of the subcarrier spacing applicable to the second-type slot; and determining the slot format b of the $2^{(\mu-\mu_a)}$ consecutive second-type slots based on at least one of the duration DL_du of the downlink symbol(s) in the slot corresponding to the slot format a, the duration UL_du of the uplink symbol(s) in the slot corresponding to the slot format a, and the duration of the unknown symbol(s) in the slot corresponding to the slot format a, and the duration Ts_ECP of the symbol in the second-type slot. Details are described below.

Determining manner 11: In the $2^{(\mu-\mu_a)}$ consecutive second-type slots corresponding to the slot format b, when $$op1\left(\frac{DL\_du}{Ts\_ECP}\right) + op2\left(\frac{UL\_du}{Ts\_ECP}\right) < M \times 2^{(\mu-\mu_a)}, \text{ or}$$

$$op1\left(\frac{DL\_du}{Ts\_ECP}\right) = o, \text{ or } op2\left(\frac{UL\_du}{Ts\_ECP}\right) = o,$$

the quantity of downlink symbols meets $$op1\left(\frac{DL\_du}{Ts\_ECP}\right),$$

and the quantity of uplink symbols meets $$op2\left(\frac{UL\_du}{Ts\_ECP}\right).$$

In this specification, op1(*) (or op1( )) indicates one of exact division, rounding up, and rounding down, op2(*) (or op2( )) indicates one of exact division, rounding up, and rounding down, $\mu_a$ is the index of the subcarrier spacing applicable to the first indication information, and $\mu$ is the index of the subcarrier spacing applicable to the second-type slot. Similar expressions are not specifically described below.

It may be understood that, op1(*) is one of exact division, rounding up, and rounding down, and op2(*) is one of exact division, rounding up, and rounding down. Therefore, $$op1\left(\frac{DL\_du}{Ts\_ECP}\right) + op2\left(\frac{UL\_du}{Ts\_ECP}\right) < M \times 2^{(\mu-\mu_a)}.$$

Regardless of whether opt is exact division, rounding up, or rounding down, and regardless of whether op2 is exact division, rounding up, or rounding down, the calculated $$op1\left(\frac{DL\_du}{Ts\_ECP}\right) + op2\left(\frac{UL\_du}{Ts\_ECP}\right)$$

needs to be less than $M \times 2^{(\mu-\mu_a)}$.

In the determining manner 11, a manner of calculating the quantity of downlink symbols in the $2^{(\mu-\mu_a)}$ consecutive second-type slots may be:

$$\text{Quantity of downlink symbols} = op1\left(\frac{DL\_du}{Ts\_ECP}\right) \quad \text{(Formula 1)}$$

In the determining manner 11, a manner of calculating the quantity of uplink symbols in the $2^{(\mu-\mu_a)}$ consecutive second-type slots may be:

$$\text{Quantity of uplink symbols} = op2\left(\frac{UL\_du}{Ts\_ECP}\right) \quad \text{(Formula 2)}$$

For example, if both op1( ) and op2( ) represent rounding down, it may be learned that, in the $2^{(\mu-\mu_a)}$ consecutive second-type slots corresponding to the slot format b, when $$\left\lfloor\frac{DL\_du}{Ts\_ECP}\right\rfloor + \left\lfloor\frac{UL\_du}{Ts\_ECP}\right\rfloor < M \times 2^{(\mu-\mu_a)}, \text{ or}$$

$$\left\lfloor\frac{DL\_du}{Ts\_ECP}\right\rfloor = o, \text{ or } \left\lfloor\frac{UL\_du}{Ts\_ECP}\right\rfloor = o,$$

the quantity of downlink symbols meets $$\left\lfloor\frac{DL\_du}{Ts\_ECP}\right\rfloor,$$

and the quantity of uplink symbols meets $$\left\lfloor\frac{UL\_du}{Ts\_ECP}\right\rfloor.$$

Alternatively, for example, if op1( ) represents rounding down, and op2( ) represents rounding up, it may be learned that, in the $2^{(\mu-\mu_a)}$ consecutive second-type slots corresponding to the slot format b, when $$\left\lfloor\frac{DL\_du}{Ts\_ECP}\right\rfloor + \left\lceil\frac{UL\_du}{Ts\_ECP}\right\rceil < M \times 2^{(\mu-\mu_a)}, \text{ or}$$

$$\left\lfloor\frac{DL\_du}{Ts\_ECP}\right\rfloor = o, \text{ or } \left\lceil\frac{UL\_du}{Ts\_ECP}\right\rceil = o,$$

the quantity of downlink symbols meets $$\left\lfloor\frac{DL\_du}{Ts\_ECP}\right\rfloor,$$

and the quantity of uplink symbols meets $$\left\lceil\frac{UL\_du}{Ts\_ECP}\right\rceil.$$

It can be learned from Table 2 that, when the first-type slot includes one switching point, usually, downlink symbol(s) are at the beginning of the first-type slot, and uplink symbol(s) are at the end of the first-type slot. Therefore, to ensure that the first-type slot corresponding to the slot format a and the $2^{(\mu-\mu_a)}$ consecutive second-type slots are aligned in terms of time, in the $2^{(\mu-\mu_a)}$ consecutive second-type slots, it also needs to meet that downlink symbol(s) are at the beginning of the $2^{(\mu-\mu_a)}$ consecutive second-type slots, and uplink symbol(s) are at the end of the $2^{(\mu-\mu_a)}$ consecutive second-type slots.

In the determining manner 11, $$op1\left(\frac{DL\_du}{Ts\_ECP}\right) + op2\left(\frac{UL\_du}{Ts\_ECP}\right) < M \times 2^{(\mu-\mu_a)}.$$

$M \times 2^{(\mu-\mu_a)}$ represents total duration of the $2^{(\mu-\mu_a)}$ consecutive second-type slots. That is, a sum of the quantity of downlink symbols and the quantity of uplink symbols in the $2^{(\mu-\mu_a)}$ consecutive second-type slots is less than the total duration of the $2^{(\mu-\mu_a)}$ consecutive second-type slots. Therefore, the downlink symbol(s) and the uplink symbol(s) neither overlap nor are adjacent. In this case, after the quantity of downlink symbols and the quantity of uplink symbols are determined, it can be determined that positions of the downlink symbols are in the front of the $2^{(\mu-\mu_a)}$ consecutive second-type slots, in other words, that Y consecutive symbols starting from a beginning symbol of the $2^{(\mu-\mu_a)}$ consecutive second-type slots are the downlink symbols, and it can be determined that positions of the uplink symbols are at the end of the $2^{(\mu-\mu_a)}$ consecutive second-type slots, in other words, that X consecutive symbols ending with an end symbol of the $2^{(\mu-\mu_a)}$ consecutive second-type slots are the uplink symbols. For example, Y indicates the determined quantity of downlink symbols, X indicates the quantity of uplink symbols, and remaining symbols other than the downlink symbols and the uplink symbols are the unknown symbols. For example, the quantity of unknown symbols is equal to $M \times 2^{(\mu-\mu_a)}$ minus the quantity of downlink symbols in the $2^{(\mu-\mu_a)}$ consecutive second-type slots minus the quantity of uplink symbols in the $2^{(\mu-\mu_a)}$ consecutive second-type slots.

For ease of understanding, the following uses an example for description.

Figures 3, 4, 5:
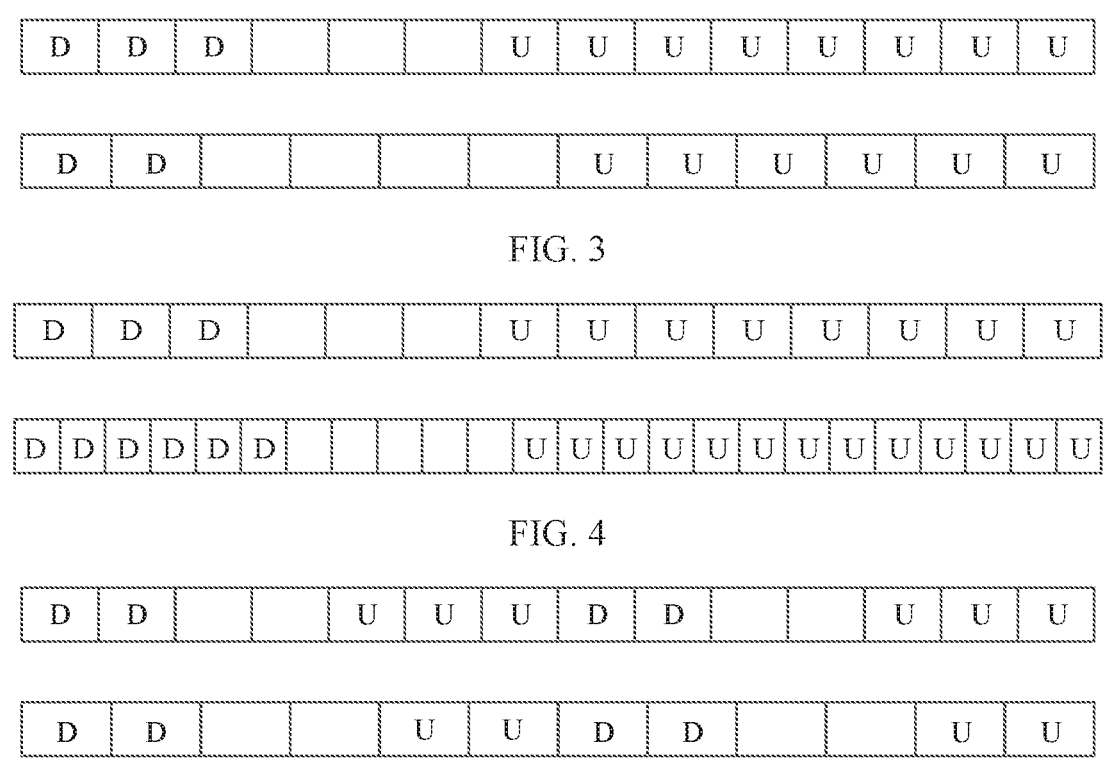

For example, referring to FIG. 3, the first row in FIG. 3 is one slot format of the first-type slot that is indicated by the SFI sent by the network device, namely, the slot format a, and the first-type slot corresponding to the slot format a includes three downlink symbols and eight uplink symbols. For example, if the subcarrier spacing applicable to the first indication information is 60 kHz, the terminal device may determine total duration DL_du of the three downlink symbols and total duration UL_du of the eight uplink symbols, and the terminal device determines that $$op1\left(\frac{DL\_du}{Ts\_ECP}\right) + op2\left(\frac{UL\_du}{Ts\_ECP}\right) < M \times 2^{(\mu-\mu_a)}.$$

Therefore, the terminal device may calculate, by using the formula 1, a quantity of downlink symbols included in the $2^{(\mu-\mu_a)}$ consecutive second-type slots, and calculate, by using the formula 2, a quantity of uplink) symbols included in the $2^{(\mu-\mu_a)}$ consecutive second-type slots. Because the subcarrier spacing applicable to the second-type slot is also 60 kHz, $2^{(\mu-\mu_a)}=1$. For example, the quantity of uplink symbols calculated by the terminal device is 6, and the quantity of downlink symbols calculated by the terminal device is 2. Therefore, the terminal device determines that in the second-type slots corresponding to the slot format b, two symbols starting from the beginning symbol of the second-type slots are downlink symbols, six symbols ending with the end symbol of the second-type slots are uplink symbols, and symbols other than the eight symbols are unknown symbols. Still referring to FIG. 3, the second row in FIG. 3 is the format of the second-type slot. In FIG. 3, D represents a downlink symbol, U represents an uplink symbol, and an unmarked symbol represents an unknown symbol.

Alternatively, for example, referring to FIG. 4, the first row in FIG. 4 is one slot format of the first-type slot that is indicated by the SFI sent by the network device, namely, the slot format a, and the first-type slot corresponding to the slot format a includes three downlink symbols and eight uplink symbols. For example, if the subcarrier spacing applicable to the first indication information is 30 kHz, the terminal device may determine total duration DL_du of the three downlink symbols and total duration UL_du of the eight uplink symbols, and the terminal device determines that $$op1\left(\frac{DL\_du}{Ts\_ECP}\right) + op2\left(\frac{UL\_du}{Ts\_ECP}\right) < M \times 2^{(\mu-\mu_a)}.$$

Therefore, the terminal device may calculate, by using the formula 1, a quantity of downlink symbols included in the $2^{(\mu-\mu_a)}$ consecutive second-type slots, and calculate, by using the formula 2, a quantity of uplink symbols included in the $2^{(\mu-\mu_a)}$ consecutive second-type slots. Because the subcarrier spacing applicable to the second-type slot is 60 kHz, $2^{(\mu-\mu_a)}=2$. For example, the quantity of uplink symbols calculated by the terminal device is 13, and the quantity of downlink symbols calculated by the terminal device is 6. Therefore, the terminal device determines that in the two determined second-type slots, six symbols starting from a beginning symbol of the first second-type slot of the two second-type slots are downlink symbols, 13 symbols ending with an end symbol of the second second-type slot of the two second-type slots are uplink symbols, and symbols other than the 19 symbols are unknown symbols. Still referring to FIG. 4, the second row in FIG. 4 is the format of the two second-type slots, namely, the slot format b. In FIG. 4, D represents a downlink symbol, U represents an uplink symbol, and an unmarked symbol represents an unknown symbol.

Determining manner 12: In the $2^{(\mu-\mu_a)}$ consecutive slots corresponding to the slot format b, when $$op1\left(\frac{DL\_du}{Ts\_ECP}\right) + op2\left(\frac{UL\_du}{Ts\_ECP}\right) = M \times 2^{(\mu-\mu_a)},$$

$$op1\left(\frac{DL\_du}{Ts\_ECP}\right) > o, \text{ and } op2\left(\frac{UL\_du}{Ts\_ECP}\right) > o,$$

the quantity of downlink symbols meets $$op1\left(\frac{DL\_du}{Ts\_ECP}\right) - 1,$$

and the quantity of uplink symbols meets $$op2\left(\frac{UL\_du}{Ts\_ECP}\right);$$

or the quantity of downlink symbols meets $$op1\left(\frac{DL\_du}{Ts\_ECP}\right),$$

and the quantity of uplink symbols meets $$op2\left(\frac{UL\_du}{Ts\_ECP}\right) - 1.$$

It may be understood that, op1(*) is one of exact division, rounding up, and rounding down, and op2(*) is one of exact division, rounding up, and rounding down. Therefore, $$op1\left(\frac{DL\_du}{Ts\_ECP}\right) + op2\left(\frac{UL\_du}{Ts\_ECP}\right) = M \times 2^{(\mu-\mu_a)}.$$

Regardless of whether op1 is exact division, rounding up, or rounding down, and regardless of whether op2 is exact division, rounding up, or rounding down, $$op1\left(\frac{DL\_du}{Ts\_ECP}\right) + op2\left(\frac{UL\_du}{Ts\_ECP}\right) = M \times 2^{(\mu-\mu_a)}$$

is calculated based on a combination of at least one of the calculation manners of op1 and op2. However, usually, if a result of $$op1\left(\frac{DL\_du}{Ts\_ECP}\right) + op2\left(\frac{UL\_du}{Ts\_ECP}\right) = M \times 2^{(\mu-\mu_a)}$$

is obtained, it indicates that op1( ) and/or op2( ) use a rounding up algorithm.

In the determining manner 12, a manner of calculating the quantity of downlink symbols in the $2^{(\mu-\mu_a)}$ consecutive second-type slots may be:

$$\text{Quantity of downlink symbols} = op1\left(\frac{DL\_du}{Ts\_ECP}\right) - 1 \quad \text{(Formula 3)}$$

A manner of calculating the quantity of uplink symbols in the $2^{(\mu-\mu_a)}$ consecutive second-type slots may be:

$$\text{Quantity of uplink symbols} = op2\left(\frac{UL\_du}{Ts\_ECP}\right) \quad \text{(Formula 4)}$$

Alternatively, in the determining manner 12, a manner of calculating the quantity of downlink symbols in the $2^{(\mu-\mu_a)}$ consecutive second-type slots may be:

$$\text{Quantity of downlink symbols} = op1\left(\frac{DL\_du}{Ts\_ECP}\right) \quad \text{(Formula 5)}$$

A manner of calculating the quantity of uplink symbols in the $2^{(\mu-\mu_a)}$ consecutive second-type slots may be:

$$\text{Quantity of uplink symbols} = op2\left(\frac{UL\_du}{Ts\_ECP}\right) - 1 \quad \text{(Formula 6)}$$

Alternatively, in the determining manner 12, a manner of calculating the quantity of downlink symbols in the $2^{(\mu-\mu_a)}$ consecutive second-type slots may be the formula 3, and a manner of calculating the quantity of uplink symbols in the $2^{(\mu-\mu_a)}$ consecutive second-type slots may be the formula 6.

For example, if both op1( ) and op2( ) use a calculation manner of rounding down, in the $2^{(\mu-\mu_a)}$ consecutive slots corresponding to the slot format b, when $$\left\lfloor\frac{DL\_du}{Ts\_ECP}\right\rfloor + \left\lfloor\frac{UL\_du}{Ts\_ECP}\right\rfloor = M \times 2^{(\mu-\mu_a)},$$

the quantity of downlink symbols meets $$\left\lfloor\frac{DL\_du}{Ts\_ECP}\right\rfloor - 1,$$

and the quantity of uplink symbols meets $$\left\lfloor\frac{UL\_du}{Ts\_ECP}\right\rfloor;$$

the quantity of downlink symbols meets $$\left\lfloor\frac{DL\_du}{Ts\_ECP}\right\rfloor,$$

and the quantity of uplink symbols meets $$\left\lfloor\frac{UL\_du}{Ts\_ECP}\right\rfloor - 1;$$

or the quantity of downlink symbols meets $$\left\lfloor\frac{DL\_du}{Ts\_ECP}\right\rfloor - 1,$$

and the quantity of uplink symbols meets $$\left\lfloor \frac{UL\_du}{Ts\_ECP} \right\rfloor - 1.$$

Therefore, if $$op1\left(\frac{DL\_du}{Ts\_ECP}\right) + op2\left(\frac{UL\_du}{Ts\_ECP}\right) = M \times 2^{(\mu-\mu_a)},$$

it indicates that if $$op1\left(\frac{DL\_du}{Ts\_ECP}\right)$$

is directly used as the quantity of downlink symbols in the $2^{(\mu-\mu_a)}$ consecutive second-type slots and $$op2\left(\frac{UL\_du}{Ts\_ECP}\right)$$

is used as the quantity of uplink symbols in the $2^{(\mu-\mu_a)}$ consecutive second-type slots, the uplink symbol(s) and the downlink symbol(s) are adjacent in the $2^{(\mu-\mu_a)}$ consecutive second-type slots. However, in a slot, when transmission switches from downlink to uplink, a corresponding switching time is required. Otherwise, the terminal device may have no time for the switching, causing a transmission error. Therefore, it can be learned with reference to Table 2 that, in a slot, when transmission switches from a downlink symbol to an uplink symbol, at least one unknown symbol needs to be included between the downlink symbol and the uplink symbol, and duration of the at least one unknown symbol can be provided as the switching time. In this case, if the downlink symbol is adjacent to the uplink symbol, it indicates that there is no switching time when transmission switches from downlink to uplink. Therefore, let the quantity of downlink symbols be $$op1\left(\frac{DL\_du}{Ts\_ECP}\right) - 1,$$

and/or let the quantity of uplink symbols be $$op2\left(\frac{UL\_du}{Ts\_ECP}\right) - 1.$$

A symbol deducted when the quantity of downlink symbols is calculated and/or a symbol deducted when the quantity of uplink symbols is calculated may be determined as the unknown symbol, thereby reserving a switching time for switching from downlink to uplink. For example, in the $2^{(\mu-\mu_a)}$ consecutive second-type slots, the quantity of unknown symbols is equal to $M \times 2^{(\mu-\mu_a)}$ minus the quantity of downlink symbols in the $2^{(\mu-\mu_a)}$ consecutive second-type slots minus the quantity of uplink symbols in the $2^{(\mu-\mu_a)}$ consecutive second-type slots.

In the determining manner 12, the quantity of downlink symbols is calculated by using the formula 3 and/or the formula 5, and the quantity of uplink symbols is calculated by using the formula 4 and/or the formula 6, thereby effectively avoiding that an uplink symbol and a downlink symbol are adjacent to each other. In this case, after the quantity of downlink symbols and the quantity of uplink symbols are determined, it can be determined that positions of the downlink symbols are at the beginning of the $2^{(\mu-\mu_a)}$ consecutive second-type slots. in other words, that Y consecutive symbols starting from a beginning symbol of the $2^{(\mu-\mu_a)}$ consecutive second-type slots are the downlink symbols, and it can be determined that positions of the uplink symbols are at the end of the $2^{(\mu-\mu_a)}$ consecutive second-type slots, in other words, that X consecutive symbols ending with an end symbol of the $2^{(\mu-\mu_a)}$ consecutive second-type slots are the uplink symbols. For example, Y indicates the determined quantity of downlink symbols, and X indicates the determined quantity of uplink symbols.

Determining manner 13: In the $2^{(\mu-\mu_a)}$ consecutive slots corresponding to the slot format b, when $$op1\left(\frac{DL\_du}{Ts\_ECP}\right) + op2\left(\frac{UL\_du}{Ts\_ECP}\right) > M \times 2^{(\mu-\mu_a)},$$

the quantity of downlink symbols meets $$M \times 2^{(\mu-\mu_a)} - op2\left(\frac{UL\_du}{Ts\_ECP}\right),$$

and the quantity of uplink symbols meets $$M \times 2^{(\mu-\mu_a)} - op1\left(\frac{DL\_du}{Ts\_ECP}\right).$$

It may be understood that, op1(*) is one of exact division, rounding up, and rounding down, and op2(*) is one of exact division, rounding up, and rounding down. Therefore, $$op1\left(\frac{DL\_du}{Ts\_ECP}\right) + op2\left(\frac{UL\_du}{Ts\_ECP}\right) > M \times 2^{(\mu-\mu_a)}.$$

Regardless of whether op1 is exact division, rounding up, or rounding down, and regardless of whether op2 is exact division, rounding up, or rounding down, $$op1\left(\frac{DL\_du}{Ts\_ECP}\right) + op2\left(\frac{UL\_du}{Ts\_ECP}\right) > M \times 2^{(\mu-\mu_a)}$$

is calculated based on a combination of at least one of the calculation manners of op1 and op2. However, usually, if a result or $$op1\left(\frac{DL\_du}{Ts\_ECP}\right) + op2\left(\frac{UL\_du}{Ts\_ECP}\right) > M \times 2^{(\mu-\mu_a)}$$

is obtained, it indicates that op1( ) and/or op2( ) use a rounding up algorithm.

In the determining manner 13, a manner of calculating the quantity of downlink symbols in the $2^{(\mu-\mu_a)}$ consecutive second-type slots may be:

$$\text{Quantity of downlink symbols} = M \times 2^{(\mu-\mu_a)} - op2\left(\frac{\text{UL\_du}}{\text{Ts\_ECP}}\right) \quad \text{(Formula 7)}$$

A manner of calculating the quantity of uplink symbols in the $2^{(\mu-\mu_a)}$ consecutive second-type slots may be:

$$\text{Quantity of uplink symbols} = M \times 2^{(\mu-\mu_a)} - op1\left(\frac{\text{DL\_du}}{\text{Ts\_ECP}}\right) \quad \text{(Formula 8)}$$

Therefore, if $$op1\left(\frac{\text{DL\_du}}{\text{Ts\_ECP}}\right) + op2\left(\frac{\text{UL\_du}}{\text{Ts\_ECP}}\right) > M \times 2^{(\mu-\mu_a)},$$

it indicates that if $$op1\left(\frac{\text{DL\_du}}{\text{Ts\_ECP}}\right)$$

is directly used as the quantity of downlink symbols in the $2^{(\mu-\mu_a)}$ consecutive second-type slots and $$op2\left(\frac{\text{UL\_du}}{\text{Ts\_ECP}}\right)$$

is used as the quantity of uplink symbols in the $2^{(\mu-\mu_a)}$ consecutive second-type slots, the uplink symbol(s) and the downlink symbol(s) may overlap in the $2^{(\mu-\mu_a)}$ consecutive second-type slots, resulting in chaos of functions of the overlapping symbols. Moreover, in a slot, when transmission switches from downlink to uplink, a corresponding switching time is required. Otherwise, the terminal device may have no time for the switching, causing a transmission error. In consideration of these factors, let the quantity of downlink symbols be $$M \times 2^{(\mu-\mu_a)} - op2\left(\frac{\text{UL\_du}}{\text{Ts\_ECP}}\right),$$

and let the quantity of uplink symbols be $$M \times 2^{(\mu-\mu_a)} - op1\left(\frac{\text{DL\_du}}{\text{Ts\_ECP}}\right).$$

Symbols other than the downlink symbols and the uplink symbols may be determined as unknown symbols. For example, the quantity of unknown symbols is equal to $M \times 2^{(\mu-\mu_a)}$ minus the quantity of downlink symbols in the $2^{(\mu-\mu_a)}$ consecutive second-type slots minus the quantity of uplink symbols in the $2^{(\mu-\mu_a)}$ consecutive second-type slots.

In the determining manner 13, the quantity of downlink symbols is calculated by using the formula 7, and the quantity of uplink symbols is calculated by using the formula 8, thereby effectively avoiding that an uplink symbol and a downlink symbol overlap. In this case, after the quantity of downlink symbols and the quantity of uplink symbols are determined, it can be determined that positions of the downlink symbols are at the beginning of the $2^{(\mu-\mu_a)}$ consecutive second-type slots, in other words, that Y consecutive symbols starting from a beginning symbol of the $2^{(\mu-\mu_a)}$ consecutive second-type slots are the downlink symbols, and it can be determined that positions of the uplink symbols are at the end of the $2^{(\mu-\mu_a)}$ consecutive second-type slots, in other words, that X consecutive symbols ending with an end symbol of the $2^{(\mu-\mu_a)}$ consecutive second-type slots are the uplink symbols. For example, Y indicates the determined quantity of downlink symbols, and X indicates the determined quantity of uplink symbols.

The foregoing describes the first case in which the quantity of switching points included in the format of the first-type slot that is indicated by the first indication information is 1. The following describes the second case in which a quantity of included switching points is different.

2. Second case: The quantity of switching points included in the format of the first-type slot that is indicated by the first indication information is 2.

In this case, the terminal device may separately determine slot formats of the $2^{(\mu-\mu_a)}$ consecutive second-type slots. For example, the terminal device divides the $2^{(\mu-\mu_a)}$ consecutive second-type slots into K1 slots and K2 slots, where the K1 slots are the first half slots of the $2^{(\mu-\mu_a)}$ consecutive second-type slots, and the K2 slots are the second half slots of the $2^{(\mu-\mu_a)}$ consecutive second-type slots; and also divides the first-type slot corresponding to the slot format a indicated by the first indication information, into two parts: a first subslot and a second subslot, where the first subslot is the first half slot of the first-type slot, and the second subslot is the second half slot of the first-type slot. The terminal device determines a slot format of the K1 slots based on the first subslot, and determines a slot format of the K2 slots based on the second subslot, to determine the slot format b of the $2^{(\mu-\mu_a)}$ consecutive second-type slots. N=14, and in this case, the first subslot includes seven symbols, and the second subslot also includes seven symbols.

In this embodiment of this application, the determining a slot format b of $2^{(\mu-\mu_a)}$ consecutive second-type slots based on a subcarrier spacing applicable to the first indication information, a subcarrier spacing applicable to the second-type slot, and the indication information of the slot format a may be implemented in the following manners: obtaining, based on the indication information of the slot format a and $\mu_a$, at least one of duration of downlink symbol(s) in the first subslot corresponding to the slot format a, duration of uplink symbol(s) in the first subslot corresponding to the slot format a, and duration of unknown symbol(s) in the first subslot corresponding to the slot format a, where the first subslot is the first half slot of the slot corresponding to the slot format a; obtaining, based on the indication information of the slot format a and $\mu_a$, at least one of duration of downlink symbol(s) in the second subslot corresponding to the slot format a, duration of uplink symbol(s) in the second subslot corresponding to the slot format a, and duration of unknown symbol(s) in the second subslot corresponding to the slot format a, where the second subslot is the second half slot of the slot corresponding to the slot format a; determining duration of one symbol in the second-type slot based on the subcarrier spacing applicable to the second-type slot;

determining a slot format b of the K1 slots based on at least one of the duration DL_du1 of the downlink symbol(s) in the first subslot corresponding to the slot format a, the duration UL_du1 of the uplink symbol(s) in the first subslot corresponding to the slot format a, and the duration of the unknown symbol(s) in the first subslot corresponding to the slot format a, and the duration Ts_ECP of the symbol in the second-type slot, where the K1 slots are the first half slots of the $2^{(\mu-\mu_a)}$ consecutive second-type slots; and determining a slot format b of the K2 slots based on at least one of the duration DL_du2 of the downlink symbol(s) in the second subslot corresponding to the slot format a, the duration UL_du2 of the uplink symbol(s) in the second subslot corresponding to the slot format a, and the duration of the unknown symbol(s) in the second subslot corresponding to the slot format a, and the duration Ts_ECP of the symbol in the second-type slot, where the K2 slots are the second half slots of the $2^{(\mu-\mu_a)}$ consecutive second-type slots. The following separately describes how to determine the slot format of the K1 slots and the slot format of the K2 slots.

A. Determine the slot format of the K1 slots. The following provides several different manners.

Determining manner A1: In the K1 slots corresponding to the slot format b, when $$op1\left(\frac{DL\_du1}{Ts\_ECP}\right) + op2\left(\frac{UL\_du1}{Ts\_ECP}\right) < \frac{1}{2}M \times 2^{(\mu-\mu_a)}, \text{ or}$$

$$op1\left(\frac{DL\_du1}{Ts\_ECP}\right) = o, \text{ or } op2\left(\frac{UL\_du1}{Ts\_ECP}\right) = o,$$

the quantity of downlink symbols meets:

$$op1\left(\frac{DL\_du1}{Ts\_ECP}\right),$$

and the quantity of uplink symbols meets $$op2\left(\frac{UL\_du1}{Ts\_ECP}\right).$$

It may be understood that, op1(*) is one of exact division, rounding up, and rounding down, and op2(*) is one of exact division, rounding up, and rounding down. Therefore, $$op1\left(\frac{DL\_du1}{Ts\_ECP}\right) + op2\left(\frac{UL\_du1}{Ts\_ECP}\right) < \frac{1}{2}M \times 2^{(\mu-\mu_a)}.$$

Regardless of whether op1 is exact division, rounding up, or rounding down, and regardless of whether op2 is exact division, rounding up, or rounding down, the calculated $$op1\left(\frac{DL\_du1}{Ts\_ECP}\right) + op2\left(\frac{UL\_du1}{Ts\_ECP}\right)$$

needs to be less than $\frac{1}{2}M \times 2^{(\mu-\mu_a)}$.

In the determining manner A1, a manner of calculating the quantity of downlink symbols in the K1 second-type slots may be:

$$\text{Quantity of downlink symbols} = op1\left(\frac{DL\_du1}{Ts\_ECP}\right) \quad \text{(Formula 9)}$$

In the determining manner A1, a manner of calculating the quantity of uplink symbols in the K1 second-type slots may be:

$$\text{Quantity of uplink symbols} = op2\left(\frac{UL\_du1}{Ts\_ECP}\right) \quad \text{(Formula 10)}$$

For example, if both op1( ) and op2( ) represent rounding down, it may be learned that, in the K1 consecutive second-type slots corresponding to the slot format b, when $$\left\lfloor\frac{DL\_du1}{Ts\_ECP}\right\rfloor + \left\lfloor\frac{UL\_du1}{Ts\_ECP}\right\rfloor < \frac{1}{2}M \times 2^{(\mu-\mu_a)}, \text{ or}$$

$$\left\lfloor\frac{DL\_du1}{Ts\_ECP}\right\rfloor = o, \text{ or } \left\lfloor\frac{UL\_du1}{Ts\_ECP}\right\rfloor = o,$$

the quantity of downlink symbols meets $$\left\lfloor\frac{DL\_du1}{Ts\_ECP}\right\rfloor,$$

and the quantity of uplink symbols meets $$\left\lfloor\frac{UL\_du1}{Ts\_ECP}\right\rfloor.$$

It can be learned from Table 2 that, when the first-type slot includes two switching points, in the first half slot included in the first-type slot, usually, a downlink symbol is located at the beginning of the first half slot, and an uplink symbol is located at the end of the first half slot. It is the same case with the second half slot. Usually, a downlink symbol is located at the beginning of the second half slot, and an uplink symbol is located at the end of the second half slot. Therefore, to ensure that the first subslot of the first-type slot corresponding to the slot format a and the K1 second-type slots are aligned in terms of time, in the K1 second-type slots, it also needs to meet that a downlink symbol is located at the beginning of the K1 second-type slots, and an uplink symbol is located at the end of the K1 second-type slots.

In the determining manner A1, $$op1\left(\frac{DL\_du1}{Ts\_ECP}\right) + op2\left(\frac{UL\_du1}{Ts\_ECP}\right) < \frac{1}{2}M \times 2^{(\mu-\mu_a)}.$$

$$\frac{1}{2}M \times 2^{(\mu-\mu_a)}$$

represents total duration of the K1 second-type slots. In other words, a sum of the quantity of downlink symbols and the quantity of uplink symbols in the K1 second-type slots is less than the total duration of the K1 second-type slots. Therefore, in the K1 slots, the downlink symbol and the uplink symbol neither overlap nor are neighboring to each other. In this case, after the quantity of downlink symbols and the quantity of uplink symbols are determined, it can be determined that positions of the downlink symbols are at the beginning of the K1 second-type slots, in other words, that Y1 symbols starting from a beginning symbol of the K1 second-type slots are the downlink symbols, and it can be determined that positions of the uplink symbols are at the end of the K1 second-type slots, in other words, that X1 consecutive symbols ending with an end symbol of the K1 second-type slots are the uplink symbols. For example, Y1 indicates the determined quantity of downlink symbols, X1 indicates the quantity of uplink symbols, and remaining symbols other than the downlink symbols and the uplink symbols are unknown symbols. For example, a quantity of the unknown symbols is equal to ½M×2$^{(\mu-\mu_a)}$ minus the quantity of downlink symbols in the K1 slots minus the quantity of uplink symbols in the K1 slots.

Determining manner A2: In the K1 slots corresponding to the slot format b, when $$op1\left(\frac{DL\_du1}{Ts\_ECP}\right) + op2\left(\frac{UL\_du1}{Ts\_ECP}\right) = \frac{1}{2}M \times 2^{(\mu-\mu_a)},$$

$$op1\left(\frac{DL\_du1}{Ts\_ECP}\right) > o, \text{ and}$$

$$op2\left(\frac{UL\_du1}{Ts\_ECP}\right) > o,$$

a quantity of downlink symbols meets $$op1\left(\frac{DL\_du1}{Ts\_ECP}\right) - 1,$$

and a quantity of uplink symbols meets $$op2\left(\frac{UL\_du1}{Ts\_ECP}\right);$$

or the quantity of downlink symbols meets $$op1\left(\frac{DL\_du1}{Ts\_ECP}\right),$$

and the quantity of uplink symbols meets $$op2\left(\frac{UL\_du1}{Ts\_ECP}\right) - 1.$$

It may be understood that, op1(*) is one of exact division, rounding up, and rounding down, and op2(*) is one of exact division, rounding up, and rounding down. Therefore, $$op1\left(\frac{DL\_du1}{Ts\_ECP}\right) + op2\left(\frac{UL\_du1}{Ts\_ECP}\right) = \frac{1}{2}M \times 2^{(\mu-\mu_a)}.$$

Regardless of whether op1 is exact division, rounding up, or rounding down, and regardless of whether op2 is exact division, rounding up, or rounding down, $$op1\left(\frac{DL\_du1}{Ts\_ECP}\right) + op2\left(\frac{UL\_du1}{Ts\_ECP}\right) = \frac{1}{2}M \times 2^{(\mu-\mu_a)}$$

is calculated based on a combination of at least one of the calculation manners of op1 and op2. However, usually, if a result of $$op1\left(\frac{DL\_du1}{Ts\_ECP}\right) + op2\left(\frac{UL\_du1}{Ts\_ECP}\right) = \frac{1}{2}M \times 2^{(\mu-\mu_a)}$$

is obtained, it indicates that op1( ) and/or op2( ) use a rounding up algorithm.

In the determining manner A2, a manner of calculating the quantity of downlink symbols in the K1 second-type slots may be:

$$\text{Quantity of downlink symbols} = op1\left(\frac{DL\_du1}{Ts\_ECP}\right) - 1 \quad \text{(Formula 11)}$$

A manner of calculating the quantity of uplink symbols in the K1 second-type slots may be:

$$\text{Quantity of uplink symbols} = op2\left(\frac{UL\_du1}{Ts\_ECP}\right) \quad \text{(Formula 12)}$$

Alternatively, in the determining manner A2, a manner of calculating the quantity of downlink symbols in the K1 second-type slots may be:

$$\text{Quantity of downlink symbols} = op1\left(\frac{DL\_du1}{Ts\_ECP}\right) \quad \text{(Formula 13)}$$

A manner of calculating the quantity of uplink symbols in the K1 second-type slots may be:

$$\text{Quantity of uplink symbols} = op2\left(\frac{UL\_du1}{Ts\_ECP}\right) - 1 \quad \text{(Formula 14)}$$

Alternatively, in the determining manner A2, a manner of calculating the quantity of downlink symbols in the K1 second-type slots may be the formula 11, and a manner of calculating the quantity of uplink symbols in the K1 second-type slots may be the formula 14.

For example, if both op1( ) and op2( ) use a calculation manner of rounding down, in the K1 slots corresponding to the slot format b, when $$\left\lfloor\frac{DL\_du1}{Ts\_ECP}\right\rfloor + \left\lfloor\frac{UL\_du1}{Ts\_ECP}\right\rfloor = \frac{1}{2}M \times 2^{(\mu-\mu_a)},$$

the quantity of downlink symbols meets $$\left\lfloor \frac{DL\_du1}{Ts\_ECP} \right\rfloor - 1,$$

and the quantity of uplink symbols meets $$\left\lfloor \frac{UL\_du1}{Ts\_ECP} \right\rfloor;$$

the quantity of downlink symbols meets $$\left\lfloor \frac{DL\_du1}{Ts\_ECP} \right\rfloor,$$

and the quantity of uplink symbols meets $$\left\lfloor \frac{UL\_du1}{Ts\_ECP} \right\rfloor - 1;$$

or the quantity of downlink symbols meets $$\left\lfloor \frac{DL\_du1}{Ts\_ECP} \right\rfloor - 1,$$

and the quantity of uplink symbols meets $$\left\lfloor \frac{UL\_du1}{Ts\_ECP} \right\rfloor - 1.$$

If $$op1\left(\frac{DL\_du1}{Ts\_ECP}\right) + op2\left(\frac{UL\_du1}{Ts\_ECP}\right) = \frac{1}{2}M \times 2^{(\mu-\mu_a)},$$

it indicates that if $$op1\left(\frac{DL\_du1}{Ts\_ECP}\right)$$

is directly used as the quantity of downlink symbols in the K1 second-type slots and $$op2\left(\frac{UL\_du1}{Ts\_ECP}\right)$$

is used as the quantity of uplink symbols in the K1 second-type slots, the uplink symbol and the downlink symbol are neighboring to each other in the K1 second-type slots. However, in a slot, when transmission switches from downlink to uplink, a corresponding switching time is required. Otherwise, the terminal device may have no time for the switching, causing a transmission error. Therefore, let the quantity of downlink symbols be $$op1\left(\frac{DL\_du1}{Ts\_ECP}\right) - 1,$$

and/or let the quantity of uplink symbols be $$op2\left(\frac{UL\_du1}{Ts\_ECP}\right) - 1.$$

A symbol deducted when the quantity of downlink symbols is calculated and/or a symbol deducted when the quantity of uplink symbols is calculated may be determined as the unknown symbol, thereby reserving a switching time for switching from downlink to uplink. For example, in the K1 slots, the quantity of unknown symbols is equal to ½M×2$^{(\mu-\mu_a)}$ minus the quantity of downlink symbols in the K1 slots minus the quantity of uplink symbols in the K1 slots.

In the determining manner A2, the quantity of downlink symbols is calculated by using the formula 11 and/or the formula 13, and the quantity of uplink symbols is calculated by using the formula 12 and/or the formula 14, thereby effectively avoiding that an uplink symbol and a downlink symbol are adjacent. In this case, after the quantity of downlink symbols and the quantity of uplink symbols are determined, it can be determined that positions of the downlink symbols are at the beginning of the K1 second-type slots, in other words, that Y1 symbols starting from a beginning symbol of the K1 second-type slots are the downlink symbols, and it can be determined that positions of the uplink symbols are at the end of the K1 second-type slots, in other words, that X1 consecutive symbols ending with an end symbol of the K1 second-type slots are the uplink symbols. For example, Y1 indicates the determined quantity of downlink symbols, and X1 indicates the determined quantity of uplink symbols.

Determining manner A3: In the K1 slots corresponding to the slot format b, when $$op1\left(\frac{DL\_du1}{Ts\_ECP}\right) + op2\left(\frac{UL\_du1}{Ts\_ECP}\right) > \frac{1}{2}M \times 2^{(\mu-\mu_a)},$$

a quantity of downlink symbols meets $$\frac{1}{2}M \times 2^{(\mu-\mu_a)} - op2\left(\frac{UL\_du1}{Ts\_ECP}\right),$$

and a quantity of uplink symbols meets $$\frac{1}{2}M \times 2^{(\mu-\mu_a)} - op1\left(\frac{DL\_du1}{Ts\_ECP}\right).$$

It may be understood that, op1(*) is one of exact division, rounding up, and rounding down, and op2(*) is one of exact division, rounding up, and rounding down. Therefore, $$op1\left(\frac{DL\_du1}{Ts\_ECP}\right) + op2\left(\frac{UL\_du1}{Ts\_ECP}\right) > \frac{1}{2}M \times 2^{(\mu-\mu_a)}.$$

Regardless of whether op1( ) is exact division, rounding up, or rounding down, and regardless of whether op2( ) is exact division, rounding up, or rounding down, $$op1\left(\frac{DL\_du1}{Ts\_ECP}\right) + op2\left(\frac{UL\_du1}{Ts\_ECP}\right) > \frac{1}{2}M \times 2^{(\mu-\mu_a)}$$

is calculated based on a combination of at least one of the calculation manners of opt and opt. However, usually, if a result of $$op1\left(\frac{DL\_du1}{Ts\_ECP}\right) + op2\left(\frac{UL\_du1}{Ts\_ECP}\right) > \frac{1}{2}M \times 2^{(\mu-\mu_a)}$$

is obtained, it indicates that op1( ) and/or op2( ) use a rounding up algorithm.

In the determining manner A3, a manner of calculating the quantity of downlink symbols in the K1 second-type slots may be:

Quantity of downlink symbols = (Formula 15)

$$\frac{1}{2}M \times 2^{(\mu-\mu_a)} - op2\left(\frac{UL\_du1}{Ts\_ECP}\right)$$

A manner of calculating the quantity of uplink symbols in the K1 second-type slots may be:

Quantity of uplink symbols = (Formula 16)

$$\frac{1}{2}M \times 2^{(\mu-\mu_a)} - op1\left(\frac{DL\_du1}{Ts\_ECP}\right)$$

it indicates that if $$op1\left(\frac{DL\_du1}{Ts\_ECP}\right)$$

is directly used as the quantity of downlink symbols in the K1 second-type slots and $$op2\left(\frac{UL\_du1}{Ts\_ECP}\right)$$

is used as the quantity of uplink symbols in the K1 second-type slots, the uplink symbol(s) and the downlink symbol(s) may overlap in the K1 second-type slots, resulting in chaos of functions of the overlapping symbols. Moreover, in a slot, when transmission switches from downlink to uplink, a corresponding switching time is required. Otherwise, the terminal device may have no time for the switching, causing a transmission error. In consideration of these factors, let the quantity of downlink symbols be $$\frac{1}{2}M \times 2^{(\mu-\mu_a)} - op2\left(\frac{UL\_du1}{Ts\_ECP}\right),$$

and let the quantity of uplink symbols be $$\frac{1}{2}M \times 2^{(\mu-\mu_a)} - op1\left(\frac{DL\_du1}{Ts\_ECP}\right).$$

Symbols other than the downlink symbols and the uplink symbols may be determined as unknown symbols. For example, a quantity of the unknown symbols is equal to ½M×2$^{(\mu-\mu_a)}$ minus the quantity of downlink symbols in the K1 slots minus the quantity of uplink symbols in the K1 slots.

In the determining manner A3, the quantity of downlink symbols is calculated by using the formula 15, and the quantity of uplink symbols is calculated by using the formula 16, thereby effectively avoiding that uplink symbol(s) and downlink symbol(s) overlap. In this case, after the quantity of downlink symbols and the quantity of uplink symbols are determined, it can be determined that positions of the downlink symbols are at the beginning of the K1 second-type slots, in other words, that Y1 symbols starting from a beginning symbol of the K1 second-type slots are the downlink symbols, and it can be determined that positions of the uplink symbols are at the end of the K1 second-type slots, in other words, that X1 consecutive symbols ending with an end symbol of the K1 second-type slots are the uplink symbols. For example, Y1 indicates the determined quantity of downlink symbols, and X1 indicates the determined quantity of uplink symbols.

The manners of determining the slot format of the K1 second-type slots are described above, and manners of determining the slot format of the K2 second-type slots are described below.

B. Determine the slot format of the K2 slots. The following provides several different manners.

Determining manner B1: In the K2 slots corresponding to the slot format b, when $$op1\left(\frac{DL\_du2}{Ts\_ECP}\right) + op2\left(\frac{UL\_du2}{Ts\_ECP}\right) < \frac{1}{2}M \times 2^{(\mu-\mu_a)}, \text{ or}$$

$$op1\left(\frac{DL\_du2}{Ts\_ECP}\right) = o, \text{ or } op2\left(\frac{UL\_du2}{Ts\_ECP}\right) = o,$$

a quantity of downlink symbols meets $$op1\left(\frac{DL\_du2}{Ts\_ECP}\right),$$

and a quantity of uplink symbols meets $$op2\left(\frac{UL\_du2}{Ts\_ECP}\right).$$

It may be understood that, op1(*) is one of exact division, rounding up, and rounding down, and op2(*) is one of exact division, rounding up, and rounding down. Therefore, $$op1\left(\frac{DL\_du2}{Ts\_ECP}\right) + op2\left(\frac{UL\_du2}{Ts\_ECP}\right) < \frac{1}{2}M \times 2^{(\mu-\mu_a)}.$$

Regardless of whether op1 is exact division, rounding up, or rounding down, and regardless of whether op2 is exact division, rounding up, or rounding down, the calculated $$op1\left(\frac{DL\_du2}{Ts\_ECP}\right) + op2\left(\frac{UL\_du2}{Ts\_ECP}\right)$$

needs to be less than $\frac{1}{2}M \times 2^{(\mu-\mu_a)}$.

In the determining manner B1, a manner of calculating the quantity of downlink symbols in the K2 second-type slots may be:

$$\text{Quantity of downlink symbols} = op1\left(\frac{DL\_du2}{Ts\_ECP}\right) \quad \text{(Formula 17)}$$

In the determining manner B1, a manner of calculating the quantity of uplink symbols in the K2 second-type slots may be:

$$\text{Quantity of uplink symbols} = op2\left(\frac{UL\_du2}{Ts\_ECP}\right) \quad \text{(Formula 18)}$$

For example, if both op1( ) and op2( ) represent rounding down, it may be learned that, in the K2 consecutive second-type slots corresponding to the slot format b, when $$\left\lfloor\frac{DL\_du2}{Ts\_ECP}\right\rfloor + \left\lfloor\frac{UL\_du2}{Ts\_ECP}\right\rfloor < \frac{1}{2}M \times 2^{(\mu-\mu_a)}, \text{ or}$$

$$\left\lfloor\frac{DL\_du2}{Ts\_ECP}\right\rfloor = o, \text{ or } \left\lfloor\frac{UL\_du2}{Ts\_ECP}\right\rfloor = o,$$

the quantity of downlink symbols meets $$\left\lfloor\frac{DL\_du2}{Ts\_ECP}\right\rfloor,$$

and the quantity of uplink symbols meets $$\left\lfloor\frac{UL\_du2}{Ts\_ECP}\right\rfloor.$$

In the determining manner B1, $$op1\left(\frac{DL\_du2}{Ts\_ECP}\right) + op2\left(\frac{UL\_du2}{Ts\_ECP}\right) < \frac{1}{2}M \times 2^{(\mu-\mu_a)}.$$

$$\frac{1}{2}M \times 2^{(\mu-\mu_a)}$$

represents total duration of the K2 second-type slots. In other words, a sum of the quantity of downlink symbols and the quantity of uplink symbols in the K2 second-type slots is less than the total duration (a total quantity of symbols) of the K2 second-type slots. Therefore, in the K2 second-type slots, the downlink symbol(s) and the uplink symbol(s) neither overlap nor are adjacent. In this case, after the quantity of downlink symbols and the quantity of uplink symbols are determined, it can be determined that positions of the downlink symbols are at the beginning of the K2 second-type slots, in other words, that Y2 symbols starting from a beginning symbol of the K2 second-type slots are the downlink symbols, and it can be determined that positions of the uplink symbols are at the end of the K2 second-type slots, in other words, that X2 consecutive symbols ending with an end symbol of the K2 second-type slots are the uplink symbols. For example, Y2 indicates the determined quantity of downlink symbols, X2 indicates the quantity of uplink symbols, and remaining symbols other than the downlink symbols and the uplink symbols are unknown symbols. For example, a quantity of the unknown symbols is equal to $\frac{1}{2}M \times 2^{(\mu-\mu_a)}$ minus the quantity of downlink symbols in the K2 slots minus the quantity of uplink symbols in the K2 slots.

Determining manner B2: In the K2 slots corresponding to the slot format b, when $$op1\left(\frac{DL\_du2}{Ts\_ECP}\right) + op2\left(\frac{UL\_du2}{Ts\_ECP}\right) = \frac{1}{2}M \times 2^{(\mu-\mu_a)},$$

$$op1\left(\frac{DL\_du2}{Ts\_ECP}\right) > o, \text{ and } op2\left(\frac{UL\_du2}{Ts\_ECP}\right) > o,$$

the quantity of downlink symbols meets:

$$op1\left(\frac{DL\_du2}{Ts\_ECP}\right) - 1,$$

and the quantity of uplink symbols meets $$op2\left(\frac{UL\_du2}{Ts\_ECP}\right);$$

or the quantity of downlink symbols meets $$op1\left(\frac{DL\_du2}{Ts\_ECP}\right),$$

and the quantity of uplink symbols meets $$op2\left(\frac{UL\_du2}{Ts\_ECP}\right) - 1.$$

It may be understood that, op1(*) is one of exact division, rounding up, and rounding down, and op2(*) is one of exact division, rounding up, and rounding down. Therefore, $$op1\left(\frac{DL\_du2}{Ts\_ECP}\right) + op2\left(\frac{UL\_du2}{Ts\_ECP}\right) = \frac{1}{2}M \times 2^{(\mu-\mu_a)}.$$

Regardless of whether op1 is exact division, rounding up, or rounding down, and regardless of whether op2 is exact division, rounding up, or rounding down, $$op1\left(\frac{DL\_du2}{Ts\_ECP}\right) + op2\left(\frac{UL\_du2}{Ts\_ECP}\right) = \frac{1}{2}M \times 2^{(\mu-\mu_a)}$$

is calculated based on a combination of at least one of the calculation manners of op1 and op2. However, usually, if a result of $$op1\left(\frac{DL\_du2}{Ts\_ECP}\right) + op2\left(\frac{UL\_du2}{Ts\_ECP}\right) = \frac{1}{2}M \times 2^{(\mu-\mu_a)}$$

is obtained, it indicates that op1( ) and/or op2( ) use a rounding up algorithm.

In the determining manner B2, a manner of calculating the quantity of downlink symbols in the K2 second-type slots may be:

$$\text{Quantity of downlink symbols} = op1\left(\frac{DL\_du2}{Ts\_ECP}\right) - 1 \quad \text{(Formula 19)}$$

A manner of calculating the quantity of uplink symbols in the K2 second-type slots may be:

$$\text{Quantity of uplink symbols} = op2\left(\frac{UL\_du2}{Ts\_ECP}\right) \quad \text{(Formula 20)}$$

Alternatively, in the determining manner B2, a manner of calculating the quantity of downlink symbols in the K2 second-type slots may be:

$$\text{Quantity of downlink symbols} = op1\left(\frac{DL\_du2}{Ts\_ECP}\right) \quad \text{(Formula 21)}$$

A manner of calculating the quantity of uplink symbols in the K2 second-type slots may be:

$$\text{Quantity of uplink symbols} = op2\left(\frac{UL\_du2}{Ts\_ECP}\right) - 1 \quad \text{(Formula 22)}$$

Alternatively, in the determining manner B2, a manner of calculating the quantity of downlink symbols in the K2 second-type slots may be the formula 19, and a manner of calculating the quantity of uplink symbols in the K2 second-type slots may be the formula 22.

For example, if both op1( ) and op2( ) use a calculation manner of rounding down, in the K2 slots corresponding to the slot format b, when $$\left\lfloor\frac{DL\_du2}{Ts\_ECP}\right\rfloor + \left\lfloor\frac{UL\_du2}{Ts\_ECP}\right\rfloor = \frac{1}{2}M \times 2^{(\mu-\mu_a)},$$

the quantity of downlink symbols meets $$\left\lfloor\frac{DL\_du2}{Ts\_ECP}\right\rfloor - 1,$$

and the quantity of uplink symbols meets $$\left\lfloor\frac{UL\_du2}{Ts\_ECP}\right\rfloor;$$

the quantity of downlink symbols meets $$\left\lfloor\frac{DL\_du2}{Ts\_ECP}\right\rfloor,$$

and the quantity of uplink symbols meets $$\left\lfloor\frac{UL\_du2}{Ts\_ECP}\right\rfloor - 1;$$

or the quantity of downlink symbols meets $$\left\lfloor\frac{DL\_du2}{Ts\_ECP}\right\rfloor - 1,$$

and the quantity of uplink symbols meets $$\left\lfloor\frac{UL\_du2}{Ts\_ECP}\right\rfloor - 1.$$

If $$op1\left(\frac{DL\_du2}{Ts\_ECP}\right) + op2\left(\frac{UL\_du2}{Ts\_ECP}\right) = \frac{1}{2}M \times 2^{(\mu-\mu_a)},$$

it indicates that if $$op1\left(\frac{DL\_du2}{Ts\_ECP}\right)$$

is directly used as the quantity of downlink symbols in the K2 second-type slots and $$op2\left(\frac{UL\_du2}{Ts\_ECP}\right)$$

is used as the quantity of uplink symbols in the K2 second-type slots, the uplink symbol(s) and the downlink symbol(s) are adjacent in the K2 second-type slots. However, in a slot, when transmission switches from downlink to uplink, a corresponding switching time is required. Otherwise, the terminal device may have no time for the switching, causing a transmission error. Therefore, let the quantity of downlink symbols be $$op1\left(\frac{DL\_du2}{Ts\_ECP}\right) - 1,$$

and/or let the quantity of uplink symbols be $$op2\left(\frac{UL\_du2}{Ts\_ECP}\right) - 1.$$

A symbol deducted when the quantity of downlink symbols is calculated and/or a symbol deducted when the quantity of uplink symbols is calculated may be determined as the unknown symbol, thereby reserving a switching time for switching from downlink to uplink. For example, in the K2 slots, the quantity of unknown symbols is equal to $\frac{1}{2}M \times 2^{(\mu-\mu_a)}$ minus the quantity of downlink symbols in the K2 slots minus the quantity of uplink symbols in the K2 slots.

In the determining manner B2, the quantity of downlink symbols is calculated by using the formula 19 and/or the formula 21, and the quantity of uplink symbols is calculated by using the formula 20 and/or the formula 22, thereby effectively avoiding that an uplink symbol and a downlink symbol are adjacent. In this case, after the quantity of downlink symbols and the quantity of uplink symbols are determined, it can be determined that positions of the downlink symbols are at the beginning of the K2 second-type slots, in other words, that Y2 symbols starting from a beginning symbol of the K2 second-type slots are the downlink symbols, and it can be determined that positions of the uplink symbols are at the end of the K2 second-type slots, in other words, that X2 consecutive symbols ending with an end symbol of the K2 second-type slots are the uplink symbols. For example, Y2 indicates the determined quantity of downlink symbols, and X2 indicates the determined quantity of uplink symbols.

Determining manner B3: In the K2 slots corresponding to the slot format b, when $$op1\left(\frac{DL\_du2}{Ts\_ECP}\right) + op2\left(\frac{UL\_du2}{Ts\_ECP}\right) > \frac{1}{2}M \times 2^{(\mu-\mu_a)},$$

the quantity of downlink symbols meets $$\frac{1}{2}M \times 2^{(\mu-\mu_a)} - op2\left(\frac{UL\_du2}{Ts\_ECP}\right),$$

and the quantity of uplink symbols meets $$\frac{1}{2}M \times 2^{(\mu-\mu_a)} - op1\left(\frac{DL\_du2}{Ts\_ECP}\right).$$

It may be understood that, op1(*) is one of exact division, rounding up, and rounding down, and op2(*) is one of exact division, rounding up, and rounding down. Therefore, $$op1\left(\frac{DL\_du2}{Ts\_ECP}\right) + op2\left(\frac{UL\_du2}{Ts\_ECP}\right) > \frac{1}{2}M \times 2^{(\mu-\mu_a)}.$$

Regardless of whether op1( ) is exact division, rounding up, or rounding down, and regardless of whether op2( ) is exact division, rounding up, or rounding down, $$op1\left(\frac{DL\_du2}{Ts\_ECP}\right) + op2\left(\frac{UL\_du2}{Ts\_ECP}\right) > \frac{1}{2}M \times 2^{(\mu-\mu_a)}$$

is calculated based on a combination of at least one of the calculation manners of op1 and op2. However, usually, if a result of $$op1\left(\frac{DL\_du2}{Ts\_ECP}\right) + op2\left(\frac{UL\_du2}{Ts\_ECP}\right) > \frac{1}{2}M \times 2^{(\mu-\mu_a)}$$

is obtained, it indicates that op1( ) and/or op2( ) use a rounding up algorithm.

In the determining manner B3, a manner of calculating the quantity of downlink symbols in the K2 second-type slots may be:

$$\text{Quantity of downlink symbols} = \frac{1}{2}M \times 2^{(\mu-\mu_a)} - op2\left(\frac{UL\_du2}{Ts\_ECP}\right) \quad \text{(Formula 23)}$$

A manner of calculating the quantity of uplink symbols in the K2 second-type slots may be:

$$\text{Quantity of uplink symbols} = \frac{1}{2}M \times 2^{(\mu-\mu_a)} - op1\left(\frac{DL\_du2}{Ts\_ECP}\right) \quad \text{(Formula 24)}$$

it indicates that if $$op1\left(\frac{DL\_du2}{Ts\_ECP}\right)$$

is directly used as the quantity of downlink symbols in the K2 second-type slots and $$op2\left(\frac{UL\_du2}{Ts\_ECP}\right)$$

is used as the quantity of uplink symbols in the K2 second-type slots, the uplink symbol and the downlink symbol may overlap in the K2 second-type slots, resulting in chaos of functions of the overlapping symbols. Moreover, in a slot, when transmission switches from downlink to uplink, a corresponding switching time is required. Otherwise, the terminal device may have no time for the switching, causing a transmission error. In consideration of this, let the quantity of downlink symbols be $$\frac{1}{2}M \times 2^{(\mu-\mu_a)} - op2\left(\frac{\text{UL\_du2}}{\text{Ts\_ECP}}\right),$$

and let the quantity of uplink symbols be $$\frac{1}{2}M \times 2^{(\mu-\mu_a)} - op1\left(\frac{\text{UL\_du2}}{\text{Ts\_ECP}}\right).$$

Symbols other than the downlink symbols and the uplink symbols may be determined as unknown symbols. For example, a quantity of the unknown symbols is equal to ½M×2$^{(\mu-\mu_a)}$ minus the quantity of downlink symbols in the K2 slots minus the quantity of uplink symbols in the K2 slots.

In the determining manner B3, the quantity of downlink symbols is calculated by using the formula 23, and the quantity of uplink symbols is calculated by using the formula 24, thereby effectively avoiding that an uplink symbol and a downlink symbol overlap. In this case, after the quantity of downlink symbols and the quantity of uplink symbols are determined, it can be determined that positions of the downlink symbols are at the beginning of the K2 second-type slots, in other words, that Y2 symbols starting from a beginning symbol of the K2 second-type slots are the downlink symbols, and it can be determined that positions of the uplink symbols are at the end of the K2 second-type slots, in other words, that X2 consecutive symbols ending with an end symbol of the K2 second-type slots are the uplink symbols. For example, Y2 indicates the determined quantity of downlink symbols, and X2 indicates the determined quantity of uplink symbols.

In the foregoing manner A, the manners of determining the slot format of the K1 slots are described, and in the foregoing manner B, the manners of determining the slot format of the K2 slots are described. If the 2$^{(\mu-\mu_a)}$ consecutive second-type slots include the K1 slots and the K2 slots, the slot format b includes the slot format of the K1 slots and the slot format of the K2 slots. When the slot format b is determined, the slot format of the K1 slots may be determined in the determining manner A1, the determining manner A2, or the determining manner A3, and the slot format of the K2 slots may be determined in the determining manner B1, the determining manner B2, or the determining manner B3. Specifically, selection of a manner of determining the slot format of the K1 slots is related to the subcarrier spacing applicable to the first indication information, the subcarrier spacing applicable to the second-type slot, and a symbol included in the first subslot, and selection of a manner of determining the slot format of the K2 slots is related to the subcarrier spacing applicable to the first indication information, the subcarrier spacing applicable to the second-type slot, and a symbol included in the second subslot. Therefore, the finally selected manner used to determine the slot format of the K1 slots may be the same as or different from the manner of determining the slot format of the K2 slots. The determining manner A1 and the determining manner B1 may be considered as a same manner, the determining manner A2 and the determining manner B2 may be considered as a same manner, and the determining manner A3 and the determining manner B3 may be considered as a same manner. For example, if the determining manner A1 is used to determine the slot format of the K1 slots, and the determining manner B1 is used to determine the slot format of the K2 slots, the manner of determining the slot format of the K1 slots is the same as the manner of determining the slot format of the K2 slots. Alternatively, if the determining manner A2 is used to determine the slot format of the K1 slots, and the determining manner B3 is used to determine the slot format of the K2 slots, the manner of determining the slot format of the K1 slots is different from the manner of determining the slot format of the K2 slots. Specifically, no limitation is imposed in this embodiment of this application.

For ease of understanding, an example is provided below for description. In the example below, the manner of determining the slot format of the K1 slots is the same as the manner of determining the slot format of the K2 slots.

For example, referring to FIG. 5, the first row in FIG. 5 schematically shows a slot format of the first-type slot that is indicated by the SFI sent by the network device, where the slot format may be understood as the slot format a. In the first-type slot corresponding to the slot format a, the first subslot includes two downlink symbols and three uplink symbols, and the second subslot also includes two downlink symbols and three uplink symbols. For example, if the subcarrier spacing applicable to the first indication information is 60 kHz, the terminal device may determine the format of the K1 slots based on the first subslot, and determine the format of the K2 slots based on the second subslot. For example, for the K1 slots, the terminal device determines total duration of the two downlink symbols included in the first subslot and total duration of the three uplink symbols included in the first subslot, and the terminal device determines that $$op1\left(\frac{\text{DL\_du1}}{\text{Ts\_ECP}}\right) + op2\left(\frac{\text{UL\_du1}}{\text{Ts\_ECP}}\right) < \frac{1}{2}M \times 2^{(\mu-\mu_a)}.$$

Therefore, the terminal device may calculate, by using the formula 9, a quantity of downlink symbols included in the K1 slots, and calculate, by using the formula 10, a quantity of uplink symbols included in the K1 slots. Because the subcarrier spacing applicable to the second-type slot is also 60 kHz, K1=0.5, and in this case, the K1 slots are the first half slots of the 2$^{(\mu-\mu_a)}$ consecutive second-type slots. For example, if the quantity of uplink symbols calculated by the terminal device is 2 and the quantity of downlink symbols is 2, the terminal device determines that in the K1 slots, Y1 symbols starting from a beginning symbol of the K1 slots are the downlink symbols, X1 symbols ending with an end symbol of the K1 slots are the uplink symbols, and symbols other than the X1 symbols and the Y1 symbols are unknown symbols. For example, X1 indicates the quantity of uplink symbols in the K1 slots, and Y1 indicates the quantity of downlink symbols in the K1 slots. It is the same case with the K2 slots, and the terminal device determines that $$op1\left(\frac{\text{DL\_du2}}{\text{Ts\_ECP}}\right) + op2\left(\frac{\text{UL\_du2}}{\text{Ts\_ECP}}\right) < \frac{1}{2}M \times 2^{(\mu-\mu_a)}.$$

Therefore, the terminal device may calculate, by using the formula 17, a quantity of downlink symbols included in the K2 slots, and calculate, by using the formula 18, a quantity of uplink symbols included in the K2 slots. Because the subcarrier spacing applicable to the second-type slot is also 60 kHz, K2=0.5, and in this case, the K2 slots are the second half slots of the $2^{(\mu-\mu_0)}$ consecutive second-type slots. For example, if the quantity of uplink symbols calculated by the terminal device is 2 and the quantity of downlink symbols calculated by the terminal device is 2, the terminal device determines that in the K2 slots, Y2 symbols starting from a beginning symbol of the K2 slots are the downlink symbols, X2 symbols ending with an end symbol of the K2 slots are the uplink symbols, and symbols other than the X2 symbols and the Y2 symbols are unknown symbols. For example, X2 indicates the quantity of uplink symbols in the K2 slots, and Y2 indicates the quantity of downlink symbols in the K2 slots. After the slot format of the K1 slots and the slot format of the K2 slots are determined, the slot format b is determined.

After determining the slot format b, the terminal device may determine to cancel configured uplink measurement signal sending at a position of a time domain resource corresponding to an unknown symbol or a downlink symbol in a slot corresponding to the slot format b; may cancel a configured operation such as downlink measurement at a position of a time domain resource corresponding to an unknown symbol or an uplink symbol in the slot corresponding to the slot format b; and may cancel a configured operation of blindly detecting a control channel at a position of a time domain resource corresponding to an unknown symbol or an uplink symbol in the slot corresponding to the slot format b.

In addition, if the slot corresponding to the slot format b includes downlink symbols, the terminal device may determine that downlink data can be received in the downlink symbols. If the slot corresponding to the slot format b includes uplink symbols, the terminal device may determine that uplink data can be received in the uplink symbols.

In this embodiment of this application, the network device may determine a format of at least one second-type slot in a same manner as the terminal device. Therefore, a determining process performed by the network device is not described in detail again.

For example, the first-type slot is a slot with NCP, and the second-type slot is a slot with ECP. Based on the technical solutions in this embodiment of this application, a slot format of the slot with ECP can be correspondingly determined based on a slot format of the slot with NCP. In this way, the network device only needs to indicate a slot format of one type of slot, and does not need to specially indicate the slot format of the slot with ECP, thereby reducing implementation complexity of the network device. In addition, the terminal device can also directly determine the slot format of the slot with ECP in an existing indication manner.

In the embodiment shown in FIG. 2, the network device indicates the slot format of the first-type slot, and the terminal device needs to re-determine the slot format of the second-type slot based on the slot format of the first-type slot.

The following further describes another method for determining a slot format. In this method, a network device can directly indicate a slot format of a second-type slot, and a terminal device can directly determine the slot format of the second-type slot based on an indication of the network device. Implementation is relatively easy.

In this embodiment, at least one slot format of the second-type slot is provided. The at least one slot format of the second-type slot may be obtained based on a slot format of a first-type slot. For example, the first-type slot includes N symbols, where N is 14; and the second-type slot includes M symbols, where M is 12. In other words, for example, the first-type slot is a slot with NCP, and the second-type slot is a slot with ECP. For the slot format of the slot with NCP, refer to Table 2. In this case, the at least one slot format of the slot with ECP in this embodiment may be obtained based on Table 2; and the slot with NCP includes 14 symbols, the slot with ECP includes 12 symbols. A manner of obtaining the slot format of the slot with ECP based on the slot format of the slot with NCP may be considered as: A slot with ECP may be obtained by removing two symbols from a slot with NCP. In other words, each of the at least one slot format of the second-type slot is obtained by removing two symbols from a corresponding slot format of the first-type slot. If a slot format of the second-type slot is obtained based on a slot format of the first-type slot, it may be understood that the two slot formats correspond to each other. In this case, there may be a plurality of different manners of removing two symbols from the slot with NCP. The manners are described below separately.

a. Manner 1

In the manner 1, two of symbols with a largest quantity may be removed from the slot with NCP. For a slot format of the second-type slot, the two removed symbols are two of symbols with a largest quantity in a corresponding slot format of the first-type slot. If the symbols with the largest quantity are one type of symbols, the two removed symbols are two of the type of symbols. For example, if the symbols with the largest quantity are symbols D, two symbols D are removed. Alternatively, if the symbols with the largest quantity are two types of symbols: first-type symbols and second-type symbols, that is, a quantity of the first-type symbols and a quantity of the second-type symbols are both largest, and are equal, two of the first-type symbols or the second-type symbols may be removed. Alternatively, one symbol may be removed from the first-type symbols and one symbol may be removed from the second-type symbols. For example, for a slot format of the first-type slot, a quantity of symbols D is equal to a quantity of symbols U, and both are greater than a quantity of symbols X. In this case, two symbols D may be removed, two symbols U may be removed, or one symbol D and one symbol U may be removed. A slot format of obtained 12 symbols is the slot format of the second-type slot.

For example, for a slot with NCP, symbols with a largest quantity in the slot with NCP are determined, and two symbols are removed from the symbols with the largest quantity. For example, referring to Table 2, for a slot with NCP whose sequence number is 7, symbols with a largest quantity are D. In this case, two symbols D may be removed, and 12 symbols obtained form a slot with ECP.

Based on Table 2, Table 4 schematically shows a slot format of a slot with ECP that is determined in the manner 1:

TABLE 4

| Format | Symbol number in a slot | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | D | D | D | D | D | D | D | D | D | D | D | D |
| 1 | U | U | U | U | U | U | U | U | U | U | U | U |

TABLE 4-continued

| Format | \multicolumn{12}{c}{Symbol number in a slot} |
| --- | --- | --- | --- | --- | --- | --- | --- | --- | --- | --- | --- | --- |
| | 0 | 1 | 2 | 3 | 4 | 5 | 6 | 7 | 8 | 9 | 10 | 11 |
| 2 | X | X | X | X | X | X | X | X | X | X | X | X |
| 3 | D | D | D | D | D | D | D | D | D | D | D | X |
| 4 | D | D | D | D | D | D | D | D | D | D | X | X |
| 5 | D | D | D | D | D | D | D | D | D | X | X | X |
| 6 | D | D | D | D | D | D | D | D | X | X | X | X |
| 7 | D | D | D | D | D | D | D | X | X | X | X | X |
| 8 | X | X | X | X | X | X | X | X | X | X | X | U |
| 9 | X | X | X | X | X | X | X | X | X | X | U | U |
| 10 | X | U | U | U | U | U | U | U | U | U | U | U |
| 11 | X | X | U | U | U | U | U | U | U | U | U | U |
| 12 | X | X | X | U | U | U | U | U | U | U | U | U |
| 13 | X | X | X | X | U | U | U | U | U | U | U | U |
| 14 | X | X | X | X | X | U | U | U | U | U | U | U |
| 15 | X | X | X | X | X | X | U | U | U | U | U | U |
| 16 | D | X | X | X | X | X | X | X | X | X | X | X |
| 17 | D | D | X | X | X | X | X | X | X | X | X | X |
| 18 | D | D | D | X | X | X | X | X | X | X | X | X |
| 19 | D | X | X | X | X | X | X | X | X | X | X | U |
| 20 | D | D | X | X | X | X | X | X | X | X | X | U |
| 21 | D | D | D | X | X | X | X | X | X | X | X | U |
| 22 | D | X | X | X | X | X | X | X | X | X | U | U |
| 23 | D | D | X | X | X | X | X | X | X | X | U | U |
| 24 | D | D | D | X | X | X | X | X | X | X | U | U |
| 25 | D | X | X | X | X | X | X | X | X | U | U | U |
| 26 | D | D | X | X | X | X | X | X | X | U | U | U |
| 27 | D | D | D | X | X | X | X | X | X | U | U | U |
| 28 | D | D | D | D | D | D | D | D | D | D | X | U |
| 29 | D | D | D | D | D | D | D | D | D | X | X | U |
| 30 | D | D | D | D | D | D | D | D | X | X | X | U |
| 31 | D | D | D | D | D | D | D | D | D | X | U | U |
| 32 | D | D | D | D | D | D | D | X | X | U | U | U |
| 33 | D | D | D | D | D | D | X | X | X | U | U | U |
| 34 | D | X | U | U | U | U | U | U | U | U | U | U |
| 35 | D | D | X | U | U | U | U | U | U | U | U | U |
| 36 | D | D | D | X | U | U | U | U | U | U | U | U |
| 37 | D | X | X | U | U | U | U | U | U | U | U | U |
| 38 | D | D | X | X | U | U | U | U | U | U | U | U |
| 39 | D | D | D | X | X | U | U | U | U | U | U | U |
| 40 | D | X | X | X | U | U | U | U | U | U | U | U |
| 41 | D | D | X | X | X | U | U | U | U | U | U | U |
| 42 | D | D | D | X | X | X | U | U | U | U | U | U |
| 43 | D | D | D | D | D | D | X | X | X | X | U | U |
| 44 | D | D | D | D | X | X | X | X | X | U | U | U |
| 44-Alt1 | D | D | D | D | D | X | X | X | X | X | U | U |
| 44-Alt2 | D | D | D | D | X | X | X | X | X | X | U | U |
| 45 | D | D | D | D | X | X | U | U | U | U | U | U |
| 45-Alt1 | D | D | D | D | D | X | X | U | U | U | U | U |
| 45-Alt2 | D | D | D | D | X | X | X | U | U | U | U | U |
| 46 | D | D | D | D | X | U | D | D | D | D | X | U |
| 47 | D | D | X | U | U | U | D | D | X | U | U | U |
| 48 | D | X | U | U | U | U | D | X | U | U | U | U |
| 49 | D | D | D | X | X | U | D | D | D | X | X | U |
| 50 | D | D | X | X | U | U | D | D | X | X | U | U |
| 51 | D | X | X | U | U | U | D | X | X | U | U | U |
| 52 | D | X | X | X | U | D | X | X | X | X | X | U |
| 53 | D | D | X | X | U | D | X | X | X | X | X | U |
| 54 | X | X | X | X | X | D | D | D | D | D | D | D |
| 54-Alt1 | X | X | X | X | X | X | D | D | D | D | D | D |
| 54-Alt2 | X | X | X | X | X | X | D | D | D | D | D | D |
| 55 | D | X | X | X | U | U | U | D | D | D | D | D |
| 55-Alt1 | D | X | X | X | U | U | U | D | D | D | D | D |
| 56-255 | \multicolumn{12}{c}{Reserved} |

In Table 4, a value in Format represents a slot format, or is understood as representing a sequence number of a slot format. A row corresponding to each sequence number is a slot format corresponding to the sequence number. X represents an unknown symbol, D represents a downlink symbol, and U represents an uplink symbol. It may be considered that Table 4 is obtained based on Table 2. In this embodiment of this application, the slot format of the slot with ECP may include at least one entry in Table 4.

b. Manner 2

In the manner 2, for a slot with NCP, a type of symbols with a largest quantity in the slot with NCP is determined, one symbol is removed from the type of symbols with the largest quantity, then a type of symbols with a largest quantity in remaining symbols in the slot with NCP is determined, and one symbol is further removed from the type of symbols with the largest quantity in the remaining symbols. In this case, for a slot format of the second-type slot, two removed symbols include one symbol of a type of symbols with a largest quantity in a corresponding slot format of the first-type slot, and one symbol of a type of symbols with a largest quantity in remaining symbols that are in the corresponding slot format of the first-type slot and that are obtained after the symbol in the type of symbols with the largest quantity is removed.

For example, referring to Table 2, for a slot with NCP whose sequence number is 7, symbols with a largest quantity are D. In this case, one symbol D may be removed. In 13 remaining symbols, symbols with a largest quantity are still D. In this case, one symbol D may be further removed. For the slot with NCP whose sequence number is 7, regardless of whether the manner 1 or the manner 2 is used, results obtained after the removal are the same, but specific removal manners are different.

Based on Table 2, Table 5 schematically shows a slot format of a slot with ECP that is determined in the manner 2:

TABLE 5

| Format | \multicolumn{12}{c}{Symbol number in a slot} |
| --- | --- | --- | --- | --- | --- | --- | --- | --- | --- | --- | --- | --- |
| | 0 | 1 | 2 | 3 | 4 | 5 | 6 | 7 | 8 | 9 | 10 | 11 |
| 0 | D | D | D | D | D | D | D | D | D | D | D | D |
| 1 | U | U | U | U | U | U | U | U | U | U | U | U |
| 2 | X | X | X | X | X | X | X | X | X | X | X | X |
| 3 | D | D | D | D | D | D | D | D | D | D | D | X |
| 4 | D | D | D | D | D | D | D | D | D | D | X | X |
| 5 | D | D | D | D | D | D | D | D | D | X | X | X |
| 6 | D | D | D | D | D | D | D | D | X | X | X | X |
| 7 | D | D | D | D | D | D | D | X | X | X | X | X |
| 8 | X | X | X | X | X | X | X | X | X | X | X | U |
| 9 | X | X | X | X | X | X | X | X | X | X | U | U |
| 10 | X | U | U | U | U | U | U | U | U | U | U | U |
| 11 | X | X | U | U | U | U | U | U | U | U | U | U |
| 12 | X | X | X | U | U | U | U | U | U | U | U | U |
| 13 | X | X | X | X | U | U | U | U | U | U | U | U |
| 14 | X | X | X | X | X | U | U | U | U | U | U | U |
| 15 | X | X | X | X | X | X | U | U | U | U | U | U |
| 16 | D | X | X | X | X | X | X | X | X | X | X | X |
| 17 | D | D | X | X | X | X | X | X | X | X | X | X |
| 18 | D | D | D | X | X | X | X | X | X | X | X | X |
| 19 | D | X | X | X | X | X | X | X | X | X | X | U |
| 20 | D | D | X | X | X | X | X | X | X | X | X | U |
| 21 | D | D | D | X | X | X | X | X | X | X | X | U |
| 22 | D | X | X | X | X | X | X | X | X | X | U | U |
| 23 | D | D | X | X | X | X | X | X | X | X | U | U |
| 24 | D | D | D | X | X | X | X | X | X | X | U | U |
| 25 | D | X | X | X | X | X | X | X | X | U | U | U |
| 26 | D | D | X | X | X | X | X | X | X | U | U | U |
| 27 | D | D | D | X | X | X | X | X | X | U | U | U |
| 28 | D | D | D | D | D | D | D | D | D | D | X | U |
| 29 | D | D | D | D | D | D | D | D | D | X | X | U |
| 30 | D | D | D | D | D | D | D | D | X | X | X | U |
| 31 | D | D | D | D | D | D | D | D | D | X | U | U |
| 32 | D | D | D | D | D | D | D | X | X | U | U | U |
| 33 | D | D | D | D | D | D | X | X | X | U | U | U |
| 34 | D | X | U | U | U | U | U | U | U | U | U | U |
| 35 | D | D | X | U | U | U | U | U | U | U | U | U |
| 36 | D | D | D | X | U | U | U | U | U | U | U | U |
| 37 | D | X | X | U | U | U | U | U | U | U | U | U |
| 38 | D | D | X | X | U | U | U | U | U | U | U | U |
| 39 | D | D | D | X | X | U | U | U | U | U | U | U |

TABLE 5-continued

| Format | \multicolumn{12}{c}{Symbol number in a slot} | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 40 | D | X | X | X | U | U | U | U | U | U | U | U |
| 41 | D | D | X | X | X | U | U | U | U | U | U | U |
| 42 | D | D | D | X | X | X | U | U | U | U | U | U |
| 43 | D | D | D | D | D | D | X | X | X | X | X | U |
| 44 | D | D | D | D | D | X | X | X | X | X | U | U |
| 45 | D | D | D | D | D | X | X | U | U | U | U | U |
| 46 | D | D | D | D | X | U | D | D | D | D | X | U |
| 47 | D | D | X | U | U | U | D | D | X | U | U | U |
| 48 | D | X | U | U | U | U | D | X | U | U | U | U |
| 49 | D | D | D | X | X | U | D | D | D | X | X | U |
| 50 | D | D | X | X | U | U | D | D | X | X | U | U |
| 51 | D | X | X | U | U | U | D | X | X | U | U | U |
| 52 | D | X | X | X | X | U | D | X | X | X | X | U |
| 53 | D | D | X | X | X | U | D | D | X | X | X | U |
| 54 | X | X | X | X | X | D | D | D | D | D | D | D |
| 55 | D | D | X | X | X | U | U | U | D | D | D | D |
| 56-255 | \multicolumn{12}{c}{Reserved} | | | | | | | | | | | |

In Table 5, a value in Format represents a slot format, or is understood as representing a sequence number of a slot format. A row corresponding to each sequence number is a slot format corresponding to the sequence number. X represents an unknown symbol, D represents a downlink symbol, and U represents an uplink symbol. It may be considered that Table 5 is obtained based on Table 2. In this embodiment of this application, the slot format of the slot with ECP may include at least one entry in Table 5.

Regardless of whether the manner 1 or the manner 2 is used, a slot with ECP is obtained by removing symbols with a relatively large quantity from a slot with NCP, and the removal from the symbols with the relatively large quantity may not greatly affect transmission.

c. Manner 3

In the manner 3, two symbols, the first symbol and the last symbol, may be removed from the slot with NCP. For a slot format of the second-type slot, the two removed symbols are the first symbol and the last symbol in a corresponding slot format of the first-type slot. The "first" and the "last" herein are described in a time sequence.

For example, for a slot with NCP, the first symbol and the last symbol in the slot with NCP are determined, and the two symbols are removed from the slot with NCP. For example, referring to Table 2, for a slot with NCP whose sequence number is 7, the first symbol is D, and the last symbol is X. In this case, the two symbols may be removed, and 12 symbols obtained form a slot with ECP.

Based on Table 2, Table 6 schematically shows a slot format of a slot with ECP that is determined in the manner 3:

TABLE 6

| Format | \multicolumn{12}{c}{Symbol number in a slot} | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | D | D | D | D | D | D | D | D | D | D | D | D |
| 1 | U | U | U | U | U | U | U | U | U | U | U | U |
| 2 | X | X | X | X | X | X | X | X | X | X | X | X |
| 3 | D | D | D | D | D | D | D | D | D | D | D | D |
| 4 | D | D | D | D | D | D | D | D | D | D | D | X |
| 5 | D | D | D | D | D | D | D | D | D | X | X | X |
| 6 | D | D | D | D | D | D | D | X | X | X | X | X |
| 7 | D | D | D | D | D | D | X | X | X | X | X | X |
| 8 | X | X | X | X | X | X | X | X | X | X | X | X |
| 9 | X | X | X | X | X | X | X | X | X | X | X | U |
| 10 | U | U | U | U | U | U | U | U | U | U | U | U |
| 11 | X | U | U | U | U | U | U | U | U | U | U | U |
| 12 | X | X | U | U | U | U | U | U | U | U | U | U |
| 13 | X | X | X | U | U | U | U | U | U | U | U | U |
| 14 | X | X | X | X | U | U | U | U | U | U | U | U |
| 15 | X | X | X | X | X | U | U | U | U | U | U | U |
| 16 | X | X | X | X | X | X | X | X | X | X | X | X |
| 17 | D | X | X | X | X | X | X | X | X | X | X | X |
| 18 | D | D | X | X | X | X | X | X | X | X | X | X |
| 19 | X | D | X | X | X | X | X | X | X | X | X | X |
| 20 | D | X | X | X | X | X | X | X | X | X | X | X |
| 21 | D | D | X | X | X | X | X | X | X | X | X | X |
| 22 | X | X | X | X | X | X | X | X | X | X | X | U |
| 23 | D | X | X | X | X | X | X | X | X | X | X | U |
| 24 | D | D | X | X | X | X | X | X | X | X | X | U |
| 25 | X | X | X | X | X | X | X | X | X | U | U | U |
| 26 | D | X | X | X | X | X | X | X | X | U | U | U |
| 27 | D | D | X | X | X | X | X | X | X | U | U | U |
| 28 | D | D | D | D | D | D | D | D | D | D | D | X |
| 29 | D | D | D | D | D | D | D | D | D | D | X | X |
| 30 | D | D | D | D | D | D | D | D | D | X | X | X |
| 31 | D | D | D | D | D | D | D | D | D | X | X | U |
| 32 | D | D | D | D | D | D | D | D | D | X | X | U |
| 33 | D | D | D | D | D | D | D | X | X | X | X | U |
| 34 | X | U | U | U | U | U | U | U | U | U | U | U |
| 35 | D | X | U | U | U | U | U | U | U | U | U | U |
| 36 | D | D | X | U | U | U | U | U | U | U | U | U |
| 37 | X | X | U | U | U | U | U | U | U | U | U | U |
| 38 | D | X | X | U | U | U | U | U | U | U | U | U |
| 39 | D | D | X | X | U | U | U | U | U | U | U | U |
| 40 | X | X | X | U | U | U | U | U | U | U | U | U |
| 41 | D | X | X | U | U | U | U | U | U | U | U | U |
| 42 | D | D | X | X | U | U | U | U | U | U | U | U |
| 43 | D | D | D | D | D | D | D | X | X | X | X | U |
| 44 | D | D | D | D | X | X | X | X | X | X | X | U |
| 45 | D | D | D | D | X | U | U | U | U | U | U | X |
| 46 | D | D | D | X | U | D | D | D | D | D | D | X |
| 47 | D | X | U | U | U | D | D | X | U | U | U | U |
| 48 | X | U | U | U | U | D | X | U | U | U | U | U |
| 49 | D | D | D | X | X | U | D | D | D | X | X | U |
| 50 | D | X | X | U | U | D | D | X | X | U | U | U |
| 51 | X | X | U | U | U | D | X | X | U | U | U | U |
| 52 | X | X | X | X | U | D | X | X | X | X | X | U |
| 53 | D | X | X | X | X | U | D | D | X | X | X | U |
| 54 | X | X | X | X | X | D | D | D | D | D | D | D |
| 55 | D | X | X | X | U | U | U | D | D | D | D | D |
| 56-255 | \multicolumn{12}{c}{Reserved} | | | | | | | | | | | |

In Table 6, a value in Format represents a slot format, or is understood as representing a sequence number of a slot format. A row corresponding to each sequence number is a slot format corresponding to the sequence number. X represents an unknown symbol, D represents a downlink symbol, and U represents an uplink symbol. It may be considered that Table 6 is obtained based on Table 2. In this embodiment of this application, the slot format of the slot with ECP may include at least one entry in Table 6.

It may be understood that symbols in a slot format of the slot with ECP and 12 symbols in the middle of a corresponding slot format of the slot with NCP, namely, the symbol 1 to the symbol 12, are of a same type and a same sequence.

d. Manner 4

In the manner 4, the last two symbols may be removed from a slot with NCP. For a slot format of the second-type slot, the two removed symbols are the last two symbols in a corresponding slot format of the first-type slot. The "last two" herein are described in a time sequence.

For example, for a slot with NCP, the last two symbols in the slot with NCP are determined, and the two symbols are removed from the slot with NCP. For example, referring to Table 2, for a slot with NCP whose sequence number is 7, the last two symbols are X. In this case, the two symbols may be removed, and 12 symbols obtained form a slot with ECP.

Based on Table 2, Table 7 schematically shows a slot format of a slot with ECP that is determined in the manner 4:

TABLE 7

| Format | \multicolumn{12}{c}{Symbol number in a slot} |
|---|---|---|---|---|---|---|---|---|---|---|---|---|

| Format | 0 | 1 | 2 | 3 | 4 | 5 | 6 | 7 | 8 | 9 | 10 | 11 |
|---|---|---|---|---|---|---|---|---|---|---|---|---|
| 0 | D | D | D | D | D | D | D | D | D | D | D | D |
| 1 | U | U | U | U | U | U | U | U | U | U | U | U |
| 2 | X | X | X | X | X | X | X | X | X | X | X | X |
| 3 | D | D | D | D | D | D | D | D | D | D | D | X |
| 4 | D | D | D | D | D | D | D | D | D | D | D | D |
| 5 | D | D | D | D | D | D | D | D | D | D | D | X |
| 6 | D | D | D | D | D | D | D | D | D | D | X | X |
| 7 | D | D | D | D | D | D | D | D | X | X | X | X |
| 8 | X | X | X | X | X | X | X | X | X | X | X | X |
| 9 | X | X | X | X | X | X | X | X | X | X | X | X |
| 10 | X | U | U | U | U | U | U | U | U | U | U | U |
| 11 | X | X | U | U | U | U | U | U | U | U | U | U |
| 12 | X | X | X | U | U | U | U | U | U | U | U | U |
| 13 | X | X | X | X | U | U | U | U | U | U | U | U |
| 14 | X | X | X | X | X | U | U | U | U | U | U | U |
| 15 | X | X | X | X | X | X | U | U | U | U | U | U |
| 16 | D | X | X | X | X | X | X | X | X | X | X | X |
| 17 | D | D | X | X | X | X | X | X | X | X | X | X |
| 18 | D | D | D | X | X | X | X | X | X | X | X | X |
| 19 | D | X | X | X | X | X | X | X | X | X | X | X |
| 20 | D | D | X | X | X | X | X | X | X | X | X | X |
| 21 | D | D | D | X | X | X | X | X | X | X | X | X |
| 22 | D | X | X | X | X | X | X | X | X | X | X | X |
| 23 | D | D | X | X | X | X | X | X | X | X | X | X |
| 24 | D | D | D | X | X | X | X | X | X | X | X | X |
| 25 | D | X | X | X | X | X | X | X | X | X | X | U |
| 26 | D | D | X | X | X | X | X | X | X | X | X | U |
| 27 | D | D | D | X | X | X | X | X | X | X | X | U |
| 28 | D | D | D | D | D | D | D | D | D | D | D | D |
| 29 | D | D | D | D | D | D | D | D | D | D | D | X |
| 30 | D | D | D | D | D | D | D | D | D | X | X | X |
| 31 | D | D | D | D | D | D | D | D | X | X | X | X |
| 32 | D | D | D | D | D | D | D | D | D | X | X | X |
| 33 | D | D | D | D | D | D | D | D | X | X | X | X |
| 34 | D | X | U | U | U | U | U | U | U | U | U | U |
| 35 | D | D | X | U | U | U | U | U | U | U | U | U |
| 36 | D | D | D | X | U | U | U | U | U | U | U | U |
| 37 | D | X | X | U | U | U | U | U | U | U | U | U |
| 38 | D | D | X | X | U | U | U | U | U | U | U | U |
| 39 | D | D | D | X | X | U | U | U | U | U | U | U |
| 40 | D | X | X | X | U | U | U | U | U | U | U | U |
| 41 | D | D | X | X | X | U | U | U | U | U | U | U |
| 42 | D | D | D | X | X | X | U | U | U | U | U | U |
| 43 | D | D | D | D | D | D | D | D | D | X | X | X |
| 44 | D | D | D | D | D | X | X | X | X | X | X | U |
| 45 | D | D | D | D | D | X | X | U | U | U | U | U |
| 46 | D | D | D | D | X | U | D | D | D | D | D | D |
| 47 | D | D | X | U | U | U | D | D | X | U | U | U |
| 48 | D | X | U | U | U | U | D | X | U | U | U | U |
| 49 | D | D | D | D | X | X | D | D | D | D | X | X |
| 50 | D | D | X | X | U | U | D | D | X | X | U | U |
| 51 | D | X | X | U | U | U | D | X | X | U | U | U |
| 52 | D | X | X | X | X | U | D | X | X | X | X | U |
| 53 | D | D | X | X | X | U | D | D | X | X | X | U |
| 54 | X | X | X | X | X | X | D | D | D | D | D | D |
| 55 | D | D | X | X | X | U | U | U | D | D | D | D |
| 56-255 | \multicolumn{12}{c}{Reserved} |

In Table 7, a value in Format represents a slot format, or is understood as representing a sequence number of a slot format. A row corresponding to each sequence number is a slot format corresponding to the sequence number. X represents an unknown symbol, D represents a downlink symbol, and U represents an uplink symbol. It may be considered that Table 7 is obtained based on Table 2. In this embodiment of this application, the slot format of the slot with ECP may include at least one entry in Table 7.

It may be understood that symbols in a slot format of the slot with ECP and the first 12 symbols in a corresponding slot format of the slot with NCP, namely, the symbol 0 to the symbol 11, are of a same type and a same sequence.

e. Manner 5

In the manner 5, the first two symbols may be removed from a slot with NCP. For a slot format of the second-type slot, the two removed symbols are the first two symbols in a corresponding slot format of the first-type slot. The "first two" herein are described in a time sequence.

For example, for a slot with NCP, the first two symbols in the slot with NCP are determined, and the two symbols are removed from the slot with NCP. For example, referring to Table 2, for a slot with NCP whose sequence number is 7, the first two symbols are D. In this case, the two symbols may be removed, and 12 symbols obtained form a slot with ECP.

Based on Table 2, Table 8 schematically shows a slot format of a slot with ECP that is determined in the manner 5:

TABLE 8

| Format | \multicolumn{12}{c}{Symbol number in a slot} |
|---|---|---|---|---|---|---|---|---|---|---|---|---|

| Format | 0 | 1 | 2 | 3 | 4 | 5 | 6 | 7 | 8 | 9 | 10 | 11 |
|---|---|---|---|---|---|---|---|---|---|---|---|---|
| 0 | D | D | D | D | D | D | D | D | D | D | D | D |
| 1 | U | U | U | U | U | U | U | U | U | U | U | U |
| 2 | X | X | X | X | X | X | X | X | X | X | X | X |
| 3 | D | D | D | D | D | D | D | D | D | D | D | X |
| 4 | D | D | D | D | D | D | D | D | D | D | X | X |
| 5 | D | D | D | D | D | D | D | D | D | X | X | X |
| 6 | D | D | D | D | D | D | D | X | X | X | X | X |
| 7 | D | D | D | D | D | D | X | X | X | X | X | X |
| 8 | X | X | X | X | X | X | X | X | X | X | X | U |
| 9 | X | X | X | X | X | X | X | X | X | X | U | U |
| 10 | U | U | U | U | U | U | U | U | U | U | U | U |
| 11 | U | U | U | U | U | U | U | U | U | U | U | U |
| 12 | X | U | U | U | U | U | U | U | U | U | U | U |
| 13 | X | X | U | U | U | U | U | U | U | U | U | U |
| 14 | X | X | X | U | U | U | U | U | U | U | U | U |
| 15 | X | X | X | X | U | U | U | U | U | U | U | U |
| 16 | X | X | X | X | X | X | X | X | X | X | X | X |
| 17 | X | X | X | X | X | X | X | X | X | X | X | X |
| 18 | D | X | X | X | X | X | X | X | X | X | X | X |
| 19 | X | X | X | X | X | X | X | X | X | X | X | U |
| 20 | X | X | X | X | X | X | X | X | X | X | X | U |
| 21 | D | X | X | X | X | X | X | X | X | X | X | U |
| 22 | X | X | X | X | X | X | X | X | X | X | U | U |
| 23 | X | X | X | X | X | X | X | X | X | X | U | U |
| 24 | D | X | X | X | X | X | X | X | X | X | U | U |
| 25 | X | X | X | X | X | X | X | X | X | U | U | U |
| 26 | X | X | X | X | X | X | X | X | U | U | U | U |
| 27 | D | X | X | X | X | X | X | X | U | U | U | U |
| 28 | D | D | D | D | D | D | D | D | D | D | X | U |
| 29 | D | D | D | D | D | D | D | D | D | X | X | U |
| 30 | D | D | D | D | D | D | D | X | X | X | U | U |
| 31 | D | D | D | D | D | D | D | D | X | U | U | U |
| 32 | D | D | D | D | D | D | D | D | X | X | U | U |
| 33 | D | D | D | D | D | D | D | X | X | X | U | U |
| 34 | U | U | U | U | U | U | U | U | U | U | U | U |
| 35 | X | U | U | U | U | U | U | U | U | U | U | U |
| 36 | D | X | U | U | U | U | U | U | U | U | U | U |
| 37 | X | U | U | U | U | U | U | U | U | U | U | U |
| 38 | X | X | U | U | U | U | U | U | U | U | U | U |
| 39 | D | X | X | U | U | U | U | U | U | U | U | U |
| 40 | X | X | U | U | U | U | U | U | U | U | U | U |
| 41 | X | X | X | U | U | U | U | U | U | U | U | U |
| 42 | D | X | X | X | U | U | U | U | U | U | U | U |
| 43 | D | D | D | D | D | X | X | X | X | U | U | U |
| 44 | D | D | D | X | X | X | X | X | X | U | U | U |
| 45 | D | D | D | X | X | U | U | U | U | U | U | U |
| 46 | D | D | D | X | U | D | D | D | D | D | X | U |

TABLE 8-continued

| | Symbol number in a slot | | | | | | | | | | | |
|---|---|---|---|---|---|---|---|---|---|---|---|---|
| Format | 0 | 1 | 2 | 3 | 4 | 5 | 6 | 7 | 8 | 9 | 10 | 11 |
| 47 | X | U | U | U | U | D | D | X | U | U | U | U |
| 48 | U | U | U | U | U | D | X | U | U | U | U | U |
| 49 | D | D | X | X | U | D | D | D | D | X | X | U |
| 50 | X | X | U | U | U | D | D | X | X | U | U | U |
| 51 | X | U | U | U | U | D | X | X | U | U | U | U |
| 52 | X | X | X | X | U | D | X | X | X | X | X | U |
| 53 | X | X | X | X | U | D | D | X | X | X | X | U |
| 54 | X | X | X | X | X | D | D | D | D | D | D | D |
| 55 | X | X | X | U | U | U | D | D | D | D | D | D |
| 56-255 | Reserved | | | | | | | | | | | |

In Table 8, a value in Format represents a slot format, or is understood as representing a sequence number of a slot format. A row corresponding to each sequence number is a slot format corresponding to the sequence number. X represents an unknown symbol, D represents a downlink symbol, and U represents an uplink symbol. It may be considered that Table 8 is obtained based on Table 2. In this embodiment of this application, the slot format of the slot with ECP may include at least one entry in Table 8.

It may be understood that symbols in a slot format of the slot with ECP and the last 12 symbols in a corresponding slot format of the slot with NCP, namely, the symbol 2 to the symbol 13, are of a same type and a same sequence.

f. Manner 6

In the manner 6, two symbols may be randomly removed from a slot with NCP. For a slot format of the second-type slot, the two removed symbols are two random symbols in a corresponding slot format of the first-type slot.

For example, referring to Table 2, for a slot with NCP whose sequence number is 7, two symbols are randomly removed, and if the fourth symbol D and the eleventh symbol X are removed, 12 symbols obtained form a slot with ECP.

The foregoing several manners of obtaining a slot with ECP based on a slot with NCP are merely examples, and are not limited in this embodiment. Any manner in which a slot with ECP can be obtained based on a slot with NCP falls within the protection scope of this embodiment of this application.

g. Manner 7

A first-type slot specific to the manner 7 is a slot formed by two symmetric half slots each having seven symbols. For example, for a slot format whose sequence number is 46 in Table 2, a format of the first seven symbols is the same as a format of the last seven symbols, and the manner 7 is specific to such type of slot.

In the manner 7, such type of slot may be processed per half slot.

For example, the last symbol in each half slot is removed. It may be understood as that, two removed symbols include the last symbol in the first half slot and the last symbol in the second half slot in a slot format of the first-type slot. For example, for a slot format whose sequence number is 46 in Table 2, the sixth symbol U and the thirteenth symbol U are removed, and a slot format of a slot having 12 symbols obtained is a slot format of a slot with ECP.

Based on Table 2, Table 9 schematically shows a slot format of a slot with ECP that is determined in the manner 7:

TABLE 9

| | Symbol number in a slot | | | | | | | | | | | |
|---|---|---|---|---|---|---|---|---|---|---|---|---|
| Format | 0 | 1 | 2 | 3 | 4 | 5 | 6 | 7 | 8 | 9 | 10 | 11 |
| 46 | D | D | D | D | D | X | D | D | D | D | D | X |
| 47 | D | D | X | U | U | U | D | D | X | U | U | U |
| 48 | D | X | U | U | U | U | D | X | U | U | U | U |
| 49 | D | D | D | D | X | X | D | D | D | D | X | X |
| 50 | D | D | X | X | U | U | D | D | X | X | U | U |
| 51 | D | X | X | U | U | U | D | X | X | U | U | U |
| 52 | D | X | X | X | X | X | D | X | X | X | X | X |
| 53 | D | D | X | X | X | X | D | D | X | X | X | X |

In Table 9, a value in Format represents a slot format, or is understood as representing a sequence number of a slot format. A row corresponding to each sequence number is a slot format corresponding to the sequence number. X represents an unknown symbol, D represents a downlink symbol, and U represents an uplink symbol. It may be considered that Table 9 is obtained based on Table 2. In this embodiment of this application, the slot format of the slot with ECP may include at least one entry in Table 9.

It may be understood that in a slot format of a slot with ECP formed by symmetric half slots and in a corresponding slot format of a slot with NCP, the symbol 0 to the symbol 5 and the symbol 7 to the symbol 12 are of a same type and a same sequence. Other slot formats of the slot with ECP may be determined with reference to any one of the foregoing manners.

h. Manner 8

A first-type slot specific to the manner 8 is a slot formed by two symmetric half slots each having seven symbols. For example, for a slot format whose sequence number is 46 in Table 2, a format of the first seven symbols is the same as a format of the last seven symbols, and the manner 8 is specific to such type of slot.

In the manner 8, such type of slot may be processed per half slot.

For example, the first symbol in each half slot is removed. It may be understood as that, two removed symbols include the first symbol in the first half slot and the first symbol in the second half slot in a slot format of the first-type slot. For example, for a slot format whose sequence number is 46 in Table 2, the zeroth symbol D and the eighth symbol D are removed, and a slot format of a slot having 12 symbols obtained is a slot format of a slot with ECP.

Based on Table 2, Table 10 schematically shows a slot format of a slot with ECP that is determined in the manner 8:

TABLE 10

| | Symbol number in a slot | | | | | | | | | | | |
|---|---|---|---|---|---|---|---|---|---|---|---|---|
| Format | 0 | 1 | 2 | 3 | 4 | 5 | 6 | 7 | 8 | 9 | 10 | 11 |
| 46 | D | D | D | D | X | U | D | D | D | D | X | U |
| 47 | D | X | U | U | U | U | D | X | U | U | U | U |
| 48 | X | U | U | U | U | U | X | U | U | U | U | U |
| 49 | D | D | D | X | X | U | D | D | D | X | X | U |
| 50 | D | X | X | U | U | U | D | X | X | U | U | U |
| 51 | X | X | U | U | U | X | X | U | U | U | U | U |
| 52 | X | X | X | X | X | U | X | X | X | X | X | U |
| 53 | D | X | X | X | X | U | D | X | X | X | X | U |

In Table 10, a value in Format represents a slot format, or is understood as representing a sequence number of a slot format. A row corresponding to each sequence number is a slot format corresponding to the sequence number. X represents an unknown symbol, D represents a downlink symbol, and U represents an uplink symbol. It may be considered that Table 10 is obtained based on Table 2. In this embodiment of this application, the slot format of the slot with ECP may include at least one entry in Table 10.

It may be understood that in a slot format of a slot with ECP formed by symmetric half slots and in a corresponding slot format of a slot with NCP, the symbol 1 to the symbol 6 and the symbol 8 to the symbol 13 are of a same type and a same sequence. Other slot formats of the slot with ECP may be determined with reference to any one of the foregoing manners.

i. Manner 9

A first-type slot specific to the manner 9 is still a slot formed by two symmetric half slots having seven symbols. For example, for a slot format whose sequence number is 46 in Table 2, a format of the first seven symbols is the same as a format of the last seven symbols, and the manner 9 is specific to such type of slot.

In the manner 9, such type of slot may be processed per half slot.

For example, one symbol of a type of symbols with a largest quantity in each half slot is removed. It may be understood as that, two removed symbols include one symbol of a type of symbols with a largest quantity in the first half slot and one symbol of a type of symbols with a largest quantity in the second half slot in a slot format of the first-type slot. For example, for a slot format whose sequence number is 46 in Table 2, a type of symbols with a largest quantity in the first half slot are symbols D, and one symbol D is removed from the type of symbols; and a type of symbols with a largest quantity in the second half slot are also symbols D, and one symbol D is removed from the type of symbols. In this case, a slot format of a slot having 12 symbols obtained is a slot format of a slot with ECP.

Based on Table 2, Table 11 schematically shows a slot format of a slot with ECP that is determined in the manner 9:

TABLE 11

| | Symbol number in a slot | | | | | | | | | | | |
|---|---|---|---|---|---|---|---|---|---|---|---|---|
| Format | 0 | 1 | 2 | 3 | 4 | 5 | 6 | 7 | 8 | 9 | 10 | 11 |
| 46 | D | D | D | D | X | U | D | D | D | D | X | U |
| 47 | D | D | X | U | U | U | D | D | X | U | U | U |
| 48 | D | X | U | U | U | U | D | X | U | U | U | U |
| 49 | D | D | D | X | X | U | D | D | D | X | X | U |
| 50 | D | D | X | X | U | U | D | D | X | X | U | U |
| 51 | D | X | X | U | U | U | D | X | X | U | U | U |
| 52 | D | X | X | X | U | U | D | X | X | X | U | U |
| 53 | D | D | X | X | X | U | D | D | X | X | X | U |

In Table 11, a value in Format represents a slot format, or is understood as representing a sequence number of a slot format. A row corresponding to each sequence number is a slot format corresponding to the sequence number. X represents an unknown symbol, D represents a downlink symbol, and U represents an uplink symbol. It may be considered that Table 11 is obtained based on Table 2. In this embodiment of this application, the slot format of the slot with ECP may include at least one entry in Table 11.

In Table 2, a slot format of a slot formed by two symmetric half slots each having seven symbols includes a slot format whose sequence number is 46 to 53. Therefore, Table 9 to Table 11 include slot formats of only these sequence numbers.

In this embodiment, Table 4 to Table 11 may be eight independent tables, and at least one slot format of the second-type slot applied to the network device and the terminal device may be one or more entries of one of Table 4 to Table 11, or may be one or more entries of each of a plurality of tables in Table 4 to Table 11. Then, if the at least one slot format includes one or more entries of each of a plurality of tables in Table 4 to Table 11, and sequence numbers are independently set in the plurality of tables, for example, if sequence numbers are set starting from 0 in each table, that the first indication information indicates the slot format b may be understood as: in addition to indicating a sequence number of the slot format b, the first indication information further needs to indicate a table to which the slot format b belongs. Alternatively, the plurality of tables in Table 4 to Table 11 are applied, and sequence numbers are centrally set in the plurality of tables, for example, if sequence numbers starting from 0 are set in the first table, for example, the first table includes sequence numbers 0 to 255, sequence numbers starting from 256 may be set in the second table, and the rest may be deduced by analogy. In this case, the first indication information directly indicates a sequence number of the slot format b, and does not need to indicate a specific table.

Alternatively, one or more entries included in a plurality of tables in Table 4 to Table 11 may form a new table. Sequence numbers starting from 0 may be set in the new table. If at least one slot format of the second-type slot applied to the network device and the terminal device is the new table, the first indication information directly indicates a sequence number of the slot format b, and does not need to indicate a specific table.

For example, if the slot format b is one slot format of the second-type slot that is determined in any one of the manner 1 to the manner 9, it can be learned from the manner 1 to the manner 9 described above that the slot format b provided in this embodiment of this application includes 12 symbols, types of the 12 symbols are the same as types of 12 symbols in the slot format a of the first-type slot. For example, if the 12 symbols included in the slot format b include eight symbols D, two symbols X, and two symbols U, the slot format a also includes eight symbols D, two symbols X, and two symbols U, and a time sequence of the 12 symbols included in the slot format b is also the same as a time sequence of the 12 symbols included in the slot format a. For example, if in the slot format b, the time sequence of the 12 symbols is D, D, D, D, X, U, D, D, D, D, X, and U, in the slot format a, the time sequence of the 12 symbols is also D, D, D, D, X, U, D, D, D, D, X, and U. In addition, the slot format a includes another two symbols in addition to the 12 symbols. After the two symbols are removed from the slot format a in any one of the manner 1 to manner 9 described above, the slot format b is obtained.

Based on Table 2, if the at least one slot format of the second-type slot is obtained in the manner 1, the manner 2, the manner 3, the manner 5, the manner 6, the manner 7, the manner 8, or the manner 9, when different entries in Table 2 are processed, the same processing manner may be used. For example, the manner 3 is used. Alternatively, different manners may be used for different entries. For example, an entry whose sequence number is 6 in Table 2 may be processed in the manner 3, an entry whose sequence number is 7 in Table 2 may be processed in the manner 4, an entry whose sequence number is 46 in Table 2 may be processed in the manner 8, and so on. In other words, the at least one slot format of the second-type slot in this embodiment of this application may be obtained in one of the foregoing manners, or may be obtained in a plurality of the foregoing manners. Therefore, one of the at least one slot format of the second-type slot, for example, the slot format b, may be a slot format obtained in the manner 1, the manner 2, the manner 3, the manner 4, the manner 5, the manner 6, the manner 7, the manner 8, or the manner 9. For example, the slot format b is any entry in Table 4 to Table 11.

Figure 6:
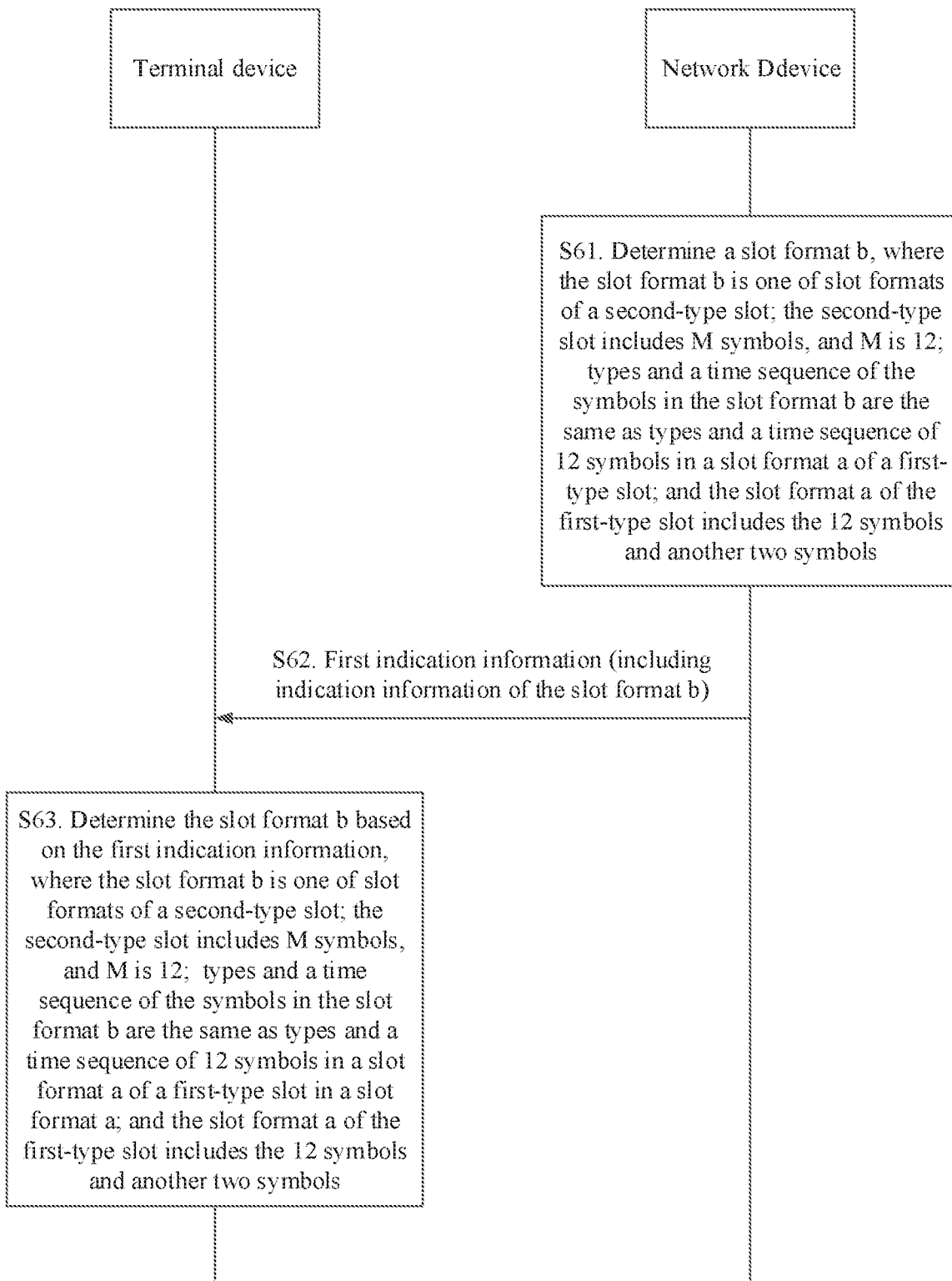
FIG. 6 is a flowchart of another method for determining a slot format according to an embodiment of this application.

The foregoing describes an implementation premise of the embodiments. FIG. 6 below is a flowchart of the method.

S61. A network device determines a slot format b. The slot format b is one of slot formats of a second-type slot; the second-type slot includes M symbols, and M is 12; types and a time sequence of the symbols in the slot format b are the same as types and a time sequence of 12 symbols in a slot format a of a first-type slot; and the slot format a of the first-type slot includes the 12 symbols and another two symbols.

In this embodiment, the network device may indicate the slot format of the first-type slot, and may indicate the slot format of the second-type slot. For example, the network device allocates BWPs to the terminal device, and subcarrier spacings of different BWPs may be different. If a subcarrier spacing of a BWP allocated to some terminal devices is 60 kHz, slots used by these terminal devices may be ECP slots. In this case, the network device needs to indicate the slot format of the second-type slot, and the network device can determine the slot format b.

S62. The network device sends first indication information, and the terminal device receives the first indication information from the network device, where the first indication information includes indication information of the slot format b.

After determining the slot format b, the network device may generate the indication information of the slot format b, add the indication information of the slot format b to the first indication information, and send the first indication information to the terminal device, so that after receiving the first indication information, the terminal device can obtain the indication information of the slot format b.

The first indication information may actually indicate one slot format of the second-type slot, or may indicate a plurality of slot formats of the second-type slot. If the first indication information indicates a plurality of slot formats of the second-type slot, it indicates that the first indication information indicates slot formats of a plurality of second-type slots, and the terminal device may determine the slot formats of the plurality of second-type slots based on the first indication information. A same method is used to determine the slot format of each second-type slot. Therefore, in description of this specification, an example in which the first indication information indicates one slot format, namely, the slot format b, of the second-type slot is used.

For example, the first indication information may be implemented by using SFI. Specifically, the network device sends a group common PDCCH, where the group common PDCCH carries the SFI. In this case, that the terminal device receives the group common PDCCH is equivalent to that the terminal device receives the SFI. The SFI includes the indication information of the slot format b.

Certainly, the first indication information may be alternatively implemented in another form. For example, the network device may send dedicated first indication information. An implementation of the first indication information is not limited in this embodiment of this application.

S63. The terminal device determines the slot format b based on the first indication information. The slot format b is one of slot formats of a second-type slot; the second-type slot includes M symbols, and M is 12; types and a time sequence of the symbols in the slot format b are the same as types and a time sequence of 12 symbols in a slot format a of a first-type slot; and the slot format a of the first-type slot includes the 12 symbols and another two symbols.

At least one slot format of the second-type slot that is obtained in the manner described above in the embodiments, for example, at least one entry (a row in a table may be understood as one entry) in Table 4 to Table 11, may be defined in a protocol or configured by the network device for the terminal device. Sequence numbers of slot formats corresponding to these entries are different from each other. In other words, for the terminal device, a correspondence between a sequence number of a slot format and a format of a second-type slot is known. In this case, the terminal device may determine the slot format b based on the first indication information and the at least one slot format of the second-type slot.

Similarly, for the second-type slot, a correspondence between a slot format combination identity and a sequence number of a slot format may also be set. If the correspondence is set in a form of a table, the table may be referred to as an SFI table which is, for example, similar to Table 3 described above. In this case, the first indication information may indicate the slot format combination identity. The terminal device may determine, based on the correspondence between the slot format combination identity and the sequence number of the slot format, the sequence number of the slot format indicated by the first indication information, and may determine, based on the at least one known slot format of the second-type slot, a slot format of the second-type slot that corresponds to the sequence number of the slot format, where the slot format includes the slot format b.

For example, for the second-type slot, Table 3 is still used as the SFI table. If the at least one slot format of the second-type slot is, for example, Table 4, and a slot format combination identity indicated by the indication information of the slot format b that is included in the first indication information is 0, the terminal device may determine, based on Table 3, that a sequence number of the slot format of the second-type slot that is indicated by the first indication information is 0, and may determine, based on the at least one known slot format of the second-type slot, that the slot format b is the slot format whose sequence number is 0 in Table 4.

Alternatively, for the second-type slot, the SFI table may not be set. The at least one slot format of the second-type slots is, for example, Table 5. The first indication information may directly indicate a specific sequence number of a slot format. The terminal device directly obtains, based on the first indication information, the at least one sequence number of a slot format of the second-type slot, so that the terminal device can determine, based on the known Table 5, a slot format that corresponds to the sequence number indicated by the first indication information.

After determining the slot format b, the terminal device may determine to cancel configured uplink measurement signal sending at a position of a time domain resource corresponding to an unknown symbol or a downlink symbol in a slot corresponding to the slot format b; may cancel a configured operation such as downlink measurement at a position of a time domain resource corresponding to an unknown symbol or an uplink symbol in the slot corresponding to the slot format b; and may cancel a configured operation of blindly detecting a control channel at a position of a time domain resource corresponding to an unknown symbol or an uplink symbol in the slot corresponding to the slot format b.

In addition, if the slot corresponding to the slot format b includes downlink symbols, the terminal device may determine that downlink data can be received in the downlink symbols. If the slot corresponding to the slot format b includes uplink symbols, the terminal device may determine that uplink data can be received in the uplink symbols.

In this embodiment of this application, at least one slot format of a slot with ECP may be directly provided, and the network device directly indicates the slot format of the slot with ECP. In this way, the terminal device can directly determine the slot format of the slot with ECP based on an indication of the network device, and the terminal device does not need to perform additional processing. It is relatively easy for the terminal device to implement.

Devices provided in the embodiments of this application are described below with reference to the accompanying drawings.

Figure 7:
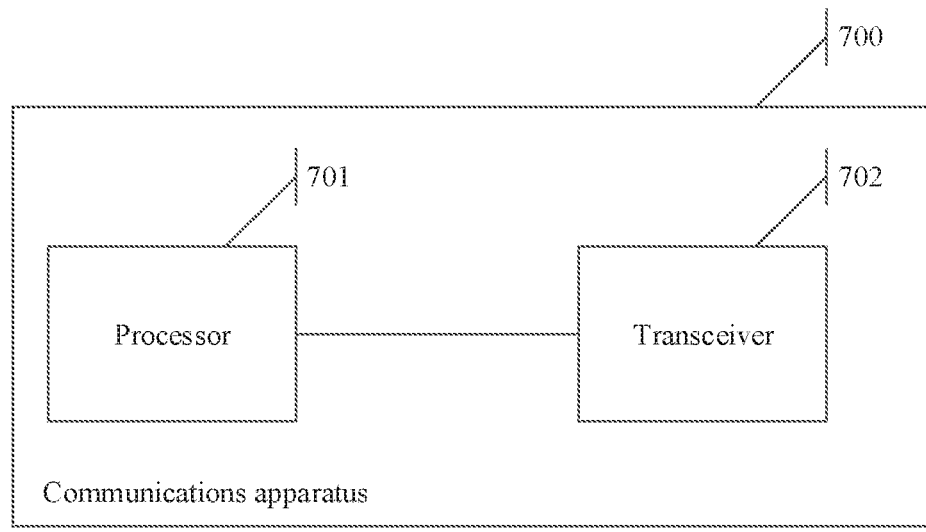
FIG. 7 to FIG. 9 are schematic structural diagrams of several communications apparatuses according to an embodiment of this application.

FIG. 7 is a schematic structural diagram of a communications apparatus 700. The communications apparatus 700 may implement functions of the terminal device described above. The communications apparatus 700 may be the terminal device described above, or may be a chip set in the terminal device described above. The communications apparatus 700 may include a processor 701 and a transceiver 702. The processor 701 may be configured to perform S22 in the embodiment shown in FIG. 2, and/or configured to support another process of the technology described in this specification. The transceiver 702 may be configured to perform S21 in the embodiment shown in FIG. 2, and/or configured to support another process of the technology described in this specification.

For example, the transceiver 702 is configured to obtain first indication information, where the first indication information includes indication information of a slot format a, the slot format a is one of slot formats of a first-type slot, the first-type slot includes N symbols, and N is 14.

The processor 701 is configured to determine a slot format b of $2^{(\mu-\mu_a)}$ consecutive second-type slots based on a subcarrier spacing applicable to the first indication information, a subcarrier spacing applicable to the second-type slot, and the indication information of the slot format a, where the second-type slot includes M symbols, and N is not equal to M.

All related content of steps in the foregoing method embodiments may be cited to functional descriptions of corresponding function modules, and details are not described herein again.

Figure 8:
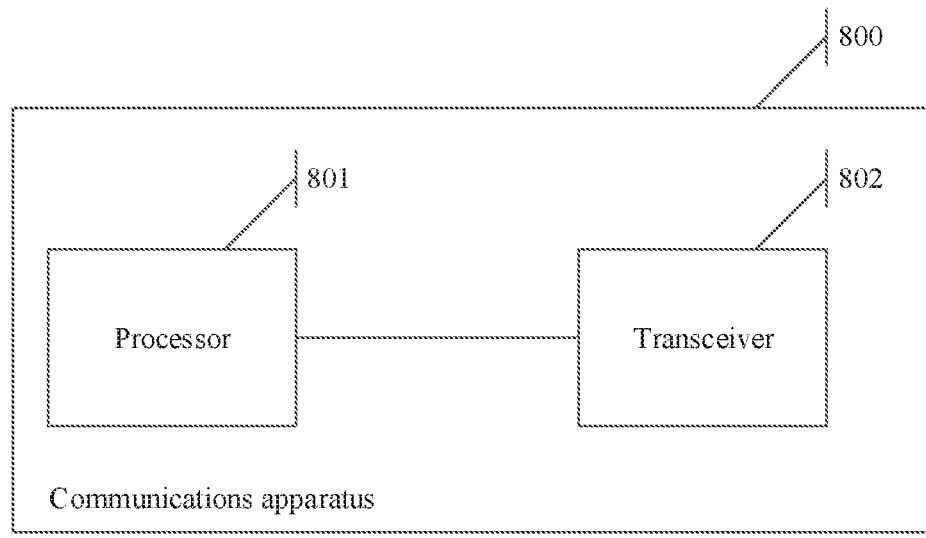

FIG. 8 is a schematic structural diagram of a communications apparatus 800. The communications apparatus 800 may implement functions of the terminal device described above. The communications apparatus 800 may be the terminal device described above, or may be a chip set in the terminal device described above. The communications apparatus 800 may include a processor 801 and a transceiver 802. The processor 801 may be configured to perform S63 in the embodiment shown in FIG. 6, and/or configured to support another process of the technology described in this specification. The transceiver 802 may be configured to perform S62 in the embodiment shown in FIG. 6, and/or configured to support another process of the technology described in this specification.

For example, the transceiver 802 is configured to obtain first indication information, where the first indication information includes indication information of a slot format b.

The processor 801 is configured to: determine the slot format b based on the first indication information, where the slot format b is one of slot formats of a second-type slot; the second-type slot includes M symbols, and M is 12; types and a time sequence of the symbols in the slot format b are the same as types and a time sequence of 12 symbols in a slot format a of a first-type slot; and the slot format a of the first-type slot includes the 12 symbols and another two symbols.

All related content of steps in the foregoing method embodiments may be cited to functional descriptions of corresponding function modules, and details are not described herein again.

Figure 9:
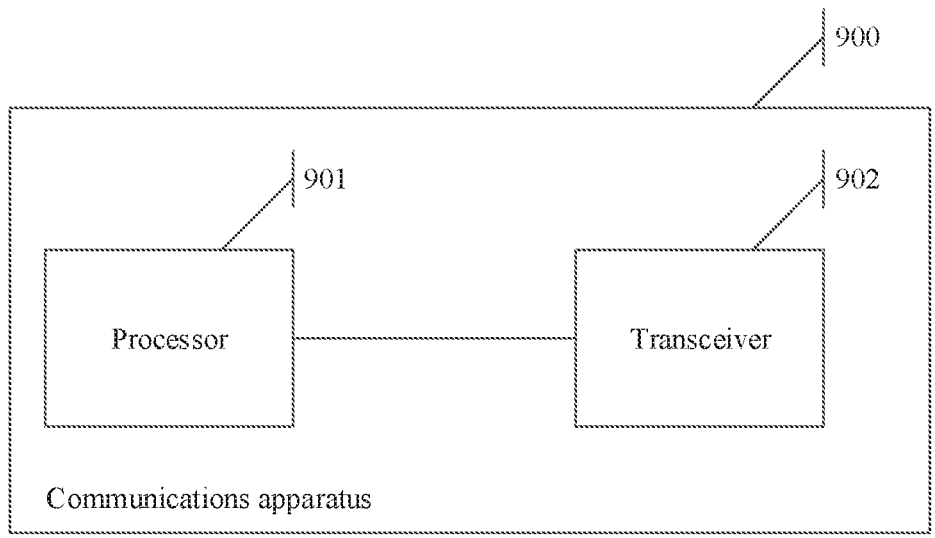

FIG. 9 is a schematic structural diagram of a communications apparatus 900. The communications apparatus 900 may implement functions of the network device described above. The communications apparatus 900 may be the network device described above, or may be a chip set in the network device described above. The communications apparatus 900 may include a processor 901 and a transceiver 902. The processor 901 may be configured to perform S61 in the embodiment shown in FIG. 6, and/or configured to support another process of the technology described in this specification. The transceiver 902 may be configured to perform S62 in the embodiment shown in FIG. 6, and/or configured to support another process of the technology described in this specification.

For example, the processor 901 is configured to: determine a slot format b, where the slot format b is one of slot formats of a second-type slot; the second-type slot includes M symbols, and M is 12; types and a time sequence of the symbols in the slot format b are the same as types and a time sequence of 12 symbols in a slot format a of a first-type slot; and the slot format a of the first-type slot includes the 12 symbols and another two symbols.

The transceiver 902 is configured to send first indication information, where the first indication information includes indication information of the slot format b.

All related content of steps in the foregoing method embodiments may be cited to functional descriptions of corresponding function modules, and details are not described herein again.

Figure 10A:
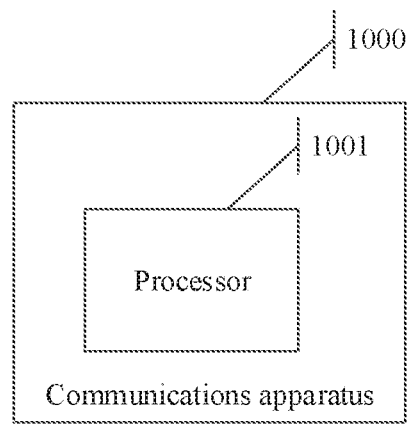
FIG. 10A and FIG. 10B are two schematic structural diagrams of a communications apparatus according to an embodiment of this application.

In a simple embodiment, a person skilled in the art may figure out that the communications apparatus 700, the communications apparatus 800, or the communications apparatus 900 may be alternatively implemented by using a structure of a communications apparatus 1000 shown in FIG. 10A. The communications apparatus 1000 may implement the functions of the network device or the terminal device described above. The communications apparatus 1000 may include a processor 1001. When the communications apparatus 1000 is configured to implement the functions of the terminal device in the embodiment shown in FIG. 2, the processor 1001 may be configured to perform S22 in the embodiment shown in FIG. 2, and/or configured to support another process of the technology described in this specification. When the communications apparatus 1000 is configured to implement the functions of the terminal device in the embodiment shown in FIG. 6, the processor 1001 may be configured to perform S63 in the embodiment shown in FIG. 6, and/or configured to support another process of the technology described in this specification. When the communications apparatus 1000 is configured to implement the functions of the network device in the embodiment shown in FIG. 6, the processor 1001 may be configured to perform S61 in the embodiment shown in FIG. 6, and/or configured to support another process of the technology described in this specification.

The communications apparatus 1000 may be implemented by using a field programmable gate array (FPGA), an application-specific integrated chip (ASIC), a system on chip (SoC), a central processing unit (CPU), a network processor (NP), a digital signal processing circuit (DSP), or a microcontroller unit (MCU), or may be implemented by using a programmable controller (PLD) or another integrated chip. In this case, the communications apparatus 600 may be set in the network device or the communications device in the embodiments of this application, so that the network device or the communications device implements the method for determining a slot format provided in the embodiments of this application.

In an optional implementation, the communications apparatus 1000 may include a transceiver component, configured to communicate with a network device. For example, when the communications apparatus 1000 is configured to implement the functions of the network device or the terminal device in the embodiment shown in FIG. 2, the transceiver component may be configured to perform S21 in the embodiment shown in FIG. 2, and/or configured to support another process of the technology described in this specification. For example, when the communications apparatus 1000 is configured to implement the functions of the network device or the terminal device in the embodiment shown in FIG. 6, the transceiver component may be configured to perform S62 in the embodiment shown in FIG. 6, and/or configured to support another process of the technology described in this specification.

Figure 10B:
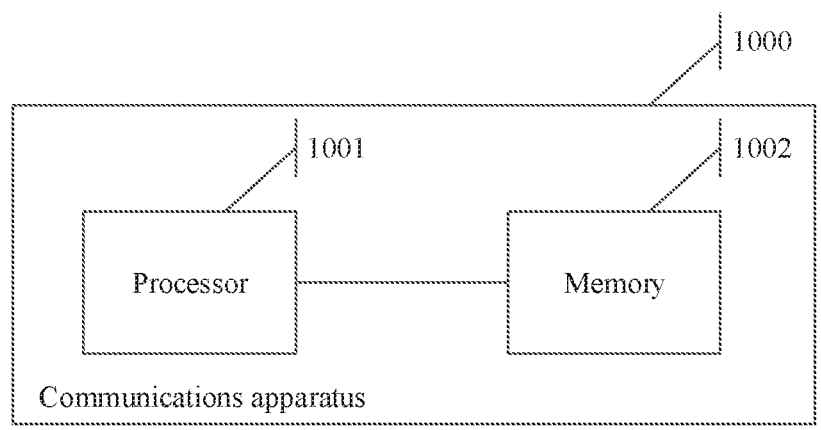

In an optional implementation, the communications apparatus 1000 may further include a memory 1002. Referring to FIG. 10B, the memory 1002 is configured to store computer programs or instructions, and the processor 1001 is configured to perform decoding and execute these computer programs or instructions. It should be understood that these computer programs or instructions may include functional programs of the network device or the terminal device described above. When the functional programs of the network device are decoded and executed by the processor 1001, the network device can be enabled to implement the functions of the network device in the method provided in the embodiment shown in FIG. 6 in the embodiments of this application. When the functional programs of the terminal device are decoded and executed by the processor 1001, the terminal device can be enabled to implement the functions of the terminal device in the method provided in the embodiment shown in FIG. 2 or the embodiment shown in the FIG. 6 in the embodiments of this application.

In another optional implementation, functional programs of the network device or the terminal device are stored in an external memory of the communications apparatus 1000. When the functional programs of the network device are decoded and executed by the processor 1001, the memory 1002 temporarily stores some or all content of the functional programs of the network device. When the functional programs of the terminal device are decoded and executed by the processor 1001, the memory 1002 temporarily stores some or all content of the functional programs of the terminal device.

In another optional implementation, functional programs of the network device or the terminal device are set to be stored in an internal memory 1002 of the communications apparatus 1000. When the internal memory 1002 of the communications apparatus 1000 stores the functional programs of the network device, the communications apparatus 1000 may be set in the network device in the embodiments of this application. When the internal memory 1002 of the communications apparatus 1000 stores the functional programs of the terminal device, the communications apparatus 1000 may be set in the terminal device in the embodiments of this application.

In still another optional implementation, a part of content of the functional programs of the network device is stored in an external memory of the communications apparatus 1000, and the other part of content of the functional programs of the network device is stored in an internal memory 1002 of the communications apparatus 1000. Alternatively, a part of content of the functional programs of the terminal device is stored in an external memory of the communications apparatus 1000, and the other part of content of the functional programs of the terminal device is stored in an internal memory 1002 of the communications apparatus 1000.

In this embodiment of this application, the communications apparatus 700, the communications apparatus 800, the communications apparatus 900, and the communications apparatus 1000 are presented in a form in which each function module is obtained through division corresponding to each function, or may be presented in a form in which each function module is obtained through division in an integrated manner. The "module" herein may be an ASIC, a processor executing one or more software or firmware programs, a memory, an integrated logic circuit, and/or another device that can provide the foregoing functions.

In addition, the communications apparatus 700 provided in the embodiment shown in FIG. 7 may be alternatively implemented in another form. For example, the communications apparatus includes a processing module and a transceiver module. For example, the processing module may be implemented by using the processor 701, and the transceiver module may be implemented by using the transceiver 702. The processing module may be configured to perform S22 in the embodiment shown in FIG. 2, and/or configured to support another process of the technology described in this specification. The transceiver module may be configured to perform S21 in the embodiment shown in FIG. 2, and/or configured to support another process of the technology described in this specification.

For example, the transceiver module is configured to obtain first indication information, where the first indication information includes indication information of a slot format a, the slot format a is one of slot formats of a first-type slot, the first-type slot includes N symbols, and N is 14.

The processing module is configured to determine a slot format b of $2^{(\mu-\mu_a)}$ consecutive second-type slots based on a subcarrier spacing applicable to the first indication information, a subcarrier spacing applicable to the second-type slot, and the indication information of the slot format a, where the second-type slot includes M symbols, and N is not equal to M.

All related content of steps in the foregoing method embodiments may be cited to function descriptions of corresponding function modules, and details are not described herein again.

The communications apparatus 800 provided in the embodiment shown in FIG. 8 may be alternatively implemented in another form. For example, the communications apparatus includes a processing module and a transceiver module. For example, the processing module may be implemented by using the processor 801, and the transceiver module may be implemented by using the transceiver 802.

The processing module may be configured to perform S63 in the embodiment shown in FIG. 6, and/or configured to support another process of the technology described in this specification. The transceiver module may be configured to perform S62 in the embodiment shown in FIG. 6, and/or configured to support another process of the technology described in this specification.

For example, the transceiver module is configured to obtain first indication information, where the first indication information includes indication information of a slot format b.

The processing module is configured to: determine the slot format b based on the first indication information, where the slot format b is one of slot formats of a second-type slot; the second-type slot includes M symbols, and M is 12; types and a time sequence of the symbols in the slot format b are the same as types and a time sequence of 12 symbols in a slot format a of a first-type slot; and the slot format a of the first-type slot includes the 12 symbols and another two symbols.

All related content of steps in the foregoing method embodiments may be cited to function descriptions of corresponding function modules, and details are not described herein again.

The communications apparatus 900 provided in the embodiment shown in FIG. 9 may be alternatively implemented in another form. For example, the communications apparatus includes a processing module and a transceiver module. For example, the processing module may be implemented by using the processor 901, and the transceiver module may be implemented by using the transceiver 902. The processing module may be configured to perform S61 in the embodiment shown in FIG. 6, and/or configured to support another process of the technology described in this specification. The transceiver module may be configured to perform S62 in the embodiment shown in FIG. 6, and/or configured to support another process of the technology described in this specification.

For example, the processing module is configured to: determine a slot format b, where the slot format b is one of slot formats of a second-type slot; the second-type slot includes M symbols, and M is 12; types and a time sequence of the symbols in the slot format b are the same as types and a time sequence of 12 symbols in a slot format a of a first-type slot; and the slot format a of the first-type slot includes the 12 symbols and another two symbols.

The transceiver module is configured to send first indication information, where the first indication information includes indication information of the slot format b.

All related content of steps in the foregoing method embodiments may be cited to functional descriptions of corresponding function modules, and details are not described herein again.

The communications apparatus 700, the communications apparatus 800, the communications apparatus 900, and the communications apparatus 1000 provided in the embodiments of this application may be configured to perform the method provided in the embodiment shown in FIG. 2 or the embodiment shown in FIG. 6. Therefore, for technical effects that can be achieved by the communications apparatus 700, the communications apparatus 800, the communications apparatus 900, and the communications apparatus 1000, refer to the foregoing method embodiments, and details are not described herein.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

Obviously, a person skilled in the art can make various modifications and variations to the embodiments of this application without departing from the and scope of this application. In this way, provided that these modifications and variations of the embodiments of this application fall within the scope of protection defined by the claims of this application and their equivalent technologies, this application is intended to cover these modifications and variations.

What is claimed is:

1. A method comprising:
   determining, by a communication apparatus based on a format of a first slot with a normal cyclic prefix (NCP), a format for $2^{(\mu-\mu a)}$ consecutive slots with an extended cyclic prefix (ECP) in a bandwidth part (BWP), wherein μa corresponds to a reference subcarrier spacing of the first slot in the BWP, μa is an index of the reference subcarrier spacing in the BWP, and μ corresponds to a subcarrier spacing of the $2^{(\mu-\mu a)}$ consecutive slots in the BWP, μ is an index of the subcarrier spacing in the BWP;

wherein $$\left\lfloor \frac{DL\_du}{Ts\_ECP} \right\rfloor + \left\lfloor \frac{UL\_du}{Ts\_ECP} \right\rfloor < M \times 2^{(\mu-\mu_a)}, \text{ or}$$

$$\left\lfloor \frac{DL\_du}{Ts\_ECP} \right\rfloor = o, \text{ or } \left\lfloor \frac{UL\_du}{Ts\_ECP} \right\rfloor = o,$$

the $2^{(\mu-\mu_a)}$ consecutive slots with the ECP in the BWP comprise $$\left\lfloor \frac{DL\_du}{Ts\_ECP} \right\rfloor$$

downlink symbols and $$\left\lfloor \frac{UL\_du}{Ts\_ECP} \right\rfloor$$

uplink symbols, wherein $$\lfloor * \rfloor$$

represents rounding down, M is a quantity of symbols in a second slot of the $2^{(\mu-\mu_a)}$ consecutive slots with the ECP, DL_du is a duration of one or more downlink symbols in the first slot with the NCP, UL_du is a duration of one or more uplink symbols in the first slot with the NCP, and Ts_ECP is a duration of one symbol in the second slot with the ECP; and communicating, by the communication apparatus, with a network device by using the $2^{(\mu-\mu_a)}$ consecutive slots.

2. The method according to claim 1, wherein the first slot with the NCP comprises one downlink symbol or consecutive downlink symbols starting from a beginning symbol of the first slot, and comprises one uplink symbol or consecutive uplink symbols ending with an end symbol of the first slot.

3. The method according to claim 1, wherein the $$\left\lfloor \frac{DL\_du}{Ts\_ECP} \right\rfloor$$

downlink symbols are consecutive downlink symbols starting from a beginning symbol of the $2^{(\mu-\mu_a)}$ consecutive slots with the ECP in the BWP, and the $$\left\lfloor \frac{UL\_du}{Ts\_ECP} \right\rfloor$$

uplink symbols are consecutive uplink symbols ending with an end symbol of the $2^{(\mu-\mu_a)}$ consecutive slots with the ECP in the BWP.

4. The method according to claim 1, wherein the $2^{(\mu-\mu_a)}$ consecutive slots with the ECP in the BWP further comprise $$\left( M \times 2^{(\mu-\mu_a)} - \left\lfloor \frac{DL\_du}{Ts\_ECP} \right\rfloor - \left\lfloor \frac{UL\_du}{Ts\_ECP} \right\rfloor \right)$$

unknown symbols.

5. The method according to claim 1, wherein the first slot with the NCP comprises a first subslot and a second subslot, and time lengths of the first subslot and the second subslot are same; and wherein first K1 slots of the $2^{(\mu-\mu_a)}$ consecutive slots with the ECP in the BWP comprise $$\left\lfloor \frac{DL\_du1}{Ts\_ECP} \right\rfloor$$

downlink symbols and $$\left\lfloor \frac{UL\_du1}{Ts\_ECP} \right\rfloor$$

uplink symbols, $$\left\lfloor \frac{DL\_du1}{Ts\_ECP} \right\rfloor + \left\lfloor \frac{UL\_du1}{Ts\_ECP} \right\rfloor < \frac{1}{2} M \times 2^{(\mu-\mu_a)}, \text{ or}$$

$$\left\lfloor \frac{DL\_du1}{Ts\_ECP} \right\rfloor = o, \text{ or } \left\lfloor \frac{UL\_du1}{Ts\_ECP} \right\rfloor = o,$$

and wherein K1 is an integer equal to half of $2^{(\mu-\mu_a)}$, $$\lfloor * \rfloor$$

represents rounding down, M is a quantity of symbols in a second slot of the $2^{(\mu-\mu_a)}$ consecutive slots with the ECP, DL_du1 is a duration of one or more downlink symbols in the first subslot, UL_du1 is a duration of one or more uplink symbols in the first subslot, and Ts_ECP is a duration of one symbol in the second slot with the ECP.

6. The method according to claim 5, wherein the first slot with the NCP comprises one downlink symbol or consecutive downlink symbols starting from a beginning symbol of the first slot, and comprises one uplink symbol or consecutive uplink symbols ending with an end symbol of the first slot.

7. The method according to claim 6, wherein the $$\left\lfloor \frac{DL\_du1}{Ts\_ECP} \right\rfloor$$

downlink symbols are consecutive downlink symbols starting from a beginning symbol of the first K1 slots of the $2^{(\mu-\mu_a)}$ consecutive slots with the ECP in the BWP, and $$\left\lfloor \frac{UL\_du1}{Ts\_ECP} \right\rfloor$$

the uplink symbols are consecutive uplink symbols ending with an end symbol of the first K1 slots of the $2^{(\mu-\mu a)}$ consecutive slots with the ECP in the BWP.

8. The method according to claim 5, wherein the first K1 slots of the $2^{(\mu-\mu a)}$ consecutive slots with the ECP in the BWP further comprise $$\left(\frac{1}{2}M \times 2^{(\mu-\mu_a)} - \left\lfloor\frac{\text{DL\_du1}}{\text{Ts\_ECP}}\right\rfloor - \left\lfloor\frac{\text{UL\_du1}}{\text{Ts\_ECP}}\right\rfloor\right)$$

unknown symbols.

9. The method according to claim 5, wherein $$\left\lfloor\frac{\text{DL\_du2}}{\text{Ts\_ECP}}\right\rfloor + \left\lfloor\frac{\text{UL\_du2}}{\text{Ts\_ECP}}\right\rfloor < \frac{1}{2}M \times 2^{(\mu-\mu_a)}, \text{ or}$$

$$\left\lfloor\frac{\text{DL\_du2}}{\text{Ts\_ECP}}\right\rfloor = o, \text{ or } \left\lfloor\frac{\text{UL\_du2}}{\text{Ts\_ECP}}\right\rfloor = o,$$

and last K2 slots of the $2^{(\mu-\mu a)}$ consecutive slots with the ECP in the BWP comprise $$\left\lfloor\frac{\text{DL\_du2}}{\text{Ts\_ECP}}\right\rfloor$$

downlink symbols and $$\left\lfloor\frac{\text{UL\_du2}}{\text{Ts\_ECP}}\right\rfloor$$

uplink symbols, and wherein K2 is an integer equal to half of $2^{(\mu-\mu a)}$, DL_du2 is a duration of one or more downlink symbols in the second subslot, UL_du2 is a duration of one or more uplink symbol in the second subslot, and Ts_ECP is a duration of one symbol in the second slot with the ECP.

10. The method according to claim 9, wherein the second subslot comprises one or more consecutive downlink symbols starting from a beginning symbol of the second subslot, and one or more consecutive uplink symbols ending with an end symbol of the second subslot.

11. The method according to claim 10, wherein the $$\left\lfloor\frac{\text{DL\_du2}}{\text{Ts\_ECP}}\right\rfloor$$

downlink symbols are consecutive downlink symbols starting from a beginning symbol of the last K2 slots of the $2^{(\mu-\mu a)}$ consecutive slots with the ECP in the BWP, and the $$\left\lfloor\frac{\text{UL\_du2}}{\text{Ts\_ECP}}\right\rfloor$$

uplink symbols are consecutive uplink symbols ending with an end symbol of the last K2 slots of the $2^{(\mu-\mu a)}$ consecutive slots with the ECP in the BWP.

12. The method according to claim 9, wherein the last K2 slots of the $2^{(\mu-\mu a)}$ consecutive slots with the ECP in the BWP further comprise $$\left(\frac{1}{2}M \times 2^{(\mu-\mu_a)} - \left\lfloor\frac{\text{DL\_du2}}{\text{Ts\_ECP}}\right\rfloor - \left\lfloor\frac{\text{UL\_du2}}{\text{Ts\_ECP}}\right\rfloor\right)$$

unknown symbols.

13. The method according to claim 1, wherein μ=2.

14. The method according to claim 1, wherein the first slot with the NCP comprises 14 symbols, and a slot of the $2^{(\mu-\mu a)}$ consecutive slots with the ECP comprises 12 symbols.

15. The method according to claim 1, wherein the method further comprises:

obtaining, by the communication apparatus, first indication information, wherein the first indication information comprises the format of the first slot with the NCP.

16. The method according to claim 1, wherein a start time of the $2^{(\mu-\mu a)}$ consecutive slots with the ECP is same as a start time of the first slot with the NCP, and a total duration of the $2^{(\mu-\mu a)}$ consecutive slots with the ECP is same as a duration of the first slot with the NCP.

17. A communications apparatus, comprising:

a processor; and a non-transitory computer-readable storage medium coupled to the processor and storing programming instructions for execution by the processor, the programming instructions, when executed by the processor, cause the communications apparatus to:

determine, based on a format of a first slot with a normal cyclic prefix (NCP), a format for $2^{(\mu-\mu a)}$ consecutive slots with an extended cyclic prefix (ECP) in a bandwidth part (BWP), wherein μa corresponds to a reference subcarrier spacing of the first slot in the BWP, and μ corresponds to a subcarrier spacing of the $2^{(\mu-\mu a)}$ consecutive slots in the BWP;

wherein $$\left\lfloor\frac{\text{DL\_du}}{\text{Ts\_ECP}}\right\rfloor + \left\lfloor\frac{\text{UL\_du}}{\text{Ts\_ECP}}\right\rfloor < M \times 2^{(\mu-\mu_a)}, \text{ or}$$

$$\left\lfloor\frac{\text{DL\_du}}{\text{Ts\_ECP}}\right\rfloor = o, \text{ or}$$

$$\left\lfloor\frac{\text{UL\_du}}{\text{Ts\_ECP}}\right\rfloor = o,$$

the $2^{(\mu-\mu a)}$ consecutive slots with the ECP in the BWP comprise $$\left\lfloor\frac{\text{DL\_du}}{\text{Ts\_ECP}}\right\rfloor$$

downlink symbols and $$\left\lfloor\frac{\text{UL\_du}}{\text{Ts\_ECP}}\right\rfloor$$

uplink symbols, wherein $$\lfloor * \rfloor$$

represents rounding down, M is a quantity of symbols in a second slot of the $2^{(\mu-\mu a)}$ consecutive slots with the ECP, DL_du is a duration of one or more downlink symbols in the first slot with the NCP, UL_du is a duration of one or more uplink symbols in the first slot with the NCP, and Ts_ECP is a duration of one symbol in the second slot with the ECP; and communicate with a network device by using the $2(\mu-\mu a)$ consecutive slots.

18. The communications apparatus according to claim 17, wherein the $$\left\lfloor \frac{DL\_du}{Ts\_ECP} \right\rfloor$$

downlink symbols are consecutive downlink symbols starting from a beginning symbol of the $2^{(\mu-\mu a)}$ consecutive slots with the ECP in the BWP, and the $$\left\lfloor \frac{UL\_du}{Ts\_ECP} \right\rfloor$$

uplink symbols are consecutive uplink symbols ending with an end symbol of the $2^{(\mu-\mu a)}$ consecutive slots with the ECP in the BWP.

19. The communications apparatus according to claim 17, wherein the $2^{(\mu-\mu a)}$ consecutive slots with the ECP in the BWP further comprise $$\left( M \times 2^{(\mu-\mu_a)} - \left\lfloor \frac{DL\_du}{Ts\_ECP} \right\rfloor - \left\lfloor \frac{UL\_du}{Ts\_ECP} \right\rfloor \right)$$

unknown symbols.

20. The communications apparatus according to claim 17, wherein the first slot with the NCP comprises a first subslot and a second subslot, and time lengths of the first subslot and the second subslot are same; and wherein first K1 slots of the $2^{(\mu-\mu a)}$ consecutive slots with the ECP in the BWP comprise $$\left\lfloor \frac{DL\_du1}{Ts\_ECP} \right\rfloor$$

downlink symbols and $$\left\lfloor \frac{UL\_du1}{Ts\_ECP} \right\rfloor$$

uplink symbols, $$\left\lfloor \frac{DL\_du1}{Ts\_ECP} \right\rfloor + \left\lfloor \frac{UL\_du1}{Ts\_ECP} \right\rfloor < \frac{1}{2} M \times 2^{(\mu-\mu_a)}, \text{ or}$$

$$\left\lfloor \frac{DL\_du1}{Ts\_ECP} \right\rfloor = o, \text{ or}$$

$$\left\lfloor \frac{UL\_du1}{Ts\_ECP} \right\rfloor = o,$$

and wherein K1 is an integer equal to half of $2^{(\mu-\mu a)}$, $$\lfloor * \rfloor$$

represents rounding down, M is a quantity of symbols in a second slot of the $2^{(\mu-\mu a)}$ consecutive slots with the ECP, DL_du1 is a duration of one or more downlink symbols in the first subslot, UL_du1 is a duration of one or more uplink symbols in the first subslot, and Ts_ECP is a duration of one symbol in the second slot with the ECP.

21. The communications apparatus according to claim 20, wherein the $$\left\lfloor \frac{DL\_du1}{Ts\_ECP} \right\rfloor$$

downlink symbols are consecutive downlink symbols starting from a beginning symbol of the first K1 slots of the $2^{(\mu-\mu a)}$ consecutive slots with the ECP in the BWP, and the $$\left\lfloor \frac{UL\_du1}{Ts\_ECP} \right\rfloor$$

uplink symbols are consecutive uplink symbols ending with an end symbol of the first K1 slots of the $2^{(\mu-\mu a)}$ consecutive slots with the ECP in the BWP.

22. The communications apparatus according to claim 20, wherein the first K1 slots of the $2^{(\mu-\mu a)}$ consecutive slots with the ECP in the BWP further comprise $$\left( \frac{1}{2} M \times 2^{(\mu-\mu_a)} - \left\lfloor \frac{DL\_du1}{Ts\_ECP} \right\rfloor - \left\lfloor \frac{UL\_du1}{Ts\_ECP} \right\rfloor \right)$$

unknown symbols.

23. The communications apparatus according to claim 20, wherein $$\left\lfloor \frac{DL\_du2}{Ts\_ECP} \right\rfloor + \left\lfloor \frac{UL\_du2}{Ts\_ECP} \right\rfloor < \frac{1}{2} M \times 2^{(\mu-\mu_a)}, \text{ or}$$

$$\left\lfloor \frac{DL\_du2}{Ts\_ECP} \right\rfloor = o, \text{ or } \left\lfloor \frac{UL\_du2}{Ts\_ECP} \right\rfloor = o,$$

and
last K2 slots of the $2^{(\mu-\mu a)}$ consecutive slots with the ECP in the BWP comprise $$\left\lfloor \frac{DL\_du2}{Ts\_ECP} \right\rfloor$$

downlink symbols and $$\left\lfloor \frac{UL\_du2}{Ts\_ECP} \right\rfloor$$

uplink symbols, and wherein K2 is an integer equal to half of $2^{(\mu-\mu a)}$, DL_du2 is a duration of one or more downlink symbols in the second subslot, UL_du2 is a duration of one or more uplink symbols in the second subslot, and Ts_ECP is a duration of one symbol in the second slot with the ECP.

24. The communications apparatus according to claim 23, wherein the $$\left\lfloor \frac{DL\_du2}{Ts\_ECP} \right\rfloor$$

downlink symbols are consecutive downlink symbols starting from a beginning symbol of the last K2 slots of the $2^{(\mu-\mu a)}$ consecutive slots with the ECP in the BWP, and the $$\left\lfloor \frac{UL\_du2}{Ts\_ECP} \right\rfloor$$

uplink symbols are consecutive uplink symbols ending with an end symbol of the last K2 slots of the $2^{(\mu-\mu a)}$ consecutive slots with the ECP in the BWP.

25. The communications apparatus according to claim 23, wherein the last K2 slots of the $2^{(\mu-\mu a)}$ consecutive slots with the ECP in the BWP further comprise $$\left( \frac{1}{2} M \times 2^{(\mu-\mu_a)} - \left\lfloor \frac{DL\_du2}{Ts\_ECP} \right\rfloor - \left\lfloor \frac{UL\_du2}{Ts\_ECP} \right\rfloor \right)$$

unknown symbols.

26. The communications apparatus according to claim 17, wherein the programming instructions, when executed by the processor, cause the communications apparatus further to:
 obtain first indication information, wherein the first indication information comprises the format of the first slot with the NCP.

27. The communications apparatus according to claim 26, wherein a start time of the $2^{(\mu-\mu a)}$ consecutive slots with the ECP is same as a start time of the first slot with the NCP, and a total duration of the $2^{(\mu-\mu a)}$ consecutive slots with the ECP is same as a duration of the first slot with the NCP.

* * * * *

UNITED STATES PATENT AND TRADEMARK OFFICE
CERTIFICATE OF CORRECTION

PATENT NO. : 11,388,709 B2 Page 1 of 6
APPLICATION NO. : 16/993046
DATED : July 12, 2022
INVENTOR(S) : Wang It is certified that error appears in the above-identified patent and that said Letters Patent is hereby corrected as shown below:

In the Specification

In the Summary, Column 1, Line 51; insert --consecutive-- between "$2^{(\mu-\mu_a)}$" and "second".

In the Summary, Column 3, Lines 5-10; delete

"$op1(\frac{DL\_du}{Ts\_ECP})+op2(\frac{UL\_du}{Ts\_ECP})<M\times2^{(\mu-\mu_a)}$, or $op1(\frac{DL\_du}{Ts\_ECP})=\text{o}$, or $op2(\frac{UL\_du}{Ts\_ECP})=\text{o}$" and insert --$op1(\frac{DL\_du}{Ts\_ECP})+op2(\frac{UL\_du}{Ts\_ECP})<M\times2^{(\mu-\mu_a)}$, or $op1(\frac{DL\_du}{Ts\_ECP})=0$, or $op2(\frac{UL\_du}{Ts\_ECP})=0$--.

In the Summary, Column 3, Lines 60-65; delete

"$op1(\frac{DL\_du}{Ts\_ECP})+op2(\frac{UL\_du}{Ts\_ECP})<M\times2^{(\mu-\mu_a)}$, or $op1(\frac{DL\_du}{Ts\_ECP})=\text{o}$, or $op2(\frac{UL\_du}{Ts\_ECP})=\text{o}$" and insert --$op1(\frac{DL\_du}{Ts\_ECP})+op2(\frac{UL\_du}{Ts\_ECP})<M\times2^{(\mu-\mu_a)}$, or $op1(\frac{DL\_du}{Ts\_ECP})=0$, or $op2(\frac{UL\_du}{Ts\_ECP})=0$--.

In the Summary, Column 6, Lines 55-60; delete

"$\left\lfloor\frac{DL\_du}{Ts\_ECP}\right\rfloor+\left\lfloor\frac{UL\_du}{Ts\_ECP}\right\rfloor<M\times2^{(\mu-\mu_a)}$, or $\left\lfloor\frac{DL\_du}{Ts\_ECP}\right\rfloor=\text{o}$, or $\left\lfloor\frac{UL\_du}{Ts\_ECP}\right\rfloor=\text{o}$" and insert --$\left\lfloor\frac{DL\_du}{Ts\_ECP}\right\rfloor+\left\lfloor\frac{UL\_du}{Ts\_ECP}\right\rfloor<M\times2^{(\mu-\mu_a)}$, or $\left\lfloor\frac{DL\_du}{Ts\_ECP}\right\rfloor=0$, or $\left\lfloor\frac{UL\_du}{Ts\_ECP}\right\rfloor=0$--.

Signed and Sealed this
Thirtieth Day of August, 2022

Katherine Kelly Vidal
*Director of the United States Patent and Trademark Office*

CERTIFICATE OF CORRECTION (continued)
U.S. Pat. No. 11,388,709 B2

In the Summary, Column 9, Lines 15-20; delete

" $op1(\frac{DL\_du1}{Ts\_ECP}) + op2(\frac{UL\_du1}{Ts\_ECP}) < \frac{1}{2}M \times 2^{(\mu-\mu_a)}$, or $op1(\frac{DL\_du1}{Ts\_ECP}) = o$, or $op2(\frac{UL\_du1}{Ts\_ECP}) = o$ " and insert -- $op1(\frac{DL\_du1}{Ts\_ECP}) + op2(\frac{UL\_du1}{Ts\_ECP}) < \frac{1}{2}M \times 2^{(\mu-\mu_a)}$, or $op1(\frac{DL\_du1}{Ts\_ECP}) = 0$, or $op2(\frac{UL\_du1}{Ts\_ECP}) = 0$ --.

In the Summary, Column 10, Lines 5-10; delete

" $op1(\frac{DL\_du1}{Ts\_ECP}) + op2(\frac{UL\_du1}{Ts\_ECP}) = \frac{1}{2}M \times 2^{(\mu-\mu_a)}$, $op1(\frac{DL\_du1}{Ts\_ECP}) > o$ and $op2(\frac{UL\_du1}{Ts\_ECP}) > o$ " and insert -- $op1(\frac{DL\_du1}{Ts\_ECP}) + op2(\frac{UL\_du1}{Ts\_ECP}) = \frac{1}{2}M \times 2^{(\mu-\mu_a)}$, $op1(\frac{DL\_du1}{Ts\_ECP}) > 0$, and $op2(\frac{UL\_du1}{Ts\_ECP}) > 0$ --.

In the Summary, Column 10, Line 56; delete "slot" and insert --slots--.

In the Summary, Column 12, Lines 43-47; delete

" $op1(\frac{DL\_du2}{Ts\_ECP}) + op2(\frac{UL\_du2}{Ts\_ECP}) < \frac{1}{2}M \times 2^{(\mu-\mu_a)}$, or $op1(\frac{DL\_du2}{Ts\_ECP}) = o$ or $op2(\frac{UL\_du2}{Ts\_ECP}) = o$ " and insert -- $op1(\frac{DL\_du2}{Ts\_ECP}) + op2(\frac{UL\_du2}{Ts\_ECP}) = \frac{1}{2}M \times 2^{(\mu-\mu_a)}$, $op1(\frac{DL\_du2}{Ts\_ECP}) > 0$, and $op2(\frac{UL\_du2}{Ts\_ECP}) > 0$ --.

In the Summary, Column 13, Lines 23-27; delete

" $op1(\frac{DL\_du2}{Ts\_ECP}) + op2(\frac{UL\_du2}{Ts\_ECP}) = \frac{1}{2}M \times 2^{(\mu-\mu_a)}$, $op1(\frac{DL\_du2}{Ts\_ECP}) > o$ and $op2(\frac{UL\_du2}{Ts\_ECP}) > o$ " and insert -- $op1(\frac{DL\_du2}{Ts\_ECP}) + op2(\frac{UL\_du2}{Ts\_ECP}) = \frac{1}{2}M \times 2^{(\mu-\mu_a)}$, $op1(\frac{DL\_du2}{Ts\_ECP}) > 0$, and $op2(\frac{UL\_du2}{Ts\_ECP}) > 0$ --.

In the Summary, Column 16, Lines 5-10; delete

" $\lfloor \frac{DL\_du1}{Ts\_ECP} \rfloor + \lfloor \frac{UL\_du1}{Ts\_ECP} \rfloor < \frac{1}{2}M \times 2^{(\mu-\mu_a)}$, or $\lfloor \frac{DL\_du1}{Ts\_ECP} \rfloor = o$, or $\lfloor \frac{UL\_du1}{Ts\_ECP} \rfloor = o$ " and insert -- $\lfloor \frac{DL\_du1}{Ts\_ECP} \rfloor + \lfloor \frac{UL\_du1}{Ts\_ECP} \rfloor < \frac{1}{2}M \times 2^{(\mu-\mu_a)}$, or $\lfloor \frac{DL\_du1}{Ts\_ECP} \rfloor = 0$, or $\lfloor \frac{UL\_du1}{Ts\_ECP} \rfloor = 0$ --.

CERTIFICATE OF CORRECTION (continued)
U.S. Pat. No. 11,388,709 B2

In the Summary, Column 17, Lines 30-35; delete

"$\left\lfloor \frac{DL\_du2}{Ts\_ECP} \right\rfloor + \left\lfloor \frac{UL\_du2}{Ts\_ECP} \right\rfloor < \frac{1}{2} M \times 2^{(\mu-\mu_a)}$, or $\left\lfloor \frac{DL\_du2}{Ts\_ECP} \right\rfloor =$o or $\left\lfloor \frac{UL\_du2}{Ts\_ECP} \right\rfloor =$o" and insert --$\left\lfloor \frac{DL\_du2}{Ts\_ECP} \right\rfloor + \left\lfloor \frac{UL\_du2}{Ts\_ECP} \right\rfloor < \frac{1}{2} M \times 2^{(\mu-\mu_a)}$, or $\left\lfloor \frac{DL\_du2}{Ts\_ECP} \right\rfloor =0$, or $\left\lfloor \frac{UL\_du2}{Ts\_ECP} \right\rfloor =0$--.

In the Detailed Description of Embodiments, Column 33, Lines 24-38; delete

"$op1(\frac{DL\_du}{Ts\_ECP})+op2(\frac{UL\_du}{Ts\_ECP}) < M \times 2^{(\mu-\mu_a)}$, or $op1(\frac{DL\_du}{Ts\_ECP})=$o or $op2(\frac{UL\_du}{Ts\_ECP})=$o" and insert --$op1(\frac{DL\_du}{Ts\_ECP})+op2(\frac{UL\_du}{Ts\_ECP}) < M \times 2^{(\mu-\mu_a)}$, or $op1(\frac{DL\_du}{Ts\_ECP})=0$, or $op2(\frac{UL\_du}{Ts\_ECP})=0$--.

In the Detailed Description of Embodiments, Column 33, Line 58; delete "opt" and insert --op1--.

In the Detailed Description of Embodiments, Column 34, Lines 24-28; delete

"$\left\lfloor \frac{DL\_du}{Ts\_ECP} \right\rfloor + \left\lfloor \frac{UL\_du}{Ts\_ECP} \right\rfloor < M \times 2^{(\mu-\mu_a)}$, or $\left\lfloor \frac{DL\_du}{Ts\_ECP} \right\rfloor =$o, or $\left\lfloor \frac{UL\_du}{Ts\_ECP} \right\rfloor =$o" and insert --$\left\lfloor \frac{DL\_du}{Ts\_ECP} \right\rfloor + \left\lfloor \frac{UL\_du}{Ts\_ECP} \right\rfloor < M \times 2^{(\mu-\mu_a)}$, or $\left\lfloor \frac{DL\_du}{Ts\_ECP} \right\rfloor =0$, or $\left\lfloor \frac{UL\_du}{Ts\_ECP} \right\rfloor =0$--.

In the Detailed Description of Embodiments, Column 34, Lines 47-53; delete

"$\left\lfloor \frac{DL\_du}{Ts\_ECP} \right\rfloor + \left\lceil \frac{UL\_du}{Ts\_ECP} \right\rceil < M \times 2^{(\mu-\mu_a)}$, or $\left\lfloor \frac{DL\_du}{Ts\_ECP} \right\rfloor =$o or $\left\lceil \frac{UL\_du}{Ts\_ECP} \right\rceil =$o" and insert --$\left\lfloor \frac{DL\_du}{Ts\_ECP} \right\rfloor + \left\lceil \frac{UL\_du}{Ts\_ECP} \right\rceil < M \times 2^{(\mu-\mu_a)}$, or $\left\lfloor \frac{DL\_du}{Ts\_ECP} \right\rfloor =0$, or $\left\lceil \frac{UL\_du}{Ts\_ECP} \right\rceil =0$--.

In the Detailed Description of Embodiments, Column 36, Lines 55-59; delete

"$op1(\frac{DL\_du}{Ts\_ECP})+op2(\frac{UL\_du}{Ts\_ECP}) = M \times 2^{(\mu-\mu_a)}$, $op1(\frac{DL\_du}{Ts\_ECP}) >$o and $op2(\frac{UL\_du}{Ts\_ECP}) >$o" and insert --$op1(\frac{DL\_du}{Ts\_ECP})+op2(\frac{UL\_du}{Ts\_ECP}) = M \times 2^{(\mu-\mu_a)}$, $op1(\frac{DL\_du}{Ts\_ECP}) > 0$, and $op2(\frac{UL\_du}{Ts\_ECP}) > 0$--.

CERTIFICATE OF CORRECTION (continued)  
U.S. Pat. No. 11,388,709 B2

Page 4 of 6

In the Detailed Description of Embodiments, Column 43, Lines 29-33; delete

"$op1(\frac{DL\_du1}{Ts\_ECP})+op2(\frac{UL\_du1}{Ts\_ECP}) < \frac{1}{2}M \times 2^{(\mu-\mu_a)}$, or $op1(\frac{DL\_du1}{Ts\_ECP})$ =o or $op2(\frac{UL\_du1}{Ts\_ECP})$ =o" and insert -- $op1(\frac{DL\_du1}{Ts\_ECP})+op2(\frac{UL\_du1}{Ts\_ECP}) < \frac{1}{2}M \times 2^{(\mu-\mu_a)}$, or $op1(\frac{DL\_du1}{Ts\_ECP})$ =0, or $op2(\frac{UL\_du1}{Ts\_ECP})$ =0 --.

In the Detailed Description of Embodiments, Column 44, Lines 23-28; delete

"$\left|\frac{DL\_du1}{Ts\_ECP}\right|+\left|\frac{UL\_du1}{Ts\_ECP}\right|<\frac{1}{2}M \times 2^{(\mu-\mu_a)}$, or $\left|\frac{DL\_du1}{Ts\_ECP}\right|$ =o or $\left|\frac{UL\_du1}{Ts\_ECP}\right|$ =o" and insert -- $\left|\frac{DL\_du1}{Ts\_ECP}\right|+\left|\frac{UL\_du1}{Ts\_ECP}\right|<\frac{1}{2}M \times 2^{(\mu-\mu_a)}$, or $\left|\frac{DL\_du1}{Ts\_ECP}\right|$ =0, or $\left|\frac{UL\_du1}{Ts\_ECP}\right|$ =0 --.

In the Detailed Description of Embodiments, Column 45, Lines 25-30; delete

"$op1(\frac{DL\_du1}{Ts\_ECP})+op2(\frac{UL\_du1}{Ts\_ECP})=\frac{1}{2}M \times 2^{(\mu-\mu_a)}$, $op1(\frac{DL\_du1}{Ts\_ECP})$ >o and $op2(\frac{UL\_du1}{Ts\_ECP})$ >o" and insert -- $op1(\frac{DL\_du1}{Ts\_ECP})+op2(\frac{UL\_du1}{Ts\_ECP})=\frac{1}{2}M \times 2^{(\mu-\mu_a)}$, $op1(\frac{DL\_du1}{Ts\_ECP})$ >0, and $op2(\frac{UL\_du1}{Ts\_ECP})$ >0 --.

In the Detailed Description of Embodiments, Column 50, Lines 47-53; delete

"$op1(\frac{DL\_du2}{Ts\_ECP})+op2(\frac{UL\_du2}{Ts\_ECP}) < \frac{1}{2}M \times 2^{(\mu-\mu_a)}$, or $op1(\frac{DL\_du2}{Ts\_ECP})$ =o or $op2(\frac{UL\_du2}{Ts\_ECP})$ =o" and insert -- $op1(\frac{DL\_du2}{Ts\_ECP})+op2(\frac{UL\_du2}{Ts\_ECP}) < \frac{1}{2}M \times 2^{(\mu-\mu_a)}$, or $op1(\frac{DL\_du2}{Ts\_ECP})$ =0, or $op2(\frac{UL\_du2}{Ts\_ECP})$ =0 --.

In the Detailed Description of Embodiments, Column 51, Lines 40-44; delete

"$\left|\frac{DL\_du2}{Ts\_ECP}\right|+\left|\frac{UL\_du2}{Ts\_ECP}\right|<\frac{1}{2}M \times 2^{(\mu-\mu_a)}$, or $\left|\frac{DL\_du2}{Ts\_ECP}\right|$ =o or $\left|\frac{UL\_du2}{Ts\_ECP}\right|$ =o" and insert -- $\left|\frac{DL\_du2}{Ts\_ECP}\right|+\left|\frac{UL\_du2}{Ts\_ECP}\right|<\frac{1}{2}M \times 2^{(\mu-\mu_a)}$, or $\left|\frac{DL\_du2}{Ts\_ECP}\right|$ =0, or $\left|\frac{UL\_du2}{Ts\_ECP}\right|$ =0 --.

CERTIFICATE OF CORRECTION (continued)
U.S. Pat. No. 11,388,709 B2

In the Detailed Description of Embodiments, Column 52, Lines 30-35; delete

"$op1(\frac{DL\_du2}{Ts\_ECP})+op2(\frac{UL\_du2}{Ts\_ECP})=\frac{1}{2}M\times2^{(\mu-\mu_a)}$, $op1(\frac{DL\_du2}{Ts\_ECP})>\text{o and }op2(\frac{UL\_du2}{Ts\_ECP})>\text{o}$"

and insert

--$op1(\frac{DL\_du2}{Ts\_ECP})+op2(\frac{UL\_du2}{Ts\_ECP})=\frac{1}{2}M\times2^{(\mu-\mu_a)}$, $op1(\frac{DL\_du2}{Ts\_ECP})>0$, and $op2(\frac{UL\_du2}{Ts\_ECP})>0$--.

In the Claims

Claim 1, Column 79, Lines 2-9; delete

"$\left|\frac{DL\_du}{Ts\_ECP}\right|+\left|\frac{UL\_du}{Ts\_ECP}\right|<M\times2^{(\mu-\mu a)}$, or $\left|\frac{DL\_du}{Ts\_ECP}\right|=\text{o}$, or $\left|\frac{UL\_du}{Ts\_ECP}\right|=\text{o}$" and insert --$\left|\frac{DL\_du}{Ts\_ECP}\right|+\left|\frac{UL\_du}{Ts\_ECP}\right|<M\times2^{(\mu-\mu a)}$, or $\left|\frac{DL\_du}{Ts\_ECP}\right|=0$, or $\left|\frac{UL\_du}{Ts\_ECP}\right|=0$--.

Claim 5, Column 80, Lines 29-34; delete

"$\left|\frac{DL\_du1}{Ts\_ECP}\right|+\left|\frac{UL\_du1}{Ts\_ECP}\right|<\frac{1}{2}M\times2^{(\mu-\mu_a)}$, or $\left|\frac{DL\_du1}{Ts\_ECP}\right|=\text{o}$, or $\left|\frac{UL\_du1}{Ts\_ECP}\right|=\text{o}$" and insert --$\left|\frac{DL\_du1}{Ts\_ECP}\right|+\left|\frac{UL\_du1}{Ts\_ECP}\right|<\frac{1}{2}M\times2^{(\mu-\mu_a)}$, or $\left|\frac{DL\_du1}{Ts\_ECP}\right|=0$, or $\left|\frac{UL\_du1}{Ts\_ECP}\right|=0$--.

Claim 9, Column 81, Lines 16-21; delete

"$\left|\frac{DL\_du2}{Ts\_ECP}\right|+\left|\frac{UL\_du2}{Ts\_ECP}\right|<\frac{1}{2}M\times2^{(\mu-\mu_a)}$, or $\left|\frac{DL\_du2}{Ts\_ECP}\right|=\text{o}$, or $\left|\frac{UL\_du2}{Ts\_ECP}\right|=\text{o}$" and insert --$\left|\frac{DL\_du2}{Ts\_ECP}\right|+\left|\frac{UL\_du2}{Ts\_ECP}\right|<\frac{1}{2}M\times2^{(\mu-\mu_a)}$, or $\left|\frac{DL\_du2}{Ts\_ECP}\right|=0$, or $\left|\frac{UL\_du2}{Ts\_ECP}\right|=0$--.

Claim 17, Column 82, Lines 45-50; delete

"$\left|\frac{DL\_du}{Ts\_ECP}\right|+\left|\frac{UL\_du}{Ts\_ECP}\right|<M\times2^{(\mu-\mu a)}$, or $\left|\frac{DL\_du}{Ts\_ECP}\right|=\text{o}$, or $\left|\frac{UL\_du}{Ts\_ECP}\right|=\text{o}$" and insert --$\left|\frac{DL\_du}{Ts\_ECP}\right|+\left|\frac{UL\_du}{Ts\_ECP}\right|<M\times2^{(\mu-\mu a)}$, or $\left|\frac{DL\_du}{Ts\_ECP}\right|=0$, or $\left|\frac{UL\_du}{Ts\_ECP}\right|=0$--.

CERTIFICATE OF CORRECTION (continued)
U.S. Pat. No. 11,388,709 B2

Claim 20, Column 84, Lines 2-6; delete

"$\left\lfloor \dfrac{DL\_du1}{Ts\_ECP} \right\rfloor + \left\lfloor \dfrac{UL\_du1}{Ts\_ECP} \right\rfloor < \dfrac{1}{2} M \times 2^{(\mu-\mu_s)}$, or $\left\lfloor \dfrac{DL\_du1}{Ts\_ECP} \right\rfloor = \text{o}$, or $\left\lfloor \dfrac{UL\_du1}{Ts\_ECP} \right\rfloor = \text{o}$" and insert --$\left\lfloor \dfrac{DL\_du1}{Ts\_ECP} \right\rfloor + \left\lfloor \dfrac{UL\_du1}{Ts\_ECP} \right\rfloor < \dfrac{1}{2} M \times 2^{(\mu-\mu_s)}$, or $\left\lfloor \dfrac{DL\_du1}{Ts\_ECP} \right\rfloor = 0$, or $\left\lfloor \dfrac{UL\_du1}{Ts\_ECP} \right\rfloor = 0$--.

Claim 23, Column 84, Lines 53-57; delete

"$\left\lfloor \dfrac{DL\_du2}{Ts\_ECP} \right\rfloor + \left\lfloor \dfrac{UL\_du2}{Ts\_ECP} \right\rfloor < \dfrac{1}{2} M \times 2^{(\mu-\mu_s)}$, or $\left\lfloor \dfrac{DL\_du2}{Ts\_ECP} \right\rfloor = \text{o}$, or " and insert --$\left\lfloor \dfrac{DL\_du2}{Ts\_ECP} \right\rfloor + \left\lfloor \dfrac{UL\_du2}{Ts\_ECP} \right\rfloor < \dfrac{1}{2} M \times 2^{(\mu-\mu_s)}$, or $\left\lfloor \dfrac{DL\_du2}{Ts\_ECP} \right\rfloor = 0$, or $\left\lfloor \dfrac{UL\_du2}{Ts\_ECP} \right\rfloor = 0$--.